United States Patent
Kapczynski et al.

(10) Patent No.: US 10,277,659 B1
(45) Date of Patent: *Apr. 30, 2019

(54) AGGREGATING USER WEB BROWSING DATA

(71) Applicant: ConsumerInfo.com, Inc., Costa Mesa, CA (US)

(72) Inventors: Mark Joseph Kapczynski, Santa Monica, CA (US); Michael John Dean, Torrance, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/481,307

(22) Filed: Apr. 6, 2017

Related U.S. Application Data

(63) Continuation of application No. 14/077,090, filed on Nov. 11, 2013, now Pat. No. 9,654,541.

(Continued)

(51) Int. Cl.
 *G06Q 40/00* (2012.01)
 *H04L 29/08* (2006.01)

(52) U.S. Cl.
 CPC ............. *H04L 67/02* (2013.01); *G06Q 40/00* (2013.01)

(58) Field of Classification Search
 CPC ........................................................ H04L 67/02

(Continued)

(56) References Cited

U.S. PATENT DOCUMENTS 3,405,457 A 10/1968 Bitzer
4,346,442 A 8/1982 Musmanno
(Continued)

FOREIGN PATENT DOCUMENTS

CA 2509842 12/2005
CN 1290372 5/2001
(Continued)

OTHER PUBLICATIONS

Equifax, "Business Status Alerts: User Guide", Jul. 2009, pp. 1-21.
(Continued)

*Primary Examiner* — David R Lazaro
*Assistant Examiner* — Zia Khurshid
(74) *Attorney, Agent, or Firm* — Knobbe, Martens, Olson & Bear, LLP

(57) ABSTRACT

A system for aggregating a user's web browsing data which may include cookies placed on a user's computing device from various websites. The system receives authorization from a user to retrieve cookie and other data associated with the user. The system then accesses cookie data and personal data associated with the user. In some embodiments, the aggregation system communicates with websites that placed the cookie data on the user's computer to determine one or more characteristics of the user based on the cookie data (which may be understandable only by the placing website). The system may then provide the user's aggregated data or a portion thereof to requesting entities. The user may have access to a user interface which provides information about the user's aggregated data and allows the user to determine how much information to share with requesting entities.

17 Claims, 12 Drawing Sheets

Related U.S. Application Data

(60) Provisional application No. 61/725,287, filed on Nov. 12, 2012.

(58) Field of Classification Search
USPC .......................................................... 709/217
See application file for complete search history.

(56) References Cited

U.S. PATENT DOCUMENTS

| | | |
|---|---|---|
| 4,734,858 A | 3/1988 | Schlafly |
| 4,755,940 A | 7/1988 | Brachtl et al. |
| 4,774,664 A | 9/1988 | Campbell et al. |
| 4,775,935 A | 10/1988 | Yourick |
| 4,827,508 A | 5/1989 | Shear |
| 4,891,503 A | 1/1990 | Jewell |
| 4,977,595 A | 12/1990 | Ohta et al. |
| 4,982,346 A | 1/1991 | Girouard et al. |
| 4,989,141 A | 1/1991 | Lyons et al. |
| 5,126,936 A | 6/1992 | Champion et al. |
| 5,148,365 A | 9/1992 | Dembo |
| 5,201,010 A | 4/1993 | Deaton et al. |
| 5,220,501 A | 6/1993 | Lawlor et al. |
| 5,262,941 A | 11/1993 | Saladin |
| 5,274,547 A | 12/1993 | Zoffel et al. |
| 5,283,731 A | 2/1994 | Lalonde et al. |
| 5,305,195 A | 4/1994 | Murphy |
| 5,336,870 A | 8/1994 | Hughes et al. |
| 5,351,186 A | 9/1994 | Bullock et al. |
| 5,383,113 A | 1/1995 | Kight et al. |
| 5,404,518 A | 4/1995 | Gilbertson et al. |
| 5,459,306 A | 10/1995 | Stein et al. |
| 5,500,513 A | 3/1996 | Langhans et al. |
| 5,515,098 A | 5/1996 | Carles |
| 5,563,783 A | 10/1996 | Stolfo et al. |
| 5,590,038 A | 12/1996 | Pitroda |
| 5,592,560 A | 1/1997 | Deaton et al. |
| 5,621,201 A | 4/1997 | Langhans et al. |
| 5,640,577 A | 6/1997 | Scharmer |
| 5,659,725 A | 8/1997 | Levy et al. |
| 5,659,731 A | 8/1997 | Gustafson |
| 5,661,516 A | 8/1997 | Caries |
| 5,689,651 A | 11/1997 | Lozman |
| 5,692,107 A | 11/1997 | Simoudis et al. |
| 5,719,941 A | 2/1998 | Swift et al. |
| 5,729,735 A | 3/1998 | Meyering |
| 5,739,512 A | 4/1998 | Tognazzini |
| 5,740,549 A | 4/1998 | Reilly et al. |
| 5,748,098 A | 5/1998 | Grace |
| 5,754,632 A | 5/1998 | Smith |
| 5,819,234 A | 10/1998 | Slavin et al. |
| 5,822,751 A | 10/1998 | Gray et al. |
| 5,825,884 A | 10/1998 | Zdepski et al. |
| 5,832,068 A | 11/1998 | Smith |
| 5,842,211 A | 11/1998 | Horadan et al. |
| 5,844,218 A | 12/1998 | Kawan et al. |
| 5,848,396 A | 12/1998 | Gerace |
| 5,857,175 A | 1/1999 | Day et al. |
| 5,864,620 A | 1/1999 | Pettitt |
| 5,870,721 A | 2/1999 | Norris |
| 5,873,068 A | 2/1999 | Beaumont et al. |
| 5,878,403 A | 3/1999 | DeFrancesco |
| 5,881,131 A | 3/1999 | Farris et al. |
| 5,884,302 A | 3/1999 | Ho |
| 5,903,830 A | 5/1999 | Joao et al. |
| 5,903,881 A | 5/1999 | Schrader et al. |
| 5,930,776 A | 7/1999 | Dykstra et al. |
| 5,944,790 A | 8/1999 | Levy |
| 5,953,710 A | 9/1999 | Fleming |
| 5,956,693 A | 9/1999 | Geerlings |
| 5,963,939 A | 10/1999 | McCann et al. |
| 5,966,695 A | 10/1999 | Melchione et al. |
| 5,978,780 A | 11/1999 | Watson |
| 5,991,735 A | 11/1999 | Gerace |
| 5,995,947 A | 11/1999 | Fraser et al. |
| 5,999,596 A | 12/1999 | Walker et al. |
| 6,006,333 A | 12/1999 | Nielsen |
| 6,009,415 A | 12/1999 | Shurling et al. |
| 6,014,645 A | 1/2000 | Cunningham |
| 6,021,397 A | 2/2000 | Jones et al. |
| 6,021,943 A | 2/2000 | Chastain |
| 6,026,440 A | 2/2000 | Shrader et al. |
| 6,029,149 A | 2/2000 | Dykstra et al. |
| 6,038,551 A | 3/2000 | Barlow et al. |
| 6,055,570 A | 4/2000 | Nielsen |
| 6,064,990 A | 5/2000 | Goldsmith |
| 6,070,147 A | 5/2000 | Harms et al. |
| 6,072,894 A | 6/2000 | Payne |
| 6,073,140 A | 6/2000 | Morgan et al. |
| 6,085,242 A | 7/2000 | Chandra |
| 6,088,686 A | 7/2000 | Walker et al. |
| 6,101,486 A | 8/2000 | Roberts et al. |
| 6,112,190 A | 8/2000 | Fletcher et al. |
| 6,119,103 A | 9/2000 | Basch et al. |
| 6,128,602 A | 10/2000 | Northington et al. |
| 6,144,948 A | 11/2000 | Walker et al. |
| 6,149,441 A | 11/2000 | Pellegrino et al. |
| 6,157,707 A | 12/2000 | Baulier et al. |
| 6,157,927 A | 12/2000 | Schaefer et al. |
| 6,161,139 A | 12/2000 | Win et al. |
| 6,178,420 B1 | 1/2001 | Sassano |
| 6,182,068 B1 | 1/2001 | Culliss |
| 6,182,229 B1 | 1/2001 | Nielsen |
| 6,202,053 B1 | 3/2001 | Christiansen et al. |
| 6,202,067 B1 | 3/2001 | Blood et al. |
| 6,208,979 B1 | 3/2001 | Sinclair |
| 6,233,566 B1 | 5/2001 | Levine et al. |
| 6,233,588 B1 | 5/2001 | Marchoili et al. |
| 6,236,977 B1 | 5/2001 | Verba et al. |
| 6,247,000 B1 | 6/2001 | Hawkins et al. |
| 6,254,000 B1 | 7/2001 | Degen et al. |
| 6,263,447 B1 | 7/2001 | French et al. |
| 6,278,993 B1 | 8/2001 | Kumar et al. |
| 6,282,658 B2 | 8/2001 | French et al. |
| 6,289,318 B1 | 9/2001 | Barber |
| 6,289,452 B1 | 9/2001 | Arnold et al. |
| 6,295,541 B1 | 9/2001 | Bodnar et al. |
| 6,298,330 B1 | 10/2001 | Gardenswartz et al. |
| 6,304,860 B1 | 10/2001 | Martin et al. |
| 6,311,169 B2 | 10/2001 | Duhon |
| 6,317,752 B1 | 11/2001 | Lee et al. |
| 6,321,339 B1 | 11/2001 | French et al. |
| 6,324,566 B1 | 11/2001 | Himmel et al. |
| 6,327,578 B1 | 12/2001 | Linehan |
| 6,330,551 B1 | 12/2001 | Burchetta et al. |
| 6,334,110 B1 | 12/2001 | Walter et al. |
| 6,343,279 B1 | 1/2002 | Bissonette et al. |
| 6,353,778 B1 | 3/2002 | Brown |
| 6,356,937 B1 | 3/2002 | Montville et al. |
| 6,374,262 B1 | 4/2002 | Kodama |
| 6,384,844 B1 | 5/2002 | Stewart et al. |
| 6,385,592 B1 | 5/2002 | Angles et al. |
| 6,386,444 B1 | 5/2002 | Sullivan |
| 6,397,197 B1 | 5/2002 | Gindlesperger |
| 6,397,212 B1 | 5/2002 | Biffar |
| 6,405,173 B1 | 6/2002 | Honarvar |
| 6,405,181 B2 | 6/2002 | Lent et al. |
| 6,408,282 B1 | 6/2002 | Buist |
| 6,412,073 B1 | 6/2002 | Rangan |
| 6,421,675 B1 | 7/2002 | Ryan et al. |
| 6,421,729 B1 | 7/2002 | Paltenghe et al. |
| 6,422,462 B1 | 7/2002 | Cohen |
| 6,442,577 B1 | 8/2002 | Britton et al. |
| 6,446,200 B1 | 9/2002 | Ball et al. |
| 6,453,353 B1 | 9/2002 | Win et al. |
| 6,457,012 B1 | 9/2002 | Jatkowski |
| 6,460,036 B1 | 10/2002 | Herz |
| 6,473,740 B2 | 10/2002 | Cockril et al. |
| 6,496,936 B1 | 12/2002 | French et al. |
| 5,870,721 C1 | 1/2003 | Norris |
| 6,505,168 B1 | 1/2003 | Rothman et al. |
| 6,510,451 B2 | 1/2003 | Wu et al. |
| 6,523,021 B1 | 2/2003 | Monberg et al. |
| 6,523,022 B1 | 2/2003 | Hobbs |
| 6,523,041 B1 | 2/2003 | Morgan et al. |

(56) References Cited

U.S. PATENT DOCUMENTS

| | | |
|---|---|---|
| 6,539,377 B1 | 3/2003 | Culliss |
| 6,539,392 B1 | 3/2003 | Rebane |
| 6,543,683 B2 | 4/2003 | Hoffman |
| 6,549,904 B1 | 4/2003 | Ortega et al. |
| 6,564,210 B1 | 5/2003 | Korda et al. |
| 6,567,791 B2 | 5/2003 | Lent et al. |
| 6,571,236 B1 | 5/2003 | Ruppelt |
| 6,574,736 B1 | 6/2003 | Andrews |
| 6,581,025 B2 | 6/2003 | Lehman |
| 6,587,841 B1 | 7/2003 | DeFrancesco |
| 6,594,766 B2 | 7/2003 | Rangan et al. |
| 6,611,816 B2 | 8/2003 | Lebda et al. |
| 6,615,193 B1 | 9/2003 | Kingdon et al. |
| 6,615,247 B1 | 9/2003 | Murphy |
| 6,623,529 B1 | 9/2003 | Lakritz |
| 6,629,245 B1 | 9/2003 | Stone et al. |
| 6,640,215 B1 | 10/2003 | Galperin et al. |
| 6,647,383 B1 | 11/2003 | August et al. |
| 6,658,393 B1 | 12/2003 | Basch et al. |
| 6,665,715 B1 | 12/2003 | Houri |
| 6,678,694 B1 | 1/2004 | Zimmermann et al. |
| 6,698,020 B1 | 2/2004 | Zigmond et al. |
| 6,703,930 B2 | 3/2004 | Skinner |
| 6,714,944 B1 | 3/2004 | Shapiro et al. |
| 6,718,313 B1 | 4/2004 | Lent et al. |
| 6,725,381 B1 | 4/2004 | Smith et al. |
| 6,738,804 B1 | 5/2004 | Lo |
| 6,745,938 B2 | 6/2004 | Sullivan |
| 6,748,426 B1 | 6/2004 | Shaffer et al. |
| 6,750,985 B2 | 6/2004 | Rhoads |
| 6,757,740 B1 | 6/2004 | Parekh et al. |
| 6,766,304 B2 | 7/2004 | Kemp et al. |
| 6,766,327 B2 | 7/2004 | Morgan, Jr. et al. |
| 6,772,132 B1 | 8/2004 | Kemp et al. |
| 6,781,608 B1 | 8/2004 | Crawford |
| 6,782,379 B2 | 8/2004 | Lee |
| 6,792,088 B2 | 9/2004 | Takeuchi |
| 6,792,263 B1 | 9/2004 | Kite |
| 6,796,497 B2 | 9/2004 | Benkert et al. |
| 6,801,909 B2 | 10/2004 | Delgado et al. |
| 6,804,346 B1 | 10/2004 | Mewhinney |
| 6,805,287 B2 | 10/2004 | Bishop et al. |
| 6,807,533 B1 | 10/2004 | Land et al. |
| 6,810,323 B1 | 10/2004 | Bullock et al. |
| 6,810,356 B1 | 10/2004 | Garcia-Franco et al. |
| 6,816,850 B2 | 11/2004 | Culliss |
| 6,816,871 B2 | 11/2004 | Lee |
| 6,823,319 B1 | 11/2004 | Lynch et al. |
| 6,829,639 B1 | 12/2004 | Lawson et al. |
| 6,842,782 B1 | 1/2005 | Malik et al. |
| 6,845,448 B1 | 1/2005 | Chaganti et al. |
| 6,857,073 B2 | 2/2005 | French et al. |
| 6,859,212 B2 | 2/2005 | Kumar et al. |
| 6,871,287 B1 | 3/2005 | Ellingson |
| 6,892,307 B1 | 5/2005 | Wood et al. |
| 6,898,574 B1 | 5/2005 | Regan |
| 6,900,731 B2 | 5/2005 | Kreiner et al. |
| 6,910,624 B1 | 6/2005 | Natsuno |
| 6,925,441 B1 | 8/2005 | Jones, III et al. |
| 6,928,487 B2 | 8/2005 | Eggebraaten et al. |
| 6,934,714 B2 | 8/2005 | Meinig |
| 6,938,011 B1 | 8/2005 | Kemp et al. |
| 6,941,323 B1 | 9/2005 | Galperin |
| 6,947,989 B2 | 9/2005 | Gullotta et al. |
| 6,950,807 B2 | 9/2005 | Brock |
| 6,954,757 B2 | 10/2005 | Zargham et al. |
| 6,957,336 B2 | 10/2005 | Wheeler et al. |
| 6,959,281 B1 | 10/2005 | Freeling et al. |
| 6,962,336 B2 | 11/2005 | Glass |
| 6,965,881 B1 | 11/2005 | Brickell et al. |
| 6,968,319 B1 | 11/2005 | Remington et al. |
| 6,973,462 B2 | 12/2005 | Dattero et al. |
| 6,983,379 B1 | 1/2006 | Spalink et al. |
| 6,983,478 B1 | 1/2006 | Grauch et al. |
| 6,985,887 B1 | 1/2006 | Sunstein et al. |
| 6,988,082 B1 | 1/2006 | Williams et al. |
| 6,988,085 B2 | 1/2006 | Hedy |
| 6,990,591 B1 | 1/2006 | Pearson |
| 6,993,504 B1 | 1/2006 | Friesen et al. |
| 6,993,572 B2 | 1/2006 | Ross, Jr. et al. |
| 6,993,596 B2 | 1/2006 | Hinton et al. |
| 6,999,941 B1 | 2/2006 | Agarwal |
| 7,003,792 B1 | 2/2006 | Yuen |
| 7,013,315 B1 | 3/2006 | Boothby |
| 7,016,907 B2 | 3/2006 | Boreham et al. |
| 7,024,548 B1 | 4/2006 | O'Toole, Jr. |
| 7,028,001 B1 | 4/2006 | Muthuswamy et al. |
| 7,028,013 B2 | 4/2006 | Saeki |
| 7,028,052 B2 | 4/2006 | Chapman et al. |
| 7,033,792 B2 | 4/2006 | Zhong et al. |
| 7,035,855 B1 | 4/2006 | Kilger et al. |
| 7,039,607 B2 | 5/2006 | Watarai et al. |
| 7,043,476 B2 | 5/2006 | Robson |
| 7,046,139 B2 | 5/2006 | Kuhn et al. |
| 7,047,251 B2 | 5/2006 | Reed et al. |
| 7,050,989 B1 | 5/2006 | Hurt et al. |
| 7,058,386 B2 | 6/2006 | McGregor et al. |
| 7,058,817 B1 | 6/2006 | Ellmore |
| 7,062,475 B1 | 6/2006 | Szabo et al. |
| 7,065,566 B2 | 6/2006 | Menard et al. |
| 7,069,240 B2 | 6/2006 | Spero et al. |
| 7,072,853 B2 | 7/2006 | Shkedi |
| 7,072,909 B2 | 7/2006 | Polk |
| 7,072,963 B2 | 7/2006 | Anderson et al. |
| 7,076,462 B1 | 7/2006 | Nelson et al. |
| 7,076,475 B2 | 7/2006 | Honarvar et al. |
| 7,085,727 B2 | 8/2006 | VanOrman |
| 7,089,594 B2 | 8/2006 | Lal et al. |
| 7,107,241 B1 | 9/2006 | Pinto |
| 7,107,285 B2 | 9/2006 | Von Kaenel et al. |
| 7,110,978 B1 | 9/2006 | Chin |
| 7,117,172 B1 | 10/2006 | Black |
| 7,124,144 B2 | 10/2006 | Christianson et al. |
| 7,127,424 B2 | 10/2006 | Kemp et al. |
| 7,133,935 B2 | 11/2006 | Hedy |
| 7,143,063 B2 | 11/2006 | Lent |
| 7,150,030 B1 | 12/2006 | Eldering et al. |
| 7,152,018 B2 | 12/2006 | Wicks |
| 7,152,237 B2 | 12/2006 | Flickinger et al. |
| 7,155,725 B1 | 12/2006 | Kister et al. |
| 7,155,739 B2 | 12/2006 | Bari et al. |
| 7,167,907 B2 | 1/2007 | Shaffer et al. |
| 7,174,455 B1 | 2/2007 | Arnold et al. |
| 7,181,418 B1 | 2/2007 | Zucker et al. |
| 7,181,427 B1 | 2/2007 | DeFrancesco |
| 7,184,974 B2 | 2/2007 | Shishido |
| 7,185,016 B1 | 2/2007 | Rasmussen |
| 7,185,353 B2 | 2/2007 | Schlack |
| 7,194,416 B1 | 3/2007 | Provost et al. |
| 7,200,602 B2 | 4/2007 | Jonas |
| 7,200,804 B1 | 4/2007 | Khavari et al. |
| 7,206,768 B1 | 4/2007 | deGroeve et al. |
| 7,209,895 B2 | 4/2007 | Kundtz et al. |
| 7,209,911 B2 | 4/2007 | Boothby et al. |
| 7,212,995 B2 | 5/2007 | Schulkins |
| 7,212,999 B2 | 5/2007 | Friesen et al. |
| 7,218,912 B2 | 5/2007 | Erskine et al. |
| 7,219,107 B2 | 5/2007 | Beringer |
| 7,222,369 B2 | 5/2007 | Vering et al. |
| 7,228,289 B2 | 6/2007 | Brumfield et al. |
| 7,234,156 B2 | 6/2007 | French et al. |
| 7,236,950 B2 | 6/2007 | Savage et al. |
| 7,243,369 B2 | 7/2007 | Bhat et al. |
| 7,246,740 B2 | 7/2007 | Swift et al. |
| 7,249,048 B1 | 7/2007 | O'Flaherty |
| 7,249,076 B1 | 7/2007 | Pendleton et al. |
| 7,249,113 B1 | 7/2007 | Continelli et al. |
| 7,263,497 B1 | 8/2007 | Wiser et al. |
| 7,272,591 B1 | 9/2007 | Ghazal et al. |
| 7,275,083 B1 | 9/2007 | Seibel et al. |
| 7,281,652 B2 | 10/2007 | Foss |
| 7,289,971 B1 | 10/2007 | O'Neil et al. |
| 7,296,734 B2 | 11/2007 | Pliha |
| 7,302,272 B2 | 11/2007 | Ackley |

(56) References Cited

U.S. PATENT DOCUMENTS

| | | |
|---|---|---|
| 7,310,611 B2 | 12/2007 | Shibuya et al. |
| 7,310,617 B1 | 12/2007 | Cunningham |
| 7,310,618 B2 | 12/2007 | Libman |
| 7,313,813 B2 | 12/2007 | Rangan et al. |
| 7,314,167 B1 | 1/2008 | Kiliccote |
| 7,315,837 B2 | 1/2008 | Sloan et al. |
| 7,328,233 B2 | 2/2008 | Salim et al. |
| 7,328,435 B2 | 2/2008 | Trifon |
| 7,330,717 B2 | 2/2008 | Gidron et al. |
| 7,330,835 B2 | 2/2008 | Deggendorf |
| 7,333,635 B2 | 2/2008 | Tsantes et al. |
| 7,340,679 B2 | 3/2008 | Botscheck et al. |
| 7,343,149 B2 | 3/2008 | Benco |
| 7,343,295 B2 | 3/2008 | Pomerance |
| 7,346,576 B2 | 3/2008 | Lent et al. |
| 7,356,503 B1 | 4/2008 | Johnson et al. |
| 7,356,516 B2 | 4/2008 | Richey et al. |
| 7,360,251 B2 | 4/2008 | Spalink et al. |
| 7,366,694 B2 | 4/2008 | Lazerson |
| 7,366,759 B2 | 4/2008 | Trevithick |
| 7,370,014 B1 | 5/2008 | Vasavada et al. |
| 7,370,044 B2 | 5/2008 | Mulhern et al. |
| 7,373,324 B1 | 5/2008 | Engin et al. |
| 7,383,988 B2 | 6/2008 | Slonecker, Jr. |
| 7,386,511 B2 | 6/2008 | Buchanan et al. |
| 7,386,786 B2 | 6/2008 | Davis et al. |
| 7,389,913 B2 | 6/2008 | Starrs |
| 7,395,241 B1 | 7/2008 | Cook et al. |
| 7,395,273 B2 | 7/2008 | Khan et al. |
| 7,403,923 B2 | 7/2008 | Elliott et al. |
| 7,403,942 B1 | 7/2008 | Bayliss |
| 7,409,369 B1 | 8/2008 | Homuth et al. |
| 7,412,228 B2 | 8/2008 | Barclay et al. |
| 7,421,322 B1 | 9/2008 | Silversmith et al. |
| 7,433,864 B2 | 10/2008 | Malik |
| 7,437,679 B2 | 10/2008 | Uemura et al. |
| 7,444,518 B1 | 10/2008 | Dharmarajan et al. |
| 7,451,095 B1 | 11/2008 | Bradley et al. |
| 7,451,113 B1 | 11/2008 | Kasower |
| 7,458,508 B1 | 12/2008 | Shao et al. |
| 7,467,401 B2 | 12/2008 | Cicchitto |
| 7,472,088 B2 | 12/2008 | Taylor et al. |
| 7,475,032 B1 | 1/2009 | Patnode et al. |
| 7,479,949 B2 | 1/2009 | Jobs et al. |
| 7,480,631 B1 | 1/2009 | Merced et al. |
| 7,490,356 B2 | 2/2009 | Lieblich et al. |
| RE40,692 E | 3/2009 | Rose, Jr. |
| 7,499,868 B2 | 3/2009 | Galperin et al. |
| 7,503,489 B2 | 3/2009 | Heffez |
| 7,505,931 B2 | 3/2009 | Silva |
| 7,509,117 B2 | 3/2009 | Yum |
| 7,509,278 B2 | 3/2009 | Jones |
| 7,512,221 B2 | 3/2009 | Toms |
| 7,529,698 B2 | 5/2009 | Joao |
| 7,530,097 B2 | 5/2009 | Casco-Arias et al. |
| 7,533,179 B2 | 5/2009 | Tarquini et al. |
| 7,536,329 B2 | 5/2009 | Goldberg et al. |
| 7,536,346 B2 | 5/2009 | Aliffi et al. |
| 7,536,348 B2 | 5/2009 | Shao et al. |
| 7,542,922 B2 | 6/2009 | Bennett et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,546,619 B2 | 6/2009 | Anderson et al. |
| 7,548,886 B2 | 6/2009 | Kirkland et al. |
| 7,552,086 B1 | 6/2009 | Rajasekar et al. |
| 7,552,089 B2 | 6/2009 | Bruer et al. |
| 7,552,467 B2 | 6/2009 | Lindsay |
| 7,555,459 B2 | 6/2009 | Dhar et al. |
| 7,558,748 B2 | 7/2009 | Ehring et al. |
| 7,558,795 B2 | 7/2009 | Malik et al. |
| 7,559,217 B2 | 7/2009 | Bass |
| 7,562,184 B2 | 7/2009 | Henmi et al. |
| 7,562,382 B2 | 7/2009 | Hinton et al. |
| 7,562,814 B1 | 7/2009 | Shao et al. |
| 7,571,138 B2 | 8/2009 | Miri et al. |
| 7,571,139 B1 | 8/2009 | Giordano et al. |
| 7,571,322 B2 | 8/2009 | Karoubi |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,856 B1 | 8/2009 | Pliha |
| 7,580,884 B2 | 8/2009 | Cook |
| 7,581,112 B2 | 8/2009 | Brown et al. |
| 7,584,126 B1 | 9/2009 | White |
| 7,584,146 B1 | 9/2009 | Duhon |
| 7,587,368 B2 | 9/2009 | Felsher |
| 7,590,589 B2 | 9/2009 | Hoffberg |
| 7,593,891 B2 | 9/2009 | Kornegay et al. |
| 7,594,019 B2 | 9/2009 | Clapper |
| 7,596,512 B1 | 9/2009 | Raines et al. |
| 7,596,716 B2 | 9/2009 | Frost et al. |
| 7,606,752 B2 | 10/2009 | Hazlehurst et al. |
| 7,610,216 B1 | 10/2009 | May et al. |
| 7,610,229 B1 | 10/2009 | Kornegay |
| 7,610,243 B2 | 10/2009 | Haggerty et al. |
| 7,610,257 B1 | 10/2009 | Abrahams |
| 7,613,600 B2 | 11/2009 | Krane |
| 7,620,596 B2 | 11/2009 | Knudson et al. |
| 7,620,653 B1 | 11/2009 | Swartz |
| 7,623,844 B2 | 11/2009 | Herrmann et al. |
| 7,630,903 B1 | 12/2009 | Vaidyanathan |
| 7,630,932 B2 | 12/2009 | Danaher et al. |
| 7,630,933 B2 | 12/2009 | Peterson et al. |
| 7,634,737 B2 | 12/2009 | Beringer et al. |
| 7,640,200 B2 | 12/2009 | Gardner et al. |
| 7,640,209 B1 | 12/2009 | Brooks et al. |
| 7,644,023 B2 | 1/2010 | Kumar et al. |
| 7,644,035 B1 | 1/2010 | Biffle et al. |
| 7,647,274 B2 | 1/2010 | Peterson et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |
| 7,653,688 B2 | 1/2010 | Bittner |
| 7,672,833 B2 | 3/2010 | Blume et al. |
| 7,672,865 B2 | 3/2010 | Kumar et al. |
| 7,672,924 B1 | 3/2010 | Scheurich et al. |
| 7,672,926 B2 | 3/2010 | Ghazal et al. |
| 7,676,410 B2 | 3/2010 | Petralia |
| 7,685,209 B1 | 3/2010 | Norton et al. |
| 7,685,525 B2 | 3/2010 | Kumar et al. |
| 7,686,214 B1 | 3/2010 | Shao et al. |
| 7,688,813 B2 | 3/2010 | Shin et al. |
| 7,689,487 B1 | 3/2010 | Britto et al. |
| 7,689,505 B2 | 3/2010 | Kasower |
| 7,689,563 B1 | 3/2010 | Jacobson |
| 7,690,032 B1 | 3/2010 | Peirce |
| 7,693,787 B2 | 4/2010 | Provinse |
| 7,698,214 B1 | 4/2010 | Lindgren |
| 7,698,217 B1 | 4/2010 | Phillips et al. |
| 7,698,236 B2 | 4/2010 | Cox et al. |
| 7,707,117 B1 | 4/2010 | Jimenez et al. |
| 7,707,122 B2 | 4/2010 | Hull et al. |
| 7,707,271 B2 | 4/2010 | Rudkin et al. |
| 7,708,190 B2 | 5/2010 | Brandt et al. |
| 7,711,635 B2 | 5/2010 | Steele et al. |
| 7,711,707 B2 | 5/2010 | Kelley |
| 7,715,832 B2 | 5/2010 | Zhou |
| 7,720,705 B2 | 5/2010 | Stein |
| 7,720,846 B1 | 5/2010 | Bayliss |
| 7,725,385 B2 | 5/2010 | Royer et al. |
| 7,729,959 B1 | 6/2010 | Wells et al. |
| 7,730,078 B2 | 6/2010 | Schwabe et al. |
| 7,730,509 B2 | 6/2010 | Boulet et al. |
| 7,734,522 B2 | 6/2010 | Johnson et al. |
| 7,734,637 B2 | 6/2010 | Greifeneder et al. |
| 7,739,707 B2 | 6/2010 | Sie et al. |
| 7,742,982 B2 | 6/2010 | Chaudhuri et al. |
| 7,747,520 B2 | 6/2010 | Livermore et al. |
| 7,747,521 B2 | 6/2010 | Serio |
| 7,747,559 B2 | 6/2010 | Leitner et al. |
| 7,752,236 B2 | 7/2010 | Williams et al. |
| 7,756,789 B2 | 7/2010 | Welker et al. |

(56) References Cited

U.S. PATENT DOCUMENTS

| | | |
|---|---|---|
| 7,761,373 B2 | 7/2010 | Metz |
| 7,761,384 B2 | 7/2010 | Madhogarhia |
| 7,765,148 B2 | 7/2010 | German et al. |
| 7,765,166 B2 | 7/2010 | Beringer et al. |
| 7,769,697 B2 | 8/2010 | Fieschi et al. |
| 7,769,998 B2 | 8/2010 | Lynch et al. |
| 7,774,257 B2 | 8/2010 | Maggioncalda et al. |
| 7,774,270 B1 | 8/2010 | MacCloskey |
| 7,783,515 B1 | 8/2010 | Kumar et al. |
| 7,787,869 B2 | 8/2010 | Rice et al. |
| 7,788,040 B2 | 8/2010 | Haskell et al. |
| 7,788,147 B2 | 8/2010 | Haggerty et al. |
| 7,792,715 B1 | 9/2010 | Kasower |
| 7,792,725 B2 | 9/2010 | Booraem et al. |
| 7,792,747 B2 | 9/2010 | Chin |
| 7,792,903 B2 | 9/2010 | Fischer et al. |
| 7,793,835 B1 | 9/2010 | Coggeshall et al. |
| 7,797,252 B2 | 9/2010 | Rosskamm et al. |
| 7,801,807 B2 | 9/2010 | DeFrancesco et al. |
| 7,801,811 B1 | 9/2010 | Merrell et al. |
| 7,801,812 B2 | 9/2010 | Conlin et al. |
| 7,801,956 B1 | 9/2010 | Cumberbatch et al. |
| 7,802,104 B2 | 9/2010 | Dickinson |
| 7,805,362 B1 | 9/2010 | Merrell et al. |
| 7,809,398 B2 | 10/2010 | Pearson |
| 7,809,797 B2 | 10/2010 | Cooley et al. |
| 7,810,036 B2 | 10/2010 | Bales et al. |
| 7,814,002 B2 | 10/2010 | DeFrancesco et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,827,115 B2 | 11/2010 | Weller et al. |
| 7,832,006 B2 | 11/2010 | Chen et al. |
| 7,835,983 B2 | 11/2010 | Lefner et al. |
| 7,835,990 B2 | 11/2010 | Coleman |
| 7,840,484 B2 | 11/2010 | Haggerty et al. |
| 7,841,004 B1 | 11/2010 | Balducci et al. |
| 7,841,008 B1 | 11/2010 | Cole et al. |
| 7,844,520 B1 | 11/2010 | Franklin |
| 7,844,604 B2 | 11/2010 | Baio et al. |
| 7,848,972 B1 | 12/2010 | Sharma |
| 7,848,978 B2 | 12/2010 | Imrey et al. |
| 7,849,014 B2 | 12/2010 | Erikson |
| 7,853,493 B2 | 12/2010 | DeBie et al. |
| 7,853,522 B2 | 12/2010 | Chin |
| 7,856,203 B2 | 12/2010 | Lipovski |
| 7,856,386 B2 | 12/2010 | Hazlehurst et al. |
| 7,856,453 B2 | 12/2010 | Malik et al. |
| 7,870,066 B2 | 1/2011 | Lin et al. |
| 7,870,068 B2 | 1/2011 | Chin |
| 7,870,078 B2 | 1/2011 | Clark et al. |
| 7,877,304 B1 | 1/2011 | Coulter |
| 7,877,784 B2 | 1/2011 | Chow et al. |
| 7,880,728 B2 | 2/2011 | de los Reyes et al. |
| 7,890,403 B1 | 2/2011 | Smith |
| 7,899,750 B1 | 3/2011 | Klieman et al. |
| 7,908,242 B1 | 3/2011 | Achanta |
| 7,909,246 B2 | 3/2011 | Hogg et al. |
| 7,911,673 B1 | 3/2011 | Yap |
| 7,912,842 B1 | 3/2011 | Bayliss et al. |
| 7,912,865 B2 | 3/2011 | Akerman et al. |
| 7,925,549 B2 | 4/2011 | Looney et al. |
| 7,925,582 B1 | 4/2011 | Kornegay et al. |
| 7,925,982 B2 | 4/2011 | Parker |
| 7,930,242 B2 | 4/2011 | Morris et al. |
| 7,930,285 B2 | 4/2011 | Abraham et al. |
| 7,954,698 B1 | 6/2011 | Pliha |
| 7,958,046 B2 | 6/2011 | Doerner et al. |
| 7,962,404 B1 | 6/2011 | Metzger, II et al. |
| 7,966,192 B2 | 6/2011 | Pagliari et al. |
| 7,966,325 B2 | 6/2011 | Singh |
| 7,970,676 B2 | 6/2011 | Feinstein |
| 7,970,679 B2 | 6/2011 | Kasower |
| 7,970,698 B2 | 6/2011 | Gupta et al. |
| 7,975,299 B1 | 7/2011 | Balducci et al. |
| 7,979,908 B2 | 7/2011 | Millwee |
| 7,983,932 B2 | 7/2011 | Kane |
| 7,987,501 B2 | 7/2011 | Miller et al. |
| 7,991,688 B2 | 8/2011 | Phelan et al. |
| 7,991,689 B1 | 8/2011 | Brunzell et al. |
| 7,991,901 B2 | 8/2011 | Tarquini et al. |
| 7,996,521 B2 | 8/2011 | Chamberlain et al. |
| 7,996,912 B2 | 8/2011 | Spalink et al. |
| 8,001,042 B1 | 8/2011 | Brunzell et al. |
| 8,001,153 B2 | 8/2011 | Skurtovich, Jr. et al. |
| 8,001,235 B2 | 8/2011 | Russ et al. |
| 8,005,759 B2 | 8/2011 | Hirtenstein et al. |
| 8,006,261 B1 | 8/2011 | Haberman et al. |
| 8,015,045 B2 | 9/2011 | Galperin et al. |
| 8,015,107 B2 | 9/2011 | Kornegay et al. |
| 8,024,264 B2 | 9/2011 | Chaudhuri et al. |
| 8,032,932 B2 | 10/2011 | Speyer et al. |
| 8,036,941 B2 | 10/2011 | Bennett et al. |
| 8,037,097 B2 | 10/2011 | Guo et al. |
| 8,055,904 B1 | 11/2011 | Cato et al. |
| 8,060,424 B2 | 11/2011 | Kasower |
| 8,060,438 B2 | 11/2011 | Dhar et al. |
| 8,060,916 B2 | 11/2011 | Bajaj et al. |
| 8,065,233 B2 | 11/2011 | Lee et al. |
| 8,069,407 B1 | 11/2011 | Armandpour et al. |
| 8,078,453 B2 | 12/2011 | Shaw |
| 8,078,524 B2 | 12/2011 | Crawford et al. |
| 8,078,527 B2 | 12/2011 | Cerise et al. |
| 8,078,528 B1 | 12/2011 | Vicente et al. |
| 8,078,881 B1 | 12/2011 | Liu |
| 8,086,524 B1 | 12/2011 | Craig et al. |
| 8,095,443 B2 | 1/2012 | DeBie |
| 8,095,458 B2 | 1/2012 | Peterson et al. |
| 8,099,309 B1 | 1/2012 | Bober |
| 8,099,341 B2 | 1/2012 | Varghese |
| 8,099,356 B2 | 1/2012 | Feinstein et al. |
| 8,099,376 B2 | 1/2012 | Serrano-Morales et al. |
| 8,104,671 B2 | 1/2012 | Besecker et al. |
| 8,104,679 B2 | 1/2012 | Brown |
| 8,108,301 B2 | 1/2012 | Gupta et al. |
| 8,126,456 B2 | 2/2012 | Lotter et al. |
| 8,126,805 B2 | 2/2012 | Sulkowski et al. |
| 8,127,982 B1 | 3/2012 | Casey et al. |
| 8,127,986 B1 | 3/2012 | Taylor et al. |
| 8,131,685 B1 | 3/2012 | Gedalius et al. |
| 8,131,777 B2 | 3/2012 | McCullouch |
| 8,145,554 B2 | 3/2012 | Kumar et al. |
| 8,145,754 B2 | 3/2012 | Chamberlain et al. |
| 8,160,960 B1 | 4/2012 | Fei et al. |
| 8,175,889 B1 | 5/2012 | Girulat et al. |
| 8,195,549 B2 | 6/2012 | Kasower |
| 8,201,257 B1 | 6/2012 | Andres et al. |
| 8,204,812 B2 | 6/2012 | Stewart et al. |
| 8,219,771 B2 | 7/2012 | Le Neel |
| 8,224,723 B2 | 7/2012 | Bosch et al. |
| 8,225,395 B2 | 7/2012 | Atwood et al. |
| 8,229,911 B2 | 7/2012 | Bennett |
| 8,234,498 B2 | 7/2012 | Britti et al. |
| 8,244,848 B1 | 8/2012 | Narayanan et al. |
| 8,249,968 B1 | 8/2012 | Oldham et al. |
| 8,271,378 B2 | 9/2012 | Chaudhuri et al. |
| 8,271,393 B2 | 9/2012 | Twining et al. |
| 8,280,805 B1 | 10/2012 | Abrahams et al. |
| 8,281,372 B1 | 10/2012 | Vidal |
| 8,285,577 B1 | 10/2012 | Galperin et al. |
| 8,285,613 B1 | 10/2012 | Coulter |
| 8,285,656 B1 | 10/2012 | Chang et al. |
| 8,290,840 B2 | 10/2012 | Kasower |
| 8,290,856 B1 | 10/2012 | Kasower |
| 8,296,229 B1 | 10/2012 | Yellin et al. |
| 8,301,574 B2 | 10/2012 | Kilger et al. |
| 8,312,033 B1 | 11/2012 | McMillan |
| 8,321,339 B2 | 11/2012 | Imrey et al. |
| 8,321,952 B2 | 11/2012 | Spalink et al. |
| 8,327,429 B2 | 12/2012 | Speyer et al. |
| 8,335,741 B2 | 12/2012 | Kornegay et al. |
| 8,346,615 B2 | 1/2013 | Connors et al. |
| 8,355,967 B2 | 1/2013 | Debie et al. |
| 8,374,973 B2 | 2/2013 | Herbrich et al. |

(56) References Cited

U.S. PATENT DOCUMENTS

| | | |
|---|---|---|
| 8,392,334 B2 | 3/2013 | Hirtenstein et al. |
| 8,407,194 B1 | 3/2013 | Chaput et al. |
| 8,412,593 B1 | 4/2013 | Song et al. |
| 8,433,654 B2 | 4/2013 | Subbarao et al. |
| 8,443,202 B2 | 5/2013 | White et al. |
| 8,456,293 B1 | 6/2013 | Trundle et al. |
| 8,458,062 B2 | 6/2013 | Dutt et al. |
| 8,463,919 B2 | 6/2013 | Tarquini et al. |
| 8,463,939 B1 | 6/2013 | Galvin |
| 8,464,939 B1 | 6/2013 | Taylor et al. |
| 8,473,318 B2 | 6/2013 | Nielson et al. |
| 8,478,674 B1 | 7/2013 | Kapczynski et al. |
| 8,484,186 B1 | 7/2013 | Kapczynski et al. |
| 8,499,348 B1 | 7/2013 | Rubin |
| 8,504,470 B1 | 8/2013 | Chirehdast |
| 8,515,828 B1 | 8/2013 | Wolf et al. |
| 8,515,844 B1 | 8/2013 | Kasower |
| 8,527,357 B1 | 9/2013 | Ganesan |
| 8,527,596 B2 | 9/2013 | Long et al. |
| 8,533,118 B2 | 9/2013 | Weller et al. |
| 8,533,322 B2 | 9/2013 | Chamberlain et al. |
| 8,555,357 B1 | 10/2013 | Gauvin |
| 8,560,436 B2 | 10/2013 | Ingram et al. |
| 8,560,444 B2 | 10/2013 | Rosenblatt et al. |
| 8,560,447 B1 | 10/2013 | Hinghole et al. |
| 8,572,083 B1 | 10/2013 | Snell et al. |
| 8,578,036 B1 | 11/2013 | Holfelder et al. |
| 8,578,496 B1 | 11/2013 | Krishnappa |
| 8,600,886 B2 | 12/2013 | Ramavarjula et al. |
| 8,601,602 B1 | 12/2013 | Zheng |
| 8,606,626 B1 | 12/2013 | DeSoto et al. |
| 8,606,666 B1 | 12/2013 | Courbage et al. |
| 8,606,694 B1 | 12/2013 | Campbell et al. |
| 8,630,938 B2 | 1/2014 | Cheng et al. |
| 8,639,616 B1 | 1/2014 | Rolenaitis et al. |
| 8,639,920 B2 | 1/2014 | Stack et al. |
| 8,646,051 B2 | 2/2014 | Paden et al. |
| 8,671,115 B2 | 3/2014 | Skurtovich, Jr. et al. |
| 8,688,543 B2 | 4/2014 | Dominquez |
| 8,689,001 B1 | 4/2014 | Satish |
| 8,705,718 B2 | 4/2014 | Baniak et al. |
| 8,706,599 B1 | 4/2014 | Koenig et al. |
| 8,725,613 B1 | 5/2014 | Celka et al. |
| 8,738,516 B1 | 5/2014 | Dean et al. |
| 8,745,698 B1 | 6/2014 | Ashfield et al. |
| 8,751,378 B2 | 6/2014 | Dornhelm et al. |
| 8,768,914 B2 | 7/2014 | Scriffignano et al. |
| 8,781,951 B2 | 7/2014 | Lewis et al. |
| 8,781,953 B2 | 7/2014 | Kasower |
| 8,782,217 B1 | 7/2014 | Arone et al. |
| 8,818,888 B1 | 8/2014 | Kapczynski et al. |
| 8,856,894 B1 | 10/2014 | Dean et al. |
| 8,856,945 B2 | 10/2014 | Carter et al. |
| 8,860,763 B2 | 10/2014 | Privault et al. |
| 8,930,251 B2 | 1/2015 | DeBie |
| 8,930,263 B1 | 1/2015 | Mahacek et al. |
| 8,938,399 B1 | 1/2015 | Herman |
| 8,949,981 B1 | 2/2015 | Trollope et al. |
| 8,954,459 B1 | 2/2015 | McMillan et al. |
| 8,972,400 B1 | 3/2015 | Kapczynski et al. |
| 9,058,627 B1 | 6/2015 | Wasser et al. |
| 9,106,691 B1 | 8/2015 | Burger et al. |
| 9,147,042 B1 | 9/2015 | Haller et al. |
| 9,218,481 B2 | 10/2015 | Belisario |
| 9,183,377 B1 | 11/2015 | Sobel et al. |
| 9,225,704 B1 | 12/2015 | Johansson et al. |
| 9,230,283 B1 | 1/2016 | Taylor et al. |
| 9,256,624 B2 | 2/2016 | Skurtovich, Jr. et al. |
| 9,256,904 B1 | 2/2016 | Haller et al. |
| 9,400,589 B1 | 7/2016 | Wasser et al. |
| 9,406,085 B1 | 8/2016 | Hunt, III et al. |
| 9,443,268 B1 | 9/2016 | Kapczynski et al. |
| 9,477,737 B1 | 10/2016 | Charyk et al. |
| 9,483,606 B1 | 11/2016 | Dean et al. |
| 9,501,583 B2 | 11/2016 | Nordstrom et al. |
| 9,536,263 B1 | 1/2017 | Dean et al. |
| 9,542,553 B1 | 1/2017 | Burger et al. |
| 9,542,682 B1 | 1/2017 | Taylor et al. |
| 9,654,541 B1 | 5/2017 | Kapczynski et al. |
| 9,665,854 B1 | 5/2017 | Burger et al. |
| 9,697,568 B1 | 7/2017 | Hunt, III |
| 9,710,523 B2 | 7/2017 | Skurtovich, Jr. et al. |
| 9,710,852 B1 | 7/2017 | Olson et al. |
| 9,767,513 B1 | 9/2017 | Taylor et al. |
| 9,830,646 B1 | 11/2017 | Wasser et al. |
| 9,853,959 B1 | 12/2017 | Kapczynski et al. |
| 9,870,589 B1 | 1/2018 | Arnold et al. |
| 9,892,457 B1 | 2/2018 | Kapczynski |
| 9,916,621 B1 | 3/2018 | Wasser et al. |
| 9,972,048 B1 | 5/2018 | Dean et al. |
| 9,990,674 B1 | 6/2018 | Taylor et al. |
| 10,025,842 B1 | 7/2018 | Charyk et al. |
| 10,043,214 B1 | 8/2018 | Hunt, III |
| 2001/0011245 A1 | 8/2001 | Duhon |
| 2001/0014878 A1 | 8/2001 | Mitra et al. |
| 2001/0029470 A1 | 10/2001 | Schultz et al. |
| 2001/0029482 A1 | 10/2001 | Tealdi et al. |
| 2001/0032181 A1 | 10/2001 | Jakstadt et al. |
| 2001/0034631 A1 | 10/2001 | Kiselik |
| 2001/0037204 A1 | 11/2001 | Horn et al. |
| 2001/0037289 A1 | 11/2001 | Mayr et al. |
| 2001/0039532 A1 | 11/2001 | Coleman, Jr. et al. |
| 2001/0039563 A1 | 11/2001 | Tian |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0044764 A1 | 11/2001 | Arnold |
| 2001/0047332 A1 | 11/2001 | Gonen-Friedman et al. |
| 2001/0049274 A1 | 12/2001 | Degraeve |
| 2002/0010616 A1 | 1/2002 | Itzaki |
| 2002/0013827 A1 | 1/2002 | Edstrom et al. |
| 2002/0013899 A1 | 1/2002 | Faul |
| 2002/0023051 A1 | 2/2002 | Kunzle et al. |
| 2002/0026507 A1 | 2/2002 | Sears et al. |
| 2002/0029192 A1 | 3/2002 | Nakagawa et al. |
| 2002/0032635 A1 | 3/2002 | Harris et al. |
| 2002/0033846 A1 | 3/2002 | Balasubramanian et al. |
| 2002/0035480 A1 | 3/2002 | Gordon et al. |
| 2002/0045154 A1 | 4/2002 | Wood et al. |
| 2002/0046099 A1 | 4/2002 | Frengut et al. |
| 2002/0049968 A1 | 4/2002 | Wilson et al. |
| 2002/0052841 A1 | 5/2002 | Guthrie et al. |
| 2002/0055906 A1 | 5/2002 | Katz et al. |
| 2002/0059139 A1 | 5/2002 | Evans |
| 2002/0059201 A1 | 5/2002 | Work |
| 2002/0062249 A1 | 5/2002 | Iannacci |
| 2002/0069122 A1 | 6/2002 | Yun et al. |
| 2002/0069182 A1 | 6/2002 | Dwyer |
| 2002/0073017 A1 | 6/2002 | Robertson |
| 2002/0077964 A1 | 6/2002 | Brody et al. |
| 2002/0087460 A1 | 7/2002 | Hornung |
| 2002/0091635 A1 | 7/2002 | Dilip et al. |
| 2002/0099628 A1 | 7/2002 | Takaoka et al. |
| 2002/0099635 A1 | 7/2002 | Guiragosian |
| 2002/0099824 A1 | 7/2002 | Bender et al. |
| 2002/0103809 A1 | 8/2002 | Starzl et al. |
| 2002/0103933 A1 | 8/2002 | Garon et al. |
| 2002/0111816 A1 | 8/2002 | Lortscher et al. |
| 2002/0111890 A1 | 8/2002 | Sloan et al. |
| 2002/0120757 A1 | 8/2002 | Sutherland et al. |
| 2002/0120846 A1 | 8/2002 | Stewart et al. |
| 2002/0123904 A1 | 9/2002 | Amengual et al. |
| 2002/0123928 A1 | 9/2002 | Eldering et al. |
| 2002/0128917 A1 | 9/2002 | Grounds |
| 2002/0128960 A1 | 9/2002 | Lambiotte et al. |
| 2002/0128962 A1 | 9/2002 | Kasower |
| 2002/0129368 A1 | 9/2002 | Schlack et al. |
| 2002/0133365 A1 | 9/2002 | Grey et al. |
| 2002/0133404 A1 | 9/2002 | Pedersen |
| 2002/0133462 A1 | 9/2002 | Shteyn |
| 2002/0133504 A1 | 9/2002 | Vlahos et al. |
| 2002/0138333 A1 | 9/2002 | DeCotiis et al. |
| 2002/0138334 A1 | 9/2002 | DeCotiis et al. |
| 2002/0138409 A1 | 9/2002 | Bass |

(56) References Cited

U.S. PATENT DOCUMENTS

| | | |
|---|---|---|
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0152166 A1 | 10/2002 | Dutta et al. |
| 2002/0156676 A1 | 10/2002 | Ahrens et al. |
| 2002/0161664 A1 | 10/2002 | Shaya et al. |
| 2002/0169747 A1 | 11/2002 | Chapman et al. |
| 2002/0173994 A1 | 11/2002 | Ferguson, III |
| 2002/0174048 A1 | 11/2002 | Dheer et al. |
| 2002/0174061 A1 | 11/2002 | Srinivasan et al. |
| 2002/0188544 A1 | 12/2002 | Wizon et al. |
| 2002/0194120 A1 | 12/2002 | Russell et al. |
| 2002/0194140 A1 | 12/2002 | Makuck |
| 2002/0198800 A1 | 12/2002 | Shamrakov |
| 2002/0198806 A1 | 12/2002 | Blagg et al. |
| 2002/0198822 A1 | 12/2002 | Munoz et al. |
| 2002/0198824 A1 | 12/2002 | Cook |
| 2002/0198830 A1 | 12/2002 | Randell et al. |
| 2003/0002671 A1 | 1/2003 | Inchalik et al. |
| 2003/0004853 A1 | 1/2003 | Ram et al. |
| 2003/0004855 A1 | 1/2003 | Dutta et al. |
| 2003/0007283 A1 | 1/2003 | Ostwald et al. |
| 2003/0009411 A1 | 1/2003 | Ram et al. |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018578 A1 | 1/2003 | Schultz |
| 2003/0023489 A1 | 1/2003 | McGuire et al. |
| 2003/0023531 A1 | 1/2003 | Fergusson |
| 2003/0028466 A1 | 2/2003 | Jenson et al. |
| 2003/0028477 A1 | 2/2003 | Stevenson et al. |
| 2003/0028529 A1 | 2/2003 | Cheung |
| 2003/0033242 A1 | 2/2003 | Lynch et al. |
| 2003/0036995 A1 | 2/2003 | Lazerson |
| 2003/0041050 A1 | 2/2003 | Smith et al. |
| 2003/0046311 A1 | 3/2003 | Baidya et al. |
| 2003/0050929 A1 | 3/2003 | Bookman et al. |
| 2003/0061104 A1 | 3/2003 | Thomson et al. |
| 2003/0061155 A1 | 3/2003 | Chin |
| 2003/0061163 A1 | 3/2003 | Durfield |
| 2003/0069839 A1 | 4/2003 | Whittington et al. |
| 2003/0069943 A1 | 4/2003 | Bahrs et al. |
| 2003/0093311 A1 | 5/2003 | Knowlson |
| 2003/0097342 A1 | 5/2003 | Whittingtom |
| 2003/0097380 A1 | 5/2003 | Mulhern et al. |
| 2003/0101111 A1 | 5/2003 | Dang et al. |
| 2003/0101344 A1 | 5/2003 | Wheeler et al. |
| 2003/0105646 A1 | 6/2003 | Siepser |
| 2003/0105710 A1 | 6/2003 | Barbara et al. |
| 2003/0105728 A1 | 6/2003 | Yano et al. |
| 2003/0105733 A1 | 6/2003 | Boreham |
| 2003/0105742 A1 | 6/2003 | Boreham et al. |
| 2003/0115133 A1 | 6/2003 | Bian |
| 2003/0154162 A1 | 8/2003 | Danaher et al. |
| 2003/0158960 A1 | 8/2003 | Engberg |
| 2003/0163435 A1 | 8/2003 | Payone |
| 2003/0163513 A1 | 8/2003 | Schaeck et al. |
| 2003/0163733 A1 | 8/2003 | Barriga-Caceres et al. |
| 2003/0171942 A1 | 9/2003 | Gaito |
| 2003/0187768 A1 | 10/2003 | Ryan et al. |
| 2003/0187837 A1 | 10/2003 | Culliss |
| 2003/0191711 A1 | 10/2003 | Jamison et al. |
| 2003/0191731 A1 | 10/2003 | Stewart et al. |
| 2003/0195859 A1 | 10/2003 | Lawrence |
| 2003/0204429 A1 | 10/2003 | Botscheck et al. |
| 2003/0204752 A1 | 10/2003 | Garrison |
| 2003/0208412 A1 | 11/2003 | Hillestad et al. |
| 2003/0212654 A1 | 11/2003 | Harper et al. |
| 2003/0212909 A1 | 11/2003 | Chandrashekhar |
| 2003/0216965 A1 | 11/2003 | Libman |
| 2003/0219709 A1 | 11/2003 | Olenick et al. |
| 2003/0220858 A1 | 11/2003 | Lam et al. |
| 2003/0225742 A1 | 12/2003 | Tenner et al. |
| 2003/0229580 A1 | 12/2003 | Gass et al. |
| 2003/0229892 A1 | 12/2003 | Sardera |
| 2003/0233278 A1 | 12/2003 | Marshall |
| 2003/0233323 A1 | 12/2003 | Bilski et al. |
| 2004/0001565 A1 | 1/2004 | Jones et al. |
| 2004/0006536 A1 | 1/2004 | Kawashima et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0019549 A1 | 1/2004 | Gulbrandsen |
| 2004/0019799 A1 | 1/2004 | Vering et al. |
| 2004/0024671 A1 | 2/2004 | Freund |
| 2004/0024709 A1 | 2/2004 | Yu et al. |
| 2004/0030574 A1 | 2/2004 | DiCostanzo et al. |
| 2004/0030649 A1 | 2/2004 | Nelson et al. |
| 2004/0039586 A1 | 2/2004 | Garvey et al. |
| 2004/0039688 A1 | 2/2004 | Sulkowski et al. |
| 2004/0044563 A1 | 3/2004 | Stein |
| 2004/0044601 A1 | 3/2004 | Kim et al. |
| 2004/0044628 A1 | 3/2004 | Mathew et al. |
| 2004/0044673 A1 | 3/2004 | Brady et al. |
| 2004/0046033 A1 | 3/2004 | Kolodziej et al. |
| 2004/0062213 A1 | 4/2004 | Koss |
| 2004/0078809 A1 | 4/2004 | Drazin |
| 2004/0083159 A1 | 4/2004 | Crosby et al. |
| 2004/0088237 A1 | 5/2004 | Moenickheim et al. |
| 2004/0088255 A1 | 5/2004 | Zielke et al. |
| 2004/0093278 A1 | 5/2004 | Burchetta et al. |
| 2004/0098418 A1 | 5/2004 | Hein |
| 2004/0098546 A1 | 5/2004 | Bashant et al. |
| 2004/0098625 A1 | 5/2004 | Lagadec et al. |
| 2004/0102197 A1 | 5/2004 | Dietz |
| 2004/0107125 A1 | 6/2004 | Guheen et al. |
| 2004/0107250 A1 | 6/2004 | Marciano |
| 2004/0110119 A1 | 6/2004 | Riconda et al. |
| 2004/0111359 A1 | 6/2004 | Hudock |
| 2004/0117302 A1 | 6/2004 | Weichert et al. |
| 2004/0117358 A1 | 6/2004 | Von Kaenel et al. |
| 2004/0122681 A1 | 6/2004 | Ruvolo et al. |
| 2004/0122696 A1 | 6/2004 | Beringer |
| 2004/0122697 A1 | 6/2004 | Becerra et al. |
| 2004/0122730 A1 | 6/2004 | Tucciarone et al. |
| 2004/0122735 A1 | 6/2004 | Meshkin |
| 2004/0128150 A1 | 7/2004 | Lundegren |
| 2004/0128156 A1 | 7/2004 | Beringer et al. |
| 2004/0128193 A1 | 7/2004 | Brice et al. |
| 2004/0128215 A1 | 7/2004 | Florance et al. |
| 2004/0128236 A1 | 7/2004 | Brown et al. |
| 2004/0133440 A1 | 7/2004 | Carolan et al. |
| 2004/0133509 A1 | 7/2004 | McCoy et al. |
| 2004/0133513 A1 | 7/2004 | McCoy et al. |
| 2004/0133514 A1 | 7/2004 | Zielke et al. |
| 2004/0133515 A1 | 7/2004 | McCoy et al. |
| 2004/0138992 A1 | 7/2004 | DeFrancesco et al. |
| 2004/0138994 A1 | 7/2004 | DeFrancesco et al. |
| 2004/0138997 A1 | 7/2004 | DeFrancesco et al. |
| 2004/0139025 A1 | 7/2004 | Coleman |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153330 A1 | 8/2004 | Miller et al. |
| 2004/0158723 A1 | 8/2004 | Root |
| 2004/0159700 A1 | 8/2004 | Khan et al. |
| 2004/0163101 A1 | 8/2004 | Swix |
| 2004/0167793 A1 | 8/2004 | Masuoka et al. |
| 2004/0177035 A1 | 9/2004 | Silva |
| 2004/0186807 A1 | 9/2004 | Nathans et al. |
| 2004/0193538 A1 | 9/2004 | Raines |
| 2004/0193891 A1 | 9/2004 | Ollila |
| 2004/0199456 A1 | 10/2004 | Flint et al. |
| 2004/0199584 A1 | 10/2004 | Kirshenbaum et al. |
| 2004/0199789 A1 | 10/2004 | Shaw et al. |
| 2004/0205157 A1 | 10/2004 | Bibelnieks et al. |
| 2004/0210661 A1 | 10/2004 | Thompson |
| 2004/0215673 A1 | 10/2004 | Furukawa et al. |
| 2004/0220865 A1 | 11/2004 | Lozowski et al. |
| 2004/0220918 A1 | 11/2004 | Scriffignano et al. |
| 2004/0225545 A1 | 11/2004 | Turner et al. |
| 2004/0225594 A1 | 11/2004 | Nolan, III et al. |
| 2004/0225609 A1 | 11/2004 | Greene |

(56) References Cited

U.S. PATENT DOCUMENTS

| | | |
|---|---|---|
| 2004/0225643 A1 | 11/2004 | Alpha et al. |
| 2004/0230527 A1 | 11/2004 | Hansen et al. |
| 2004/0236688 A1 | 11/2004 | Bozeman |
| 2004/0243508 A1 | 12/2004 | Samson et al. |
| 2004/0243588 A1 | 12/2004 | Tanner et al. |
| 2004/0249811 A1 | 12/2004 | Shostack |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0010513 A1 | 1/2005 | Duckworth et al. |
| 2005/0010555 A1 | 1/2005 | Gallivan |
| 2005/0015273 A1 | 1/2005 | Iyer |
| 2005/0021397 A1 | 1/2005 | Cui et al. |
| 2005/0021476 A1 | 1/2005 | Candella et al. |
| 2005/0021551 A1 | 1/2005 | Silva et al. |
| 2005/0027632 A1 | 2/2005 | Zeitoun et al. |
| 2005/0027666 A1 | 2/2005 | Beck |
| 2005/0027983 A1 | 2/2005 | Klawon |
| 2005/0049991 A1 | 3/2005 | Aggarwal |
| 2005/0050027 A1 | 3/2005 | Yeh et al. |
| 2005/0055231 A1 | 3/2005 | Lee |
| 2005/0055296 A1 | 3/2005 | Hattersley et al. |
| 2005/0058262 A1 | 3/2005 | Timmins et al. |
| 2005/0060332 A1 | 3/2005 | Bernstein et al. |
| 2005/0071328 A1 | 3/2005 | Lawrence |
| 2005/0080723 A1 | 4/2005 | Burchetta et al. |
| 2005/0080796 A1 | 4/2005 | Midgley |
| 2005/0086126 A1 | 4/2005 | Patterson |
| 2005/0086261 A1 | 4/2005 | Mammone |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0105719 A1 | 5/2005 | Huda |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0144067 A1 | 6/2005 | Farahat et al. |
| 2005/0144143 A1 | 6/2005 | Freiberg |
| 2005/0144452 A1 | 6/2005 | Lynch et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0160280 A1 | 7/2005 | Caslin et al. |
| 2005/0171884 A1 | 8/2005 | Arnott |
| 2005/0192008 A1 | 9/2005 | Desai et al. |
| 2005/0203768 A1 | 9/2005 | Florance |
| 2005/0204381 A1 | 9/2005 | Ludvig et al. |
| 2005/0208461 A1 | 9/2005 | Krebs et al. |
| 2005/0216434 A1 | 9/2005 | Haveliwala et al. |
| 2005/0216524 A1 | 9/2005 | Gomes et al. |
| 2005/0216955 A1 | 9/2005 | Wilkins et al. |
| 2005/0222900 A1 | 10/2005 | Fuloria et al. |
| 2005/0222906 A1 | 10/2005 | Chen |
| 2005/0226224 A1 | 10/2005 | Lee et al. |
| 2005/0240578 A1 | 10/2005 | Biederman et al. |
| 2005/0251474 A1 | 11/2005 | Shinn et al. |
| 2005/0251820 A1 | 11/2005 | Stefanik et al. |
| 2005/0267840 A1 | 12/2005 | Holm-Blagg et al. |
| 2005/0273431 A1 | 12/2005 | Abel et al. |
| 2005/0278743 A1 | 12/2005 | Flickinger et al. |
| 2005/0283415 A1 | 12/2005 | Studnitzer et al. |
| 2005/0288954 A1 | 12/2005 | McCarthy et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0004731 A1 | 1/2006 | Seibel et al. |
| 2006/0010391 A1 | 1/2006 | Uemura et al. |
| 2006/0020611 A1 | 1/2006 | Gilbert et al. |
| 2006/0031158 A1 | 2/2006 | Orman |
| 2006/0031177 A1 | 2/2006 | Rule |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0041443 A1 | 2/2006 | Horvath |
| 2006/0041464 A1 | 2/2006 | Powers et al. |
| 2006/0041670 A1 | 2/2006 | Musseleck et al. |
| 2006/0047605 A1 | 3/2006 | Ahmad |
| 2006/0059083 A1 | 3/2006 | Friesen et al. |
| 2006/0059110 A1 | 3/2006 | Madhok et al. |
| 2006/0059362 A1 | 3/2006 | Paden et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080251 A1 | 4/2006 | Fried et al. |
| 2006/0080263 A1 | 4/2006 | Willis et al. |
| 2006/0085334 A1 | 4/2006 | Murphy |
| 2006/0085361 A1 | 4/2006 | Hoerle et al. |
| 2006/0085454 A1 | 4/2006 | Blegen et al. |
| 2006/0095289 A1 | 5/2006 | Bunning |
| 2006/0101508 A1 | 5/2006 | Taylor |
| 2006/0106670 A1 | 5/2006 | Cai et al. |
| 2006/0122921 A1 | 6/2006 | Comerford et al. |
| 2006/0129419 A1 | 6/2006 | Flaxer et al. |
| 2006/0129472 A1 | 6/2006 | Harrington |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136524 A1* | 6/2006 | Wohlers ............... H04L 67/02 |
| 2006/0136595 A1 | 6/2006 | Satyavolu |
| 2006/0155780 A1 | 7/2006 | Sakairi et al. |
| 2006/0161435 A1 | 7/2006 | Atef et al. |
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0190394 A1 | 8/2006 | Fraser et al. |
| 2006/0195351 A1 | 8/2006 | Bayburtian |
| 2006/0195866 A1 | 8/2006 | Thukral |
| 2006/0200583 A1 | 9/2006 | Le Lann et al. |
| 2006/0202012 A1 | 9/2006 | Grano et al. |
| 2006/0206379 A1 | 9/2006 | Rosenberg |
| 2006/0212353 A1 | 9/2006 | Roslov et al. |
| 2006/0212407 A1 | 9/2006 | Lyon |
| 2006/0212486 A1 | 9/2006 | Kennis et al. |
| 2006/0218407 A1 | 9/2006 | Toms |
| 2006/0223043 A1 | 10/2006 | Dancy-Edwards et al. |
| 2006/0224498 A1 | 10/2006 | Chin |
| 2006/0224696 A1 | 10/2006 | King et al. |
| 2006/0229943 A1 | 10/2006 | Mathias et al. |
| 2006/0229961 A1 | 10/2006 | Lyftogt et al. |
| 2006/0230415 A1 | 10/2006 | Roeding |
| 2006/0235935 A1 | 10/2006 | Ng |
| 2006/0239512 A1 | 10/2006 | Petrillo |
| 2006/0242046 A1 | 10/2006 | Haggerty et al. |
| 2006/0242047 A1 | 10/2006 | Haggerty et al. |
| 2006/0242050 A1 | 10/2006 | Haggerty et al. |
| 2006/0253323 A1 | 11/2006 | Phan et al. |
| 2006/0253358 A1 | 11/2006 | Delgrosso et al. |
| 2006/0262929 A1 | 11/2006 | Vatanen et al. |
| 2006/0271456 A1 | 11/2006 | Romain et al. |
| 2006/0271457 A1 | 11/2006 | Romain et al. |
| 2006/0271472 A1 | 11/2006 | Cagan |
| 2006/0271633 A1 | 11/2006 | Adler |
| 2006/0277089 A1 | 12/2006 | Hubbard et al. |
| 2006/0277092 A1 | 12/2006 | Williams |
| 2006/0277102 A1 | 12/2006 | Agliozzo |
| 2006/0282359 A1 | 12/2006 | Nobili et al. |
| 2006/0282373 A1 | 12/2006 | Stone |
| 2006/0282374 A1 | 12/2006 | Stone |
| 2006/0282429 A1 | 12/2006 | Hernandez-Sherrington et al. |
| 2006/0282819 A1 | 12/2006 | Graham et al. |
| 2006/0282856 A1 | 12/2006 | Errico et al. |

(56) References Cited

U.S. PATENT DOCUMENTS

| | | |
|---|---|---|
| 2006/0282886 A1 | 12/2006 | Gaug |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0287915 A1 | 12/2006 | Boulet et al. |
| 2006/0287919 A1 | 12/2006 | Rubens et al. |
| 2006/0288090 A1 | 12/2006 | Kraft |
| 2006/0293921 A1 | 12/2006 | McCarthy et al. |
| 2006/0293954 A1 | 12/2006 | Anderson et al. |
| 2006/0293955 A1 | 12/2006 | Wilson et al. |
| 2006/0293987 A1 | 12/2006 | Shapiro |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0011020 A1 | 1/2007 | Martin |
| 2007/0011039 A1 | 1/2007 | Oddo |
| 2007/0016500 A1 | 1/2007 | Chatterji et al. |
| 2007/0022032 A1 | 1/2007 | Anderson et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038516 A1 | 2/2007 | Apple et al. |
| 2007/0038568 A1 | 2/2007 | Greene et al. |
| 2007/0039049 A1 | 2/2007 | Kupferman et al. |
| 2007/0040015 A1 | 2/2007 | Carlson et al. |
| 2007/0043577 A1 | 2/2007 | Kasower |
| 2007/0047714 A1 | 3/2007 | Baniak et al. |
| 2007/0050777 A1 | 3/2007 | Hutchinson et al. |
| 2007/0055621 A1 | 3/2007 | Tischler et al. |
| 2007/0057947 A1 | 3/2007 | Yokoyama |
| 2007/0061195 A1 | 3/2007 | Liu et al. |
| 2007/0061243 A1 | 3/2007 | Ramer et al. |
| 2007/0067297 A1 | 3/2007 | Kublickis |
| 2007/0067437 A1 | 3/2007 | Sindambiwe |
| 2007/0072190 A1 | 3/2007 | Aggarwal |
| 2007/0073577 A1 | 3/2007 | Krause |
| 2007/0073889 A1 | 3/2007 | Morris |
| 2007/0078835 A1 | 4/2007 | Donnelli |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094230 A1 | 4/2007 | Subramaniam et al. |
| 2007/0094241 A1 | 4/2007 | Blackwell et al. |
| 2007/0112667 A1 | 5/2007 | Rucker |
| 2007/0112668 A1 | 5/2007 | Celano et al. |
| 2007/0112670 A1 | 5/2007 | DeFrancesco et al. |
| 2007/0118393 A1 | 5/2007 | Rosen et al. |
| 2007/0121843 A1 | 5/2007 | Atazky et al. |
| 2007/0124235 A1 | 5/2007 | Chakraborty et al. |
| 2007/0124256 A1 | 5/2007 | Crooks et al. |
| 2007/0136109 A1 | 6/2007 | Yager et al. |
| 2007/0143123 A1 | 6/2007 | Goldberg et al. |
| 2007/0149184 A1 | 6/2007 | Viegers et al. |
| 2007/0156554 A1 | 7/2007 | Nikoley et al. |
| 2007/0156581 A1 | 7/2007 | Imrey et al. |
| 2007/0156692 A1 | 7/2007 | Rosewarne |
| 2007/0157107 A1 | 7/2007 | Bishop |
| 2007/0157110 A1 | 7/2007 | Gandhi et al. |
| 2007/0160458 A1 | 7/2007 | Yen |
| 2007/0162458 A1 | 7/2007 | Fasciano |
| 2007/0169189 A1 | 7/2007 | Crespo et al. |
| 2007/0174186 A1 | 7/2007 | Hokland |
| 2007/0174448 A1 | 7/2007 | Ahuja et al. |
| 2007/0174903 A1 | 7/2007 | Greff |
| 2007/0185797 A1 | 8/2007 | Robinson |
| 2007/0192165 A1 | 8/2007 | Haggerty et al. |
| 2007/0192167 A1 | 8/2007 | Lei et al. |
| 2007/0192409 A1 | 8/2007 | Kleinstern et al. |
| 2007/0198432 A1 | 8/2007 | Pitroda et al. |
| 2007/0204033 A1 | 8/2007 | Bookbinder et al. |
| 2007/0204212 A1 | 8/2007 | Chamberlain et al. |
| 2007/0204338 A1 | 8/2007 | Aiello et al. |
| 2007/0205266 A1 | 9/2007 | Carr et al. |
| 2007/0208619 A1 | 9/2007 | Branam et al. |
| 2007/0208640 A1 | 9/2007 | Banasiak et al. |
| 2007/0208729 A1 | 9/2007 | Martino |
| 2007/0220003 A1 | 9/2007 | Chern et al. |
| 2007/0220553 A1 | 9/2007 | Branam et al. |
| 2007/0220611 A1 | 9/2007 | Socolow et al. |
| 2007/0226047 A1 | 9/2007 | Ward |
| 2007/0226122 A1 | 9/2007 | Burrell et al. |
| 2007/0226130 A1 | 9/2007 | Haggerty et al. |
| 2007/0233591 A1 | 10/2007 | Newton |
| 2007/0233857 A1 | 10/2007 | Cheng et al. |
| 2007/0239493 A1 | 10/2007 | Sweetland et al. |
| 2007/0240206 A1 | 10/2007 | Wu et al. |
| 2007/0244732 A1 | 10/2007 | Chatterji et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0262140 A1 | 11/2007 | Long, Sr. |
| 2007/0266439 A1 | 11/2007 | Kraft |
| 2007/0273558 A1 | 11/2007 | Smith |
| 2007/0282684 A1 | 12/2007 | Prosser et al. |
| 2007/0282730 A1 | 12/2007 | Carpenter et al. |
| 2007/0282736 A1 | 12/2007 | Conlin et al. |
| 2007/0282743 A1 | 12/2007 | Lovelett |
| 2007/0287415 A1 | 12/2007 | Yamada |
| 2007/0288271 A1 | 12/2007 | Klinkhammer |
| 2007/0288355 A1 | 12/2007 | Roland et al. |
| 2007/0288360 A1 | 12/2007 | Seeklus |
| 2007/0288950 A1 | 12/2007 | Downey et al. |
| 2007/0288953 A1 | 12/2007 | Sheeman et al. |
| 2007/0294126 A1 | 12/2007 | Maggio |
| 2007/0294195 A1 | 12/2007 | Curry et al. |
| 2007/0299759 A1 | 12/2007 | Kelly |
| 2007/0299770 A1 | 12/2007 | Delinsky |
| 2008/0004957 A1 | 1/2008 | Hildreth et al. |
| 2008/0005313 A1 | 1/2008 | Flake et al. |
| 2008/0010203 A1 | 1/2008 | Grant |
| 2008/0010206 A1 | 1/2008 | Coleman |
| 2008/0010687 A1 | 1/2008 | Gonen et al. |
| 2008/0021802 A1 | 1/2008 | Pendleton |
| 2008/0027859 A1 | 1/2008 | Nathans et al. |
| 2008/0028067 A1 | 1/2008 | Berkhin et al. |
| 2008/0028435 A1 | 1/2008 | Strickland et al. |
| 2008/0028446 A1 | 1/2008 | Burgoyne |
| 2008/0033956 A1 | 2/2008 | Saha et al. |
| 2008/0040176 A1 | 2/2008 | Ehling |
| 2008/0040475 A1 | 2/2008 | Bosworth et al. |
| 2008/0040610 A1 | 2/2008 | Fergusson |
| 2008/0047017 A1 | 2/2008 | Renaud |
| 2008/0052182 A1 | 2/2008 | Marshall |
| 2008/0052244 A1 | 2/2008 | Tsuei et al. |
| 2008/0059224 A1 | 3/2008 | Schechter |
| 2008/0059317 A1 | 3/2008 | Chandran et al. |
| 2008/0059352 A1 | 3/2008 | Chandran |
| 2008/0059364 A1 | 3/2008 | Tidwell et al. |
| 2008/0065569 A1 | 3/2008 | Dutt et al. |
| 2008/0065774 A1 | 3/2008 | Keeler |
| 2008/0066188 A1 | 3/2008 | Kwak |
| 2008/0071682 A1 | 3/2008 | Dominguez |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086368 A1 | 4/2008 | Bauman et al. |
| 2008/0086400 A1 | 4/2008 | Ardelean et al. |
| 2008/0086431 A1 | 4/2008 | Robinson et al. |
| 2008/0091519 A1 | 4/2008 | Foss |
| 2008/0091530 A1 | 4/2008 | Egnatios et al. |
| 2008/0091535 A1 | 4/2008 | Heiser et al. |
| 2008/0097822 A1 | 4/2008 | Schigel et al. |
| 2008/0103800 A1 | 5/2008 | Domenikos et al. |
| 2008/0103972 A1 | 5/2008 | Lanc |
| 2008/0109422 A1 | 5/2008 | Dedhia |
| 2008/0109740 A1 | 5/2008 | Prinsen et al. |
| 2008/0110973 A1 | 5/2008 | Nathans et al. |
| 2008/0114670 A1 | 5/2008 | Friesen |
| 2008/0114855 A1 | 5/2008 | Welingkar et al. |
| 2008/0115226 A1 | 5/2008 | Welingkar et al. |

(56) References Cited

U.S. PATENT DOCUMENTS

| | | |
|---|---|---|
| 2008/0120155 A1 | 5/2008 | Pliha |
| 2008/0120204 A1 | 5/2008 | Conner et al. |
| 2008/0120569 A1 | 5/2008 | Mann et al. |
| 2008/0120716 A1 | 5/2008 | Hall et al. |
| 2008/0126233 A1 | 5/2008 | Hogan |
| 2008/0126476 A1 | 5/2008 | Nicholas et al. |
| 2008/0133273 A1 | 6/2008 | Marshall |
| 2008/0133278 A1 | 6/2008 | Stanfield |
| 2008/0133657 A1 | 6/2008 | Pennington |
| 2008/0140476 A1 | 6/2008 | Anand et al. |
| 2008/0140576 A1 | 6/2008 | Lewis et al. |
| 2008/0140734 A1 | 6/2008 | Wagner |
| 2008/0141346 A1 | 6/2008 | Kay et al. |
| 2008/0147523 A1 | 6/2008 | Mulry et al. |
| 2008/0148368 A1 | 6/2008 | Zurko et al. |
| 2008/0148392 A1 | 6/2008 | Akens |
| 2008/0154758 A1 | 6/2008 | Schattmaier et al. |
| 2008/0154766 A1 | 6/2008 | Lewis et al. |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0175360 A1 | 7/2008 | Schwarz et al. |
| 2008/0177655 A1 | 7/2008 | Zalik |
| 2008/0177836 A1 | 7/2008 | Bennett |
| 2008/0183480 A1 | 7/2008 | Carlson et al. |
| 2008/0183504 A1 | 7/2008 | Highley |
| 2008/0183585 A1 | 7/2008 | Vianello |
| 2008/0184289 A1 | 7/2008 | Cristofalo et al. |
| 2008/0184351 A1 | 7/2008 | Gephart |
| 2008/0195548 A1 | 8/2008 | Chu et al. |
| 2008/0201257 A1 | 8/2008 | Lewis et al. |
| 2008/0201401 A1 | 8/2008 | Pugh et al. |
| 2008/0208548 A1 | 8/2008 | Metzger et al. |
| 2008/0208735 A1 | 8/2008 | Balet et al. |
| 2008/0212845 A1 | 9/2008 | Lund |
| 2008/0215470 A1 | 9/2008 | Sengupta et al. |
| 2008/0216156 A1 | 9/2008 | Kosaka |
| 2008/0221972 A1 | 9/2008 | Megdal et al. |
| 2008/0222027 A1 | 9/2008 | Megdal et al. |
| 2008/0222706 A1 | 9/2008 | Renaud et al. |
| 2008/0228556 A1 | 9/2008 | Megdal et al. |
| 2008/0228635 A1 | 9/2008 | Megdal et al. |
| 2008/0228775 A1 | 9/2008 | Abhyanker et al. |
| 2008/0229415 A1 | 9/2008 | Kapoor et al. |
| 2008/0249869 A1 | 10/2008 | Angell et al. |
| 2008/0255897 A1 | 10/2008 | Megdal et al. |
| 2008/0255992 A1 | 10/2008 | Lin |
| 2008/0263638 A1 | 10/2008 | McMurtry et al. |
| 2008/0270038 A1 | 10/2008 | Partovi et al. |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0277465 A1 | 11/2008 | Pletz et al. |
| 2008/0281737 A1 | 11/2008 | Fajardo |
| 2008/0282324 A1 | 11/2008 | Hoal |
| 2008/0288283 A1 | 11/2008 | Baldwin, Jr. et al. |
| 2008/0288299 A1 | 11/2008 | Schultz |
| 2008/0294501 A1 | 11/2008 | Rennich et al. |
| 2008/0294540 A1 | 11/2008 | Celka et al. |
| 2008/0301016 A1 | 12/2008 | Durvasula et al. |
| 2008/0301727 A1 | 12/2008 | Cristofalo et al. |
| 2008/0319889 A1 | 12/2008 | Hammad |
| 2008/0319896 A1 | 12/2008 | Carlson et al. |
| 2009/0006230 A1 | 1/2009 | Lyda et al. |
| 2009/0018986 A1 | 1/2009 | Alcorn et al. |
| 2009/0018996 A1 | 1/2009 | Hunt et al. |
| 2009/0024484 A1 | 1/2009 | Walker et al. |
| 2009/0030776 A1 | 1/2009 | Walker et al. |
| 2009/0037279 A1 | 2/2009 | Chockalingam et al. |
| 2009/0037332 A1 | 2/2009 | Cheung et al. |
| 2009/0043691 A1 | 2/2009 | Kasower |
| 2009/0044246 A1 | 2/2009 | Sheehan et al. |
| 2009/0048957 A1 | 2/2009 | Celano |
| 2009/0048999 A1 | 2/2009 | Gupta et al. |
| 2009/0055287 A1 | 2/2009 | Chin |
| 2009/0055312 A1 | 2/2009 | Chin |
| 2009/0055322 A1 | 2/2009 | Bykov et al. |
| 2009/0055404 A1 | 2/2009 | Heiden et al. |
| 2009/0060343 A1 | 3/2009 | Rosca |
| 2009/0064297 A1 | 3/2009 | Selgas et al. |
| 2009/0076883 A1 | 3/2009 | Kilger et al. |
| 2009/0089190 A1 | 4/2009 | Girulat |
| 2009/0089193 A1 | 4/2009 | Palantin |
| 2009/0089205 A1 | 4/2009 | Bayne |
| 2009/0089869 A1 | 4/2009 | Varghese |
| 2009/0094237 A1 | 4/2009 | Churi et al. |
| 2009/0094640 A1 | 4/2009 | Anderson et al. |
| 2009/0094675 A1 | 4/2009 | Powers |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0112650 A1 | 4/2009 | Iwane |
| 2009/0119116 A1 | 5/2009 | Steen |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0126013 A1 | 5/2009 | Atwood et al. |
| 2009/0132347 A1 | 5/2009 | Anderson et al. |
| 2009/0133058 A1 | 5/2009 | Kouritzin et al. |
| 2009/0157564 A1 | 6/2009 | Cross |
| 2009/0157693 A1 | 6/2009 | Palahnuk |
| 2009/0158030 A1 | 6/2009 | Rasti |
| 2009/0164380 A1 | 6/2009 | Brown |
| 2009/0164582 A1 | 6/2009 | Dasgupta et al. |
| 2009/0164929 A1 | 6/2009 | Chen et al. |
| 2009/0171723 A1 | 7/2009 | Jenkins |
| 2009/0172788 A1 | 7/2009 | Veldula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0177670 A1 | 7/2009 | Grenier et al. |
| 2009/0183259 A1 | 7/2009 | Rinek et al. |
| 2009/0187607 A1 | 7/2009 | Yoo et al. |
| 2009/0198557 A1 | 8/2009 | Wang et al. |
| 2009/0198602 A1 | 8/2009 | Wang et al. |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0217342 A1 | 8/2009 | Nadler |
| 2009/0222380 A1 | 9/2009 | Choudhuri et al. |
| 2009/0222449 A1 | 9/2009 | Hom et al. |
| 2009/0222527 A1 | 9/2009 | Arconati et al. |
| 2009/0228295 A1 | 9/2009 | Lowy |
| 2009/0228918 A1 | 9/2009 | Rolff et al. |
| 2009/0228990 A1 | 9/2009 | Chen et al. |
| 2009/0234665 A1 | 9/2009 | Conkel |
| 2009/0234775 A1 | 9/2009 | Whitney et al. |
| 2009/0234814 A1 | 9/2009 | Boerries et al. |
| 2009/0234876 A1 | 9/2009 | Schigel et al. |
| 2009/0240609 A1 | 9/2009 | Cho et al. |
| 2009/0240624 A1 | 9/2009 | James et al. |
| 2009/0247122 A1 | 10/2009 | Fitzgerald et al. |
| 2009/0248573 A1 | 10/2009 | Haggerty et al. |
| 2009/0249451 A1 | 10/2009 | Su et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0258334 A1 | 10/2009 | Pyne |
| 2009/0260064 A1 | 10/2009 | Mcdowell et al. |
| 2009/0271265 A1 | 10/2009 | Lay et al. |
| 2009/0276368 A1 | 11/2009 | Martin et al. |
| 2009/0280467 A1 | 11/2009 | Ahart |
| 2009/0281816 A1 | 11/2009 | Houga et al. |
| 2009/0288109 A1 | 11/2009 | Downey et al. |
| 2009/0289110 A1 | 11/2009 | Regen et al. |
| 2009/0300066 A1 | 12/2009 | Guo et al. |
| 2009/0300604 A1 | 12/2009 | Barringer |
| 2009/0300641 A1 | 12/2009 | Friedman et al. |
| 2009/0307778 A1 | 12/2009 | Mardikar |

(56) References Cited

U.S. PATENT DOCUMENTS

| | | |
|---|---|---|
| 2009/0313163 A1 | 12/2009 | Wang et al. |
| 2009/0313562 A1 | 12/2009 | Appleyard et al. |
| 2009/0319648 A1 | 12/2009 | Dutta et al. |
| 2009/0327054 A1 | 12/2009 | Yao et al. |
| 2009/0327120 A1 | 12/2009 | Eze et al. |
| 2009/0327270 A1 | 12/2009 | Teevan et al. |
| 2010/0009320 A1 | 1/2010 | Wilkelis |
| 2010/0009332 A1 | 1/2010 | Yaskin et al. |
| 2010/0010935 A1 | 1/2010 | Shelton |
| 2010/0011428 A1 | 1/2010 | Atwood et al. |
| 2010/0023434 A1 | 1/2010 | Bond |
| 2010/0023440 A1 | 1/2010 | Fraser et al. |
| 2010/0023448 A1 | 1/2010 | Eze |
| 2010/0023506 A1* | 1/2010 | Sahni ............ G06F 17/30867 707/E17.014 |
| 2010/0030578 A1 | 2/2010 | Siddique et al. |
| 2010/0030649 A1 | 2/2010 | Ubelhor |
| 2010/0030677 A1 | 2/2010 | Melik-Aslanian et al. |
| 2010/0036697 A1 | 2/2010 | Kelnar |
| 2010/0036769 A1 | 2/2010 | Winters et al. |
| 2010/0037255 A1 | 2/2010 | Sheehan et al. |
| 2010/0042542 A1 | 2/2010 | Rose et al. |
| 2010/0043055 A1 | 2/2010 | Baumgart |
| 2010/0049803 A1 | 2/2010 | Ogilvie et al. |
| 2010/0063942 A1 | 3/2010 | Arnott et al. |
| 2010/0063993 A1 | 3/2010 | Higgins et al. |
| 2010/0077483 A1 | 3/2010 | Stolfo et al. |
| 2010/0082445 A1 | 4/2010 | Hodge et al. |
| 2010/0082476 A1 | 4/2010 | Bowman |
| 2010/0083371 A1 | 4/2010 | Bennetts et al. |
| 2010/0094758 A1 | 4/2010 | Chamberlain et al. |
| 2010/0094768 A1 | 4/2010 | Miltonberger |
| 2010/0094774 A1 | 4/2010 | Jackowitz et al. |
| 2010/0094910 A1 | 4/2010 | Bayliss |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114776 A1 | 5/2010 | Weller et al. |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0138290 A1 | 6/2010 | Zschocke et al. |
| 2010/0145836 A1 | 6/2010 | Baker et al. |
| 2010/0145840 A1 | 6/2010 | Kasower |
| 2010/0153278 A1 | 6/2010 | Farsedakis |
| 2010/0153290 A1 | 6/2010 | Duggan |
| 2010/0161816 A1 | 6/2010 | Kraft et al. |
| 2010/0169159 A1 | 7/2010 | Rose et al. |
| 2010/0174638 A1 | 7/2010 | Debie et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0188684 A1 | 7/2010 | Kumara |
| 2010/0205076 A1 | 8/2010 | Parson et al. |
| 2010/0205662 A1 | 8/2010 | Ibrahim et al. |
| 2010/0211445 A1 | 8/2010 | Bodington |
| 2010/0211636 A1 | 8/2010 | Starkenburg et al. |
| 2010/0214090 A1 | 8/2010 | Sartini et al. |
| 2010/0217837 A1 | 8/2010 | Ansari et al. |
| 2010/0223160 A1 | 9/2010 | Brown |
| 2010/0223184 A1 | 9/2010 | Perlman |
| 2010/0223192 A1 | 9/2010 | Levine et al. |
| 2010/0228658 A1 | 9/2010 | Ketelsen et al. |
| 2010/0229245 A1 | 9/2010 | Singhal |
| 2010/0241535 A1 | 9/2010 | Nightengale et al. |
| 2010/0248681 A1 | 9/2010 | Phills |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250497 A1 | 9/2010 | Redlich et al. |
| 2010/0250509 A1 | 9/2010 | Andersen |
| 2010/0253686 A1 | 10/2010 | Alsbury et al. |
| 2010/0257102 A1 | 10/2010 | Perlman |
| 2010/0257577 A1 | 10/2010 | Grandison et al. |
| 2010/0258623 A1 | 10/2010 | Beemer et al. |
| 2010/0262606 A1 | 10/2010 | Bedolla et al. |
| 2010/0262932 A1 | 10/2010 | Pan |
| 2010/0268557 A1 | 10/2010 | Faith et al. |
| 2010/0274815 A1 | 10/2010 | Vanasco |
| 2010/0280914 A1 | 11/2010 | Carlson |
| 2010/0281020 A1 | 11/2010 | Drubner |
| 2010/0293090 A1 | 11/2010 | Domenikos et al. |
| 2010/0306834 A1 | 12/2010 | Grandison et al. |
| 2010/0312691 A1 | 12/2010 | Johnson, Jr. |
| 2010/0323446 A1 | 12/2010 | Barnett et al. |
| 2010/0325048 A1 | 12/2010 | Carlson et al. |
| 2010/0332393 A1 | 12/2010 | Weller et al. |
| 2011/0004498 A1 | 1/2011 | Readshaw |
| 2011/0016042 A1 | 1/2011 | Cho et al. |
| 2011/0023115 A1 | 1/2011 | Wright |
| 2011/0029388 A1 | 2/2011 | Kendall et al. |
| 2011/0029566 A1 | 2/2011 | Grandison et al. |
| 2011/0035305 A1 | 2/2011 | Imrey et al. |
| 2011/0035315 A1 | 2/2011 | Langley |
| 2011/0035452 A1 | 2/2011 | Gittleman |
| 2011/0035788 A1 | 2/2011 | White et al. |
| 2011/0040629 A1 | 2/2011 | Chiu et al. |
| 2011/0047606 A1 | 2/2011 | Blomquist |
| 2011/0066495 A1 | 3/2011 | Ayloo et al. |
| 2011/0066618 A1 | 3/2011 | Sigurbjornsson et al. |
| 2011/0071950 A1 | 3/2011 | Ivanovic |
| 2011/0078073 A1 | 3/2011 | Annappindi et al. |
| 2011/0083181 A1 | 4/2011 | Nazarov |
| 2011/0107400 A1 | 5/2011 | Shankaranarayanan et al. |
| 2011/0113084 A1 | 5/2011 | Ramnani |
| 2011/0113086 A1 | 5/2011 | Long et al. |
| 2011/0113096 A1 | 5/2011 | Long et al. |
| 2011/0119169 A1 | 5/2011 | Passero et al. |
| 2011/0125924 A1 | 5/2011 | McAleer |
| 2011/0126275 A1 | 5/2011 | Anderson et al. |
| 2011/0131123 A1 | 6/2011 | Griffin et al. |
| 2011/0137760 A1 | 6/2011 | Rudie et al. |
| 2011/0137765 A1 | 6/2011 | Nonaka |
| 2011/0142213 A1 | 6/2011 | Baniak et al. |
| 2011/0143711 A1 | 6/2011 | Hirson et al. |
| 2011/0145122 A1 | 6/2011 | Haggerty et al. |
| 2011/0145899 A1 | 6/2011 | Cao et al. |
| 2011/0148625 A1 | 6/2011 | Velusamy |
| 2011/0164746 A1 | 7/2011 | Nice et al. |
| 2011/0166988 A1 | 7/2011 | Coulter |
| 2011/0167011 A1 | 7/2011 | Paltenghe et al. |
| 2011/0178841 A1 | 7/2011 | Rane et al. |
| 2011/0178899 A1 | 7/2011 | Huszar |
| 2011/0179139 A1 | 7/2011 | Starkenburg et al. |
| 2011/0184780 A1 | 7/2011 | Alderson et al. |
| 2011/0193704 A1 | 8/2011 | Harper et al. |
| 2011/0196791 A1 | 8/2011 | Dominguez |
| 2011/0211445 A1 | 9/2011 | Chen |
| 2011/0213641 A1 | 9/2011 | Metzger, II et al. |
| 2011/0214187 A1 | 9/2011 | Wittenstein et al. |
| 2011/0219421 A1 | 9/2011 | Ullman et al. |
| 2011/0251946 A1 | 10/2011 | Haggerty et al. |
| 2011/0252071 A1 | 10/2011 | Cidon |
| 2011/0264566 A1 | 10/2011 | Brown |
| 2011/0264581 A1 | 10/2011 | Clyne |
| 2011/0270618 A1 | 11/2011 | Banerjee et al. |
| 2011/0270754 A1 | 11/2011 | Kelly et al. |
| 2011/0276396 A1 | 11/2011 | Rathod |
| 2011/0296003 A1 | 12/2011 | McCann et al. |
| 2011/0302653 A1 | 12/2011 | Frantz et al. |
| 2011/0307397 A1 | 12/2011 | Benmbarek |
| 2011/0307434 A1 | 12/2011 | Rostampour et al. |
| 2011/0307957 A1 | 12/2011 | Barcelo et al. |
| 2011/0320582 A1 | 12/2011 | Lewis |
| 2012/0005070 A1 | 1/2012 | McFall et al. |
| 2012/0005542 A1 | 1/2012 | Petersen et al. |
| 2012/0011158 A1 | 1/2012 | Avner et al. |
| 2012/0016948 A1 | 1/2012 | Sinha |
| 2012/0022990 A1 | 1/2012 | Kasower |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0054088 A1 | 3/2012 | Edrington et al. |

(56) References Cited

U.S. PATENT DOCUMENTS

| | | |
|---|---|---|
| 2012/0054592 A1 | 3/2012 | Jaffe et al. |
| 2012/0060105 A1 | 3/2012 | Brown et al. |
| 2012/0066044 A1 | 3/2012 | Honnef et al. |
| 2012/0066065 A1 | 3/2012 | Switzer |
| 2012/0066106 A1 | 3/2012 | Papadimitriou |
| 2012/0072382 A1 | 3/2012 | Pearson et al. |
| 2012/0078932 A1 | 3/2012 | Skurtovich, Jr. et al. |
| 2012/0084866 A1 | 4/2012 | Stolfo |
| 2012/0089438 A1 | 4/2012 | Tavares et al. |
| 2012/0101938 A1 | 4/2012 | Kasower |
| 2012/0101939 A1 | 4/2012 | Kasower |
| 2012/0110467 A1 | 5/2012 | Blake et al. |
| 2012/0110677 A1 | 5/2012 | Abendroth et al. |
| 2012/0124498 A1 | 5/2012 | Santoro et al. |
| 2012/0136763 A1 | 5/2012 | Megdal et al. |
| 2012/0136774 A1 | 5/2012 | Imrey et al. |
| 2012/0144461 A1 | 6/2012 | Rathbun |
| 2012/0151045 A1 | 6/2012 | Anakata et al. |
| 2012/0151046 A1 | 6/2012 | Weiss et al. |
| 2012/0158574 A1 | 6/2012 | Brunzell et al. |
| 2012/0158654 A1 | 6/2012 | Behren et al. |
| 2012/0173339 A1 | 7/2012 | Flynt et al. |
| 2012/0173417 A1 | 7/2012 | Lohman et al. |
| 2012/0185515 A1 | 7/2012 | Ferrel et al. |
| 2012/0195412 A1 | 8/2012 | Smith |
| 2012/0198556 A1 | 8/2012 | Patel et al. |
| 2012/0215682 A1 | 8/2012 | Lent et al. |
| 2012/0215719 A1 | 8/2012 | Verlander |
| 2012/0216125 A1 | 8/2012 | Pierce |
| 2012/0221467 A1 | 8/2012 | Hamzeh |
| 2012/0235897 A1 | 9/2012 | Hirota |
| 2012/0239417 A1 | 9/2012 | Pourfallah et al. |
| 2012/0239497 A1 | 9/2012 | Nuzzi |
| 2012/0246060 A1 | 9/2012 | Conyack, Jr. et al. |
| 2012/0253852 A1 | 10/2012 | Pourfallah et al. |
| 2012/0262472 A1 | 10/2012 | Garr et al. |
| 2012/0265607 A1 | 10/2012 | Belwadi |
| 2012/0271712 A1 | 10/2012 | Katzin et al. |
| 2012/0278217 A1 | 11/2012 | Sui et al. |
| 2012/0278226 A1 | 11/2012 | Kolo |
| 2012/0278767 A1 | 11/2012 | Stibel et al. |
| 2012/0290660 A1 | 11/2012 | Rao et al. |
| 2012/0290740 A1 | 11/2012 | Tewari et al. |
| 2012/0297484 A1 | 11/2012 | Srivastava |
| 2012/0317013 A1 | 12/2012 | Luk et al. |
| 2012/0317014 A1 | 12/2012 | Cerise et al. |
| 2012/0323954 A1 | 12/2012 | Bonalle et al. |
| 2012/0324388 A1 | 12/2012 | Rao et al. |
| 2013/0006843 A1 | 1/2013 | Tralvex |
| 2013/0006844 A1 | 1/2013 | Kremen |
| 2013/0018811 A1 | 1/2013 | Britti et al. |
| 2013/0031109 A1 | 1/2013 | Roulson et al. |
| 2013/0031624 A1 | 1/2013 | Britti et al. |
| 2013/0041798 A1 | 2/2013 | Unger |
| 2013/0054357 A1 | 2/2013 | Mager et al. |
| 2013/0066775 A1 | 3/2013 | Milam |
| 2013/0080467 A1 | 3/2013 | Carson et al. |
| 2013/0085804 A1 | 4/2013 | Leff et al. |
| 2013/0085894 A1 | 4/2013 | Chan et al. |
| 2013/0103571 A1 | 4/2013 | Chung et al. |
| 2013/0110557 A1 | 5/2013 | Kasower |
| 2013/0110565 A1 | 5/2013 | Means et al. |
| 2013/0117072 A1 | 5/2013 | Nish |
| 2013/0117087 A1 | 5/2013 | Coppinger |
| 2013/0125010 A1 | 5/2013 | Strandell |
| 2013/0132151 A1 | 5/2013 | Stibel et al. |
| 2013/0159411 A1 | 6/2013 | Bowen |
| 2013/0173447 A1 | 7/2013 | Rothschild |
| 2013/0173449 A1 | 7/2013 | Ng et al. |
| 2013/0173451 A1 | 7/2013 | Kornegay et al. |
| 2013/0173481 A1 | 7/2013 | Hirtenstein et al. |
| 2013/0185210 A1 | 7/2013 | Dodson et al. |
| 2013/0185293 A1 | 7/2013 | Boback |
| 2013/0187923 A1 | 7/2013 | Yoshimoto et al. |
| 2013/0204762 A1 | 8/2013 | Harris et al. |
| 2013/0205135 A1 | 8/2013 | Lutz |
| 2013/0211986 A1 | 8/2013 | Debie et al. |
| 2013/0218638 A1 | 8/2013 | Kilger et al. |
| 2013/0218751 A1 | 8/2013 | Chaudhuri et al. |
| 2013/0262226 A1 | 10/2013 | LaChapelle et al. |
| 2013/0267171 A1 | 10/2013 | Sarkar et al. |
| 2013/0278515 A1 | 10/2013 | Kikuchi |
| 2013/0279676 A1 | 10/2013 | Baniak et al. |
| 2013/0293363 A1 | 11/2013 | Plymouth |
| 2013/0297499 A1 | 11/2013 | Mukherjee |
| 2013/0298238 A1 | 11/2013 | Shah et al. |
| 2013/0332341 A1 | 12/2013 | Papadimitriou |
| 2013/0332342 A1 | 12/2013 | Kasower |
| 2013/0339249 A1 | 12/2013 | Weller et al. |
| 2013/0347059 A1 | 12/2013 | Fong et al. |
| 2014/0012733 A1 | 1/2014 | Vidal |
| 2014/0012737 A1 | 1/2014 | Evans |
| 2014/0019348 A1 | 1/2014 | Daley |
| 2014/0032265 A1 | 1/2014 | Paprocki et al. |
| 2014/0032300 A1 | 1/2014 | Zhang et al. |
| 2014/0032723 A1 | 1/2014 | Nema |
| 2014/0046872 A1 | 2/2014 | Arnott et al. |
| 2014/0061302 A1 | 3/2014 | Hammad |
| 2014/0074689 A1 | 3/2014 | Lund et al. |
| 2014/0089166 A1 | 3/2014 | Padawer |
| 2014/0089167 A1 | 3/2014 | Kasower |
| 2014/0089191 A1 | 3/2014 | Brown |
| 2014/0096249 A1 | 4/2014 | Dupont et al. |
| 2014/0098229 A1 | 4/2014 | Lu et al. |
| 2014/0110477 A1 | 4/2014 | Hammad |
| 2014/0129942 A1 | 5/2014 | Rathod |
| 2014/0156500 A1 | 6/2014 | Lassen et al. |
| 2014/0156501 A1 | 6/2014 | Howe |
| 2014/0156503 A1 | 6/2014 | Lassen et al. |
| 2014/0164112 A1 | 6/2014 | Kala |
| 2014/0164398 A1 | 6/2014 | Smith et al. |
| 2014/0164519 A1 | 6/2014 | Shah |
| 2014/0180919 A1 | 6/2014 | Brown |
| 2014/0181285 A1 | 6/2014 | Stevens et al. |
| 2014/0258083 A1 | 9/2014 | Achanta et al. |
| 2014/0258084 A1 | 9/2014 | Padawer et al. |
| 2014/0279329 A1 | 9/2014 | Dancel |
| 2014/0279382 A1 | 9/2014 | Drakeley et al. |
| 2014/0279391 A1 | 9/2014 | Gallo et al. |
| 2014/0298485 A1 | 10/2014 | Gardner |
| 2014/0310151 A1 | 10/2014 | Shishkov et al. |
| 2014/0317023 A1 | 10/2014 | Kim |
| 2014/0379554 A1 | 12/2014 | Grossman et al. |
| 2015/0026060 A1 | 1/2015 | Krietzman et al. |
| 2015/0127490 A1 | 5/2015 | Puertas |
| 2015/0134506 A1 | 5/2015 | King et al. |
| 2015/0178829 A1 | 6/2015 | Weiss |
| 2015/0310543 A1 | 10/2015 | DeBie |
| 2015/0324920 A1 | 11/2015 | Wilson et al. |
| 2015/0326580 A1 | 11/2015 | McMillan et al. |
| 2016/0154859 A1 | 6/2016 | Skurtovich, Jr. et al. |
| 2017/0132700 A1 | 5/2017 | Kazerani et al. |
| 2017/0200223 A1 | 7/2017 | Kasower |

FOREIGN PATENT DOCUMENTS

| | | |
|---|---|---|
| EP | 0 542 298 | 5/1993 |
| EP | 0 749 081 | 12/1996 |
| EP | 1 077 419 | 2/2001 |
| EP | 1 122 664 | 8/2001 |
| EP | 1 239 378 | 9/2002 |
| EP | 1 301 887 | 4/2003 |
| EP | 1 591 931 | 11/2005 |
| EP | 1 850 278 | 10/2007 |
| EP | 2 088 743 | 8/2009 |
| EP | 2 151 793 | 2/2010 |
| GB | 2 102 606 | 2/1983 |
| JP | 10-222559 | 8/1998 |
| JP | 10-261009 | 9/1998 |
| JP | 2000-331068 | 11/2000 |
| JP | 2001-297141 | 10/2001 |
| JP | 2001-344463 | 12/2001 |
| JP | 2001-357256 | 12/2001 |
| JP | 2002-149778 | 5/2002 |

(56) References Cited

FOREIGN PATENT DOCUMENTS

| | | |
|---|---|---|
| JP | 2002-163498 | 6/2002 |
| JP | 2002-259753 | 9/2002 |
| JP | 2003-271851 | 9/2003 |
| JP | 2003-316881 | 11/2003 |
| JP | 2005-208945 | 8/2005 |
| KR | 10-2000-0036594 | 7/2000 |
| KR | 10-2000-0063313 | 11/2000 |
| KR | 10-2000-0063995 | 11/2000 |
| KR | 10-2001-0016349 | 3/2001 |
| KR | 10-2001-0035145 | 5/2001 |
| KR | 10-2002-0007132 | 1/2002 |
| KR | 10-2002-0039203 | 5/2002 |
| KR | 10-2004-0078798 | 9/2004 |
| KR | 10-2007-0081504 | 8/2007 |
| TW | 256569 | 6/2006 |
| WO | WO 91/16691 | 10/1991 |
| WO | WO 97/023838 | 7/1997 |
| WO | WO 99/004350 | 1/1999 |
| WO | WO 00/051052 | 8/2000 |
| WO | WO 00/055778 | 9/2000 |
| WO | WO 01/009752 | 2/2001 |
| WO | WO 01/009792 | 2/2001 |
| WO | WO 01/025896 | 4/2001 |
| WO | WO 01/075754 | 10/2001 |
| WO | WO 01/084281 | 11/2001 |
| WO | WO 02/029636 | 4/2002 |
| WO | WO 03/101123 | 12/2003 |
| WO | WO 2004/031986 | 4/2004 |
| WO | WO 2004/114160 | 12/2004 |
| WO | WO 2005/010683 | 2/2005 |
| WO | WO 2005/033979 | 4/2005 |
| WO | WO 2006/050278 | 5/2006 |
| WO | WO 2006/069199 | 6/2006 |
| WO | WO 2007/084555 | 7/2007 |
| WO | WO 2007/149941 | 12/2007 |
| WO | WO 2008/021104 | 2/2008 |
| WO | WO 2008/022289 | 2/2008 |
| WO | WO 2008/042614 | 4/2008 |
| WO | WO 2008/054403 | 5/2008 |
| WO | WO 2009/064694 | 5/2009 |
| WO | WO 2009/064840 | 5/2009 |
| WO | WO 2009/102391 | 8/2009 |
| WO | WO 2009/117518 | 9/2009 |
| WO | WO 2009/132114 | 10/2009 |
| WO | WO 2010/001406 | 1/2010 |
| WO | WO 2010/062537 | 6/2010 |
| WO | WO 2010/077989 | 7/2010 |
| WO | WO 2010/132492 | 11/2010 |
| WO | WO 2010/150251 | 12/2010 |
| WO | WO 2011/005876 | 1/2011 |
| WO | WO 2014/018900 | 1/2014 |

OTHER PUBLICATIONS

"Fraud Alert | Learn How". Fight Identity Theft. http://www.fightidentitytheft.com/flag.html, accessed on Nov. 5, 2009.
Kaushik, Nishant, "The Epic Hacking of Mat Honan and Our Identity Challenge," Aug. 7, 2012, http://blog.talkingidentity.com/2012/08/the-epic-hacking-of-mat-honan-and-our-identity-challenge.html.
LifeLock, "Personal Identity Theft Protection & Identity Theft Products," http://www.lifelock.com/lifelock-for-people, accessed Nov. 5, 2007.
Mannan et al., "Mercury: Recovering Forgotten Passwords Using Personal Devices*", Dec. 17, 2011, Pre-Proceedings of Financial Cryptography and Data Security 2011, pp. 1-16.
Pinola, Melanie, "How Can I Protect Against Social Engineering Hacks?" Aug. 9, 2012, http://lifehacker.com/5933296/how-can-i-protect-against-hackers-who-use-sneaky-social-engineering-techniques-to-get-into-my-accounts.
Reppler.com, "Learn More: Basic Information about how TrustedID Reppler Works for You," www.reppler.com/learn/ printed Oct. 24, 2012 in 2 pages.
Schmidt et al., "A Set of Multi-Touch Graph Interaction Techniques", ITS '10, Nov. 7-10, 2010, Saarbrucken, Germany, pp. 1-4.
Sealey, Geraldine, "Child ID Theft Can Go Unnoticed for Years", http://abcnews.go.com/US/story?id=90257, Sep. 12, 2003 in 9 pages.
TheMorningCall.Com, "Cheap Ways to Foil Identity Theft," www.mcall.com/business/columnists/all-karp.5920748jul01.0 . . . , published Jul. 1, 2007.
Thompson, Herbert H., "How I Stole Someone's Identity", https://www.scientificamerican.com/article/anatomy-of-a-social-hack/#, Aug. 18, 2008, pp. 5.
Todorova, Aleksandra, "Protecting Your Child's Identity", Smart Money, Published Aug. 2, 2007, pp. 1-5.
U.S. Appl. No. 14/077,090, U.S. Pat. No. 9,654,541, Aggregating User Web Browsing Data, filed Nov. 11, 2013.
U.S. Appl. No. 12/705,489, filed Feb. 12, 2010, Bargoli et al.
U.S. Appl. No. 12/705,511, filed Feb. 12, 2010, Bargoli et al.
"Accenture Launches Media Audit and Optimization Service to Help U.S. Companies Measure Return on Investment in Advertising," Business Wire, May 22, 2006, 2 pages, http://findarticles.com/p/articles/mi_m0EIN/is_2006_May_22/ai_n16374159.
"Accenture Newsroom: Accenture Completes Acquisition of Media Audits: Acquisition Expands Company's Marketing Sciences and Data Services Capabilities," accenture.com, Dec. 12, 2005, 2 pages, http://accenture.tekgroup.com/article_display.cfm?article_id=428.
Actuate, "Delivering Enterprise Information for Corporate Portals", White Paper, 2004, pp. 1-7.
"Aggregate and Analyze Social Media Content: Gain Faster and Broader Insight to Market Sentiment," SAP Partner, Mantis Technology Group, Apr. 2011, pp. 4.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.
"Atlas on Demand, Concurrent, and Everstream Strike Video-On-Demand Advertising Alliance", www.atlassolutions.com, Jul. 13, 2006, 3 pages.
"Arbitron 2006 Black Consumers," Arbitron Inc., lvtsg.com, Jul. 8, 2006, 2 pages, http://www.lvtsg.com/news/publish/Factoids/article_3648.shtml.
"Atlas on Demand and C-COR Join Forces to Offer Advertising Management Solution for on Demand TV: Global Provider of on Demand Systems Partners with Atlas to Develop and Market Comprehensive VOD Advertising Solution," www.atlassolutions.com, Jul. 25, 2005, 3 pages.
"Atlas on Demand and Tandberg Television Join Forces to Enhance Dynamic Ad Placement for On-Demand Television: Combined End-to End Solution to Provide Media Buying and Selling Communities with New Tools for Dynamic Advertising that Eliminate Technical Bar" Jun. 22, 2006—3 pages, http://www.atlassolutions.com/news_20060622.aspx.
ABC News Now:Money Matters, as broadcasted Nov. 15, 2005 with guest Todd Davis (CEO of Lifelock), pp. 6.
Adzilla, Press Release, "ZILLACASTING Technology Approved and Patent Pending," http://www.adzilla.com/newsroom/pdf/patent_051605.pdf, May 16, 2005, pp. 2.
AFX New Limited—AFX International Focus, "Nielsen moving to measure off-TV viewing," Jun. 14, 2006, 1 page.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Anonymous, "Feedback", Credit Management, ABI/Inform Global, Sep. 2006, pp. 6.
Awoonor-Williams, Princess Josephine, Ph.D. "Gender and Credit: An Analysis of Women's Experience in the Credit Market", ProQuest Dissertations and Theses, 2004, pp. 148.

(56) References Cited

OTHER PUBLICATIONS

Bachman, Katy, "Arbitron, VNU Launch Apollo Project," mediaweek.com Jan. 17, 2006, 3 pages, http://www.mediaweek.com/mw/search/article_display.jsp?schema=&vnu_content_id=1001847353.
BackupBox, http://mybackupbox.com printed Feb. 8, 2013 in 2 pages.
"Beware of 'Who Viewed My Profile' Apps on Facebook" Tech for Luddites, Mar. 15, 2010 printed Sep. 27, 2013 http://www.techforluddites.com/2010/03/beware-of-who-viewed-my-profile-apps-on-facebook.html.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
Buxfer, http://www.buxfer.com/ printed Feb. 5, 2014 in 1 page.
"Cable Solution Now, The Industry Standard for Information Management: Strata's TIM.net Crosses Important Threshold Dominant Solution for All Top 20 TV Markets," stratag.com, Apr. 28, 2006, 1 page, http://stratag.com/news/cablepress042806.html.
Check, http://check.me/ printed Feb. 5, 2014 in 3 pages.
Chores & Allowances, "Do Kids Have Credit Reports?" Oct. 15, 2007, http://choresandallowances.blogspot.com/2007/10/do-kids-have-credit-reports.html, pp. 5.
"Claritas Forms Life Insurance Consortium with Worldwide Financial Services Association: Initiative with LIMRA International is First of its Kind to Provide Actual Sales Information at Small Geographic Areas," Feb. 9, 2006, 3 pages, http://www.claritas.com/claritas/Default/jsp?ci=5&si=1&pn=limra.
"Claritas Introduces PRIZM NE Consumer Electronic Monitor Profiles: New Information Product Provides Insight Into the Public's Purchasing Behaviors of Consumer Electronics," May 30, 2006, 3 pages.
Comlounge.net, "plonesocial.auth.rpx" http://web.archive.org/web/20101026041841/http://comlounge.net/rpx as captured Oct. 26, 2010 in 9 pages.
CreditKarma, http://www.creditkarma.com printed Feb. 8, 2013 in 2 pages.
CreditSesame, http://www.creditsesame.com/how-it-works/our-technology/ printed Feb. 5, 2013 in 2 pages.
Click Z, "ISPs Collect User Data for Behavioral Ad Targeting," dated Jan. 3, 2008, printed from http://www.clickz.com/showPage.html?page=clickz Apr. 16, 2008.
CNET news.com, "Target me with your ads, please," dated Dec. 5, 2007, printed from http://www.news.com/2102-1024_3-6221241.html?tag+st.util.print Mar. 18, 2008.
Collins, Michael J., "Exploring the Design of Financial Counseling for Mortgage Borrowers in Default," Journal of Family and Economic Issues, Springer Science+Business Media, Mar. 13, 2007, pp. 207-226.
"Consumers Gain Immediate and Full Access to Credit Score Used by Majority of U.S. Lenders", PR Newswire, ProQuest Copy, Mar. 19, 2001, p. 1.
Creamer, Matthew; Consulting in marketing; Accenture, Others Playing Role in Firms' Processes, Crain 's Chicago Business, Jun. 12, 2006, 2 pages.
"CreditCheck Monitoring Services," Dec. 11, 2000, pp. 1, lines 21-23.
"Credit Improvement", CreditRepair.com, Mar. 10, 2010, http://web.archive.org/web/20100310134914/http://www.creditrepair.com/credit/, as archived Mar. 10, 2010 in 2 pages.
Credit Plus, Inc., "Score Wizard", http://web.archive.org/web/20030806080310/www.creditplus.com/scorewizard.asp, as archived Aug. 6, 2003 in 1 page.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
"Data Loss Prevention (DLP) Software", http://www.symantec.com/data-loss-prevention/ printed Apr. 8, 2013 in 8 pages.
"Data Protection", http://compliantprocessing.com/data-protection/ printed Apr. 8, 2013 in 4 pages.
Day, Jo and Kevin; "ID-ology: A Planner's Guide to Identity Theft"; Journal of Financial Planning:Tech Talk; pp. 36-38; Sep. 2004.
"Debt Settlement: Watch Video on how to Pay Your Debt Faster", http://www.debtconsolidationcare.com/debt-settlement.html printed Jan. 9, 2013 in 6 pages.
Delany et al., "Firm Mines Offline Data to Target Online", http://web.archive.org/web/20071117140456/http://www.commercialalert.org/news/archive/2007/10/firm-mines-offline-data-to-target-online-ads, Commercial Alert, Oct. 17, 2007, pp. 3.
Demby, Elayne, "Special Report: Letting Consumers Know the Score—and More", Collections and Credit Risk, New York, Feb. 2003, vol. 8, Issue 2, p. 53, pp. 3.
demographicsnow.com, sample reports, "Age Rank Report", Jul. 17, 2006, 3 pages.
demographicsnow.com, sample reports, "Consumer Expenditure Summary Report", Jul. 17, 2006, 3 pages.
demographicsnow.com, sample reports, "Income Comparison Report", Jul. 17, 2006, 4 pages.
"Disputes in Cyberspace 2001: Update of online dispute resolution for consumers in cross-border disputes", Consumers International, Nov. 2001, pp. 45, http://web.archive.org/web/20160414183303/http://www.consumersinternational.org/media/304196/disputes%20in%20cyberspace%202001.%20update%20of%20online%20dispute%20resolution%20for%20consumers%20in%20cross-border%20disputes..pdf.
Elangovan, A.R., "Managerial Third-Party Dispute Intervention: A Prescriptive Model of Strategy Selection", Academy of Management, Oct. 1, 1995, vol. 20, No. 4, pp. 800-830.
Elliehausen et al., The Impact of Credit Counseling on Subsequent Borrower Behavior, The Journal of Consumer Affairs, Summer 2007, vol. 41, No. 1, pp. 1-28.
"Epsilon Leads Discussion on Paradigm Shift in TV Advertising," epsilon.com, Jun. 24, 2004, 2 pages, http://www.epsilon.com/who-pr_tvad040624.html.
Equifax Consumer Credit Report http://www.equifax.com/home/, as retrieved on Sep. 17, 2008.
Equifax; "Equifax Credit Watch"; https://www.econsumer.equifax.co.uk/consumer/uk/sitepage.ehtml, dated Jun. 27, 2007 on www.archive.org.
"Equifax: Debt Wise™ Credit Monitoring Service," Product Review, http://www.mdmproofing.com/iym/reviews/equifax/debt-wise/, Jan. 2010, pp. 11.
Equifax; "Places", http://web.archive.org/web/20111111113930/http://www.equifax.com/places as archived Nov. 11, 2011 in 1 page.
Equifax; "Places", http://www.equifax.com/places/ as printed Nov. 16, 2015 in 1 page.
Equifax; "Welcome to Equifax Mobile", http://www.equifax.com/mobile/ as printed Mar. 18, 2011 in 2 pages.
Ettorre, "Paul Kahn on Exceptional Marketing," Management Review, vol. 83, No. 11, Nov. 1994, pp. 48-51.
Experian Consumer Credit Report http://www.experian.com/, as retrieved on Sep. 17, 2008.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directory.westlaw.com/scope/default.asp?db=FBN-ALL&RS-W...&VR=2.0 as printed Dec. 17, 2009, pp. 5.
Fisher, Joseph, "Access to Fair Credit Reports: Current Practices and Proposed Legislation," American Business Law Journal, Fall 1981, vol. 19, No. 3, p. 319.

(56) References Cited

OTHER PUBLICATIONS

Fitzpatrick, Alex, "Facebook Monitors Your Chats for Criminal Activity [Report]," Mashable, Jul. 12, 2012 printed Sep. 27, 2013 http://mashable.com/2012/07/12/facebook-scanning-chats/.
Frontporch, "Ad Networks—Partner with Front Porch!," www.frontporch.com printed Apr. 2008 in 2 pages.
Frontporch, "New Free Revenue for Broadband ISPs!", http://www.frontporch.com/html/bt/FPBroadbandISPs.pdf printed May 28, 2008 in 2 pages.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
Gibbs, Adrienne; "Protecting Your Children from Identity Theft," Nov. 25, 2008, http://www.creditcards.com/credit-card-news/identity-ID-theft-and-kids-children-1282.php, pp. 4.
"GLBA Compliance and FFIEC Compliance" http://www.trustwave.com/financial-services.php printed Apr. 8, 2013 in 1 page.
Gordon et al., "Identity Fraud: A Critical National and Global Threat," LexisNexis, Oct. 28, 2003, pp. 1-48.
"Guide to Benefits, MasterCard® Cardholder Smart Shopper Benefits", May 2005, pp. 10.
Halliday, Jean, "Ford Recruits Accenture for Marketing Plan," Automotive News Feb. 13, 2006, 2 pages, Crain Communications.
Helm, Burt, "Nielsen's New Ratings Yardstick," businessweek.com, Jun. 20, 2006, 3 pages, http://www.businessweek.com/technology/content/jun2006/tc20060620_054223.htm.
Herzberg, Amir, "Payments and Banking with Mobile Personal Devices," Communications of the ACM, May 2003, vol. 46, No. 5, pp. 53-58.
Hojoki, http://hojoki.com printed Feb. 8, 2013 in 5 pages.
Hinman, Donald P., "The Perfect Storm: Response Metrics and Digital TV," chiefmarketer.com, May 17, 2006, 2 pages, http://www.chiefmarketer.com/crm_loop/roi/perfect-storm-051706/index.html.
Hoofnagle, Chris Jay, "Identity Theft: Making the Known Unknowns Known," Harvard Journal of Law & Technology, Fall 2007, vol. 21, No. 1, pp. 98-122.
Hunt, Robert M.; Whither Consumer Credit Counseling? Business Review, Dec. 31, 2005, pp. 9-20.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
Ideon, Credit-Card Registry that Bellyflopped this Year, Is Drawing some Bottom-Fishers, The Wall Street Journal, Aug. 21, 1995, pp. C2.
IFTTT, "About IFTTT," http://ifttt.com/wtf printed Feb. 18, 2013 in 4 pages.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Information Resources, Inc. and Navic Networks Form Joint Relationship to Support Next Generation of Technology for Advertising Testing, IRI Expands BehaviorScan® Solution to Meet Digital and On-demand Needs, Feb. 27, 2006, http://us.infores.com/page/news/pr/pr_archive?mode=single&pr_id=117, printed Oct. 4, 2007 in 2 pages.
Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
Irby, LaToya, "How Will a Late Payment Hurt My Credit Score?" http://web.archive.org/web/20101024113603/http://credit.about.com/od/creditscorefaq/f/how-late-payment-affects-credit-score.htm, Oct. 24, 2010, pp. 1.
"IRI and Acxiom Introduce More Efficient and Actionable Approach to Consumer Segmentation and Targeted Marketing," eu-marketingportal.de, Jan. 26, 2006, 2 pages, http://www.eu-marketingportal.de.
"Japan's JAAI system appraises used cars over internet", Asia Pulse, Mar. 3, 2000.
"Judging Credit: Consumers Need Better Finance Tools", News Journal, Daytona Beach, FL, Dec. 28, 2002.
Khan, Mickey Alam, "Equifax Recognizes Changing Customer Behavior with Four-Pronged Mobile Strategy", Mobile Marketer, http://web.archive.org/web/20151117005818/http://www.mobilemarketer.com/cms/news/strategy/9733.html, Apr. 19, 2011 in 10 pages.
Lan, Joe, "The Top Portfolio Management Software," http://www.aaii.com/computerizedinvesting/article/the-top-portfolio-management-software, Includes Discussion thread, Fourth Quarter 2011, pp. 17.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lauwers et al., "Five Hundred Years of Bookkeeping: A Portrait of Luca Pacioli", Tijdschrift voor Economie en Management, 1994, vol. 39. No. 3, pp. 289-304.
Lee, W.A.; "Experian, on Deal Hunt, Nets Identity Theft Insurer", American Banker: The Financial Services Daily, Jun. 4, 2003, New York, NY, 1 page.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
LifeLock, http://web.archive.org/web/20110724011010/http://www.lifelock.com/? as archived Jul. 24, 2011 in 1 page.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, Various Pages, www.lifelock.com/, 2007.

(56) References Cited

OTHER PUBLICATIONS

Littwin, Angela, "Beyond Usury: A Study of Credit-Card Use and Preference Among Low-Income Consumers", Texas Law Review, vol. 86, No. 3, pp. 451-506; Feb. 2008.
Lobo, Jude, "MySAP.com Enterprise Portal Cookbook," SAP Technical Delivery, Feb. 2002, vol. 1, pp. 1-13.
Loshin, Intelligent Enterprise: Better Insight for Business Decisions, "Value-Added Data: Merge Ahead", Feb. 9, 2000, vol. 3, No. 3, 5 pages.
Lund, Graham, "Credit Bureau Data: Maximizing the Benefits," Credit Management, May 2004, ProQuest Central, pp. 44-45.
Magid, Lawrence, J., Business Tools: When Selecting an ASP Ensure Data Mobility, Los Angeles Times, Los Angeles, CA, Feb. 26, 2001, vol. C, Issue 4, pp. 3.
"Managing Debt?" Federal Trade Commission: Consumer Information, http://www.consumer.ftc.gov/articles/0158-managing-debt, printed Mar. 22, 2013 in 4 pages.
Manilla, http://www.manilla.com/how-it-works/ printed Feb. 5, 2014 in 1 page.
"Mediamark Research Inc. Releases Findings From Mobile Marketing Consumer Study; Outback Steakhouse and Royal Caribbean Cruise Lines Among Brands Participating in Mobile Marketing Research," www.thefreelibrary.com, May 9, 2006, 4 pages.
Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Miller, Joe, "NADA used-car prices go online", Automotive News, Jun. 14, 1999, p. 36.
Mint.com, http://www.mint.com/ printed Sep. 18, 2008 in 2 pages.
Mint.com, http://www.mint.com/how-it-works/ printed Feb. 5, 2013 in 2 pages.
Morrissey, Brian, "Aim High: Ad Targeting Moves to the Next Level", Adweek, dated Jan. 21, 2008 as downloaded from http://www.adweek.com/aw/magazine/article_display.isp?vnu on Apr. 16, 2008.
Mover, "One API for the Cloud," http://mover.io printed Feb. 6, 2013 in 3 pages.
MS Money Software by Microsoft http://www.microsoft.com/Money/default.mspx as retrieved on Sep. 17, 2008.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
MyRatePlan.com, "Cell Phone Buying Guide", http://web.archive.org/web/20061116103256/http://myrateplan.com/cell_phone_buying_guide/family_plans/, as archived Nov. 16, 2006 in 2 pages.
MyReceipts, http://www.myreceipts.com/, printed Oct. 16, 2012 in 1 page.
MyReceipts—How it Works, http://www.myreceipts.com/howItWorks.do, printed Oct. 16, 2012 in 1 page.
"Name Availability Records", Westlaw Database Directory, http://directory.westlaw.com/scope/default.asp?db=NA-ALL&RS=W...&VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
NebuAd, "Venture Capital: What's New—The Latest on Technology Deals From Dow Jones VentureWire", Press Release, http://www.nebuad.com/company/media_coverage/media_10_22_07.php, Oct. 22, 2007, pp. 2.
"New for Investors: Asset Allocation, Seasoned Returns and More," Prosper, http://blog.prosper.com/2011/10/27/new-for-investors-asset-allocation-seasoned-returns-and-more/, pp. 4.
Next Card: About Us, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Organizing Maniac's Blog—Online Receipts Provided by MyQuickReceipts.com, http://organizingmaniacs.wordpress.com/2011/01/12/online-receipts-provided-by-myquickreceipts.com/ dated Jan. 12, 2011 printed Oct. 16, 2012 in 3 pages.
Otixo, "Your Dashboard for the Cloud," http://Otixo.com/product printed Feb. 6, 2013 in 3 pages.
Paustian, Chuck, "Every Cardholder a King Customers get the Full Treatment at Issuers' Web Sites," Card Marketing, New York, Mar. 2001, vol. 5, No. 3, pp. 4.
Peltier, Jon, "Conditional Formatting of Excel Charts", Peltier Tech Blog, as posted Feb. 13, 2012, http://peltiertech.com/conditional-formatting-of-excel-charts/, pp. 1-5.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Phorm, "BT PLC TalkTalk and Virgin Media Inc. confirm exclusive agreements with Phorm", Press Release, http://www.phorm.com/about/launch_agreement.php, Feb. 14, 2008, pp. 2.
Phorm, "The Open Internet Exchange, 'Introducing the OIX'", http://www.phorm.com/oix/ printed May 29, 2008 in 1 page.
Pipes, http://pipes.yahoo.com/pipes printed Feb. 18, 2013 in 1 page.
Planet Receipt—Home, http://www.planetreceipt.com/home printed Oct. 16, 2012 in 1 page.
Planet Receipt—Solutions & Features, http://www.planetreceipt.com/solutions-features printed Oct. 16, 2012 in 2 pages.
Planwise, http://planwise.com printed Feb. 8, 2013 in 5 pages.
Predictive Behavioral Targeting http://www.predictive-behavioral-targeting.com/index.php.Main_Page as printed Mar. 28, 2008 in 4 pages.
"PremierGuide Announces Release 3.0 of Local Search Platform", Business Wire, Mar. 4, 2004, Palo Alto, CA, p. 5574.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Primadesk, http://primadesk.com printed Feb. 8, 2013 in 1 page.
PrivacyGuard, http://web.archive.org/web/20110728114049/http://www.privacyguard.com/ as archived Jul. 28, 2011 in 1 page.
Privacy Rights Clearinghouse, "Identity Theft: What to do if it Happens to You," http://web.archive.org/web/19990218180542/http://privacyrights.org/fs/fs17a.htm printed Feb. 18, 1999.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.

(56) References Cited

OTHER PUBLICATIONS

Quicken Online by Intuit http://www.quicken.intuit.com/, as retrieved on Sep. 17, 2008.
"Quicken Support", http://web.archive.org/web/20071231040130/http://web.intuit.com/support/quicken/docs/d_qif.html as archived Dec. 31, 2007 in 6 pages.
Ramaswamy, Vinita M., Identity-Theft Toolkit, The CPA Journal, Oct. 1, 2006, vol. 76, Issue 10, pp. 66-70.
RAP Interactive, Inc. and Web Decisions: Proudly Presents Live Decisions, A Powerful New Information and Technology Resource that Revolutionizes Interactive Marketing, downloaded from www.webdecisions.com/pdf/LiveDecisions_Bro.pdf, as printed on Aug. 13, 2007.
Rawe, Julie; "Identity Thieves", Time Bonus Section, Inside Business, Feb. 2002, pp. 2.
Reinbach, Andrew; MCIF aids banks in CRA Compliance, Bank Systems & Technology, Aug. 1995, vol. vol. 32, Issue No. 8, Pages pp. 27.
Repici et al., "The Comma Separated Value (CSV) File Format", http://creativyst.com/Doc/Articles/CSV/CSV01.htm, Creativyst, Inc., 2002, pp. 10.
"Resolve Debt for Less: With Help from Freedom Financial" http://www.debtsettlementusa.com/ printed Jan. 9, 2013 in 6 pages.
Rodgers, Zachary, "ISPs Collect User Data for Behavioral Ad Targeting", ClickZ, www.clickz.com/showPage.html?page=clickz, Jan. 3, 2008, pp. 3.
Romig, Shane, "The Truth About Credit Repair", Credit.com, May 5, 2010, http://web.archive.org/web/20100505055526/http://www.credit.com/credit_information/credit_help/The-Truth-About-Credit-Repair.jsp printed Mar. 22, 2013 in 4 pages.
Rosset et al., "Wallet Estimation Models", IBM TJ Watson Research Center, 2005, Yorktown Heights, NY, pp. 12.
Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Sawyers, Arlena, "NADA to Offer Residual Guide", Automotive News, May 22, 2000, p. 3.
Sax, Michael M., Data Collection and Privacy Protection: An International Perspective, Presentation: Managing Online Risk and Liability Conference, Aug. 31, 1999, pp. 58.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Screenshot for Investment Account Manager v.2.8.3, published at http://www.aaii.com/objects/get/1642.gif by at least Aug. 30, 2011 in 1 page.
"Settling Your Debts—Part 1 in Our Debt Settlement Series", http://www.creditinfocenter.com/debt/settle_debts.shtml printed Jan. 9, 2013 in 6 pages.
Shin, Laura, "See an Error on Your Credit Report? Credit Karma Now Makes It Easy to Dispute", Nov. 12, 2015, http://www.forbes.com/sites/laurashin/2015/11/12/see-an-error-on-your-credit-report-credit-karma-now-makes-it-easy-to-dispute/, pp. 4.
ShoeBoxed, https://www.shoeboxed.com/sbx-home/ printed Oct. 16, 2012 in 4 pages.
Simpson, Glyn, "Microsoft (MS) Money (MSMoney FAQ, Help and Information Pages", pp. 2, Copyright © Glyn Simpson 1998-2007, http://web.archive.org/web/20071018075531/http://money.mvps.org/faq/article/196.aspx.
Singletary, Michelle, "The Littlest Victims of ID Theft", The Washington Post, The Color of Money, Oct. 4, 2007.
"SRC Announces Free Dashups to Mashups Adding Geographic Business Intelligence at Web Speed to the Enterprise on www.FreeDemographics.com/API," directionsmag.com, Jun. 12, 2006, 3 pages, http://www.directionsmag.com/press.releases/index.php?duty=Show&id=1.
"SRC Delivers Industry's First Drive Time Engine Developed to Follow Actual Road Networks," thomasnet.com, May 21, 2006, 4 pages, http://news.thomasnet.com/companystory/485722.
Stauffer et al., "Using HTML 3.2," Second Edition, 1996, Que Publishing, pp. 192-193.
Storage Made Easy(SME), http://storagemadeeasy.com printed Feb. 6, 2013 in 1 page.
Tajik, S., "Conditional Plotting, Changing Color of Line Based on Value", MathWorks®, MATLAB Answers™, Question Posted Feb. 10, 2011 to https://www.mathworks.com/matlabcentral/answers/1156-conditional-plotting-changing-color-of-line-based-on-value?requestedDomain=www.mathworks.com, pp. 8.
Tao, Lixin, "Shifting Paradigms with the Application Service Provider Model"; Concordia University, IEEE, Oct. 2001, Canada.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion Consumer Credit Report http://www.transunion.com/, as retrieved on Sep. 17, 2008.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
UPI, "Nielsen Media Research goes electronic," Jun. 14, 2006, 1 page.
US Legal, Description, http://www.uslegalforms.com/us/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
"VOD Integration Now Available in Strata: Buyers / Sellers Benefit from VOD Component on Popular Platform," stratag.com, Feb. 21, 2006, 1 page, http://www.stratag.com/news/mediapress022106.html.
Waggoner, Darren J., "Having a Global Identity Crisis," Collections & Credit Risk, Aug. 2001, vol. vol. 6, No. 8, pp. 6.
"WashingtonPost.com and Cars.com launch comprehensive automotive web site for the Washington area", PR Newswire, Oct. 22, 1998.
Wesabe.com http://www.wesabe.com/, as retrieved on Sep. 17, 2008.
Whitney, Daisy; Atlas Positioning to Shoulder VOD Ads; Campaign Management Tools Optimize Inventory, TelevisionWeek, May 23, 2005, 3 pages.
Yahoo! Search, "People Search," http://people.yahoo/com printed Nov. 16, 2010 in 1 page.
Yodlee | Money Center, https://yodleemoneycenter.com/ printed Feb. 5, 2014 in 2 pages.
You Need a Budget, http://www.youneedabudget.com/features printed Feb. 5, 2014 in 3 pages.
Zapier, "Integrate Your Web Services," http://www.Zapier.com printed Feb. 18, 2013 in 3 pages.
International Search Report and Written Opinion for Application No. PCT/US2007/021815, dated Sep. 5, 2008.
International Search Report and Written Opinion in PCT/US08/083939, dated Jan. 29, 2009.
Application as filed in U.S. Appl. No. 09/411,683, dated Oct. 4, 1999.

\* cited by examiner

←  →  ⌂  http://www.example.com/                                    ⊗

SUPERCOOKIE MANAGEMENT CONSOLE ( INSTALL COOKIE TRACKING SOFTWARE )
( REGISTER NEW DEVICE )

My Cookie Profile

Name:    John Doe    Correct
    Age:     27           Correct
    Music:    Country     Correct 630 ──▶ Recent Use of My Information

| Financial Website #1 | Fri. 10-11-2013 | Tablet | Details | Delete |
|---|---|---|---|---|
| Information Shared: Personal; Shopping | | | | |
| Social App #1 | Wed. 10-9-2013 | Mobile | Details | Delete |
| Information Shared: Personal | | | | |
| Online Store #3 | Tue. 10-8-2013 | Home PC | Details | Delete |
| Information Shared: Personal; Shopping | | | | |

Select the information you want available to the following websites:

[ Home PC | Mobile | Tablet | MacBook ]  ◀──────── 645

640C ──▶

| Information Type | Personal | Financial | Shopping |
|---|---|---|---|
| Website Type | | | |
| Social Networking | AVAILABLE | HIDE | HIDE |
| Financial | AVAILABLE | HIDE | HIDE |
| Online Retailers | HIDE | HIDE | AVAILABLE |

FIG. 6C

AGGREGATING USER WEB BROWSING DATA

CROSS-REFERENCE TO RELATED APPLICATIONS

This application is a continuation of U.S. application Ser. No. 14/077,090, filed Nov. 11, 2013, which claims benefit to U.S. Provisional Application No. 61/725,287, filed Nov. 12, 2012, both of which are hereby incorporated by reference in their entireties as set forth herein.

BACKGROUND

A user on the Internet today may generate a significant amount of data through his browsing history and online activity. This data can be very valuable for data mining to determine, for example targeted advertising, product development strategies, and behavioral research. However, much of this data is distributed across multiple systems. For example, individual websites use cookies to track user activity online. However, due to the "Same Origin Policy" websites may not be permitted to retrieve cookies of unrelated websites, thus shielding cookie data of a user for one website from another website.

Additionally, some websites split data such that cookie data is stored on the user's computing device, whereas data associated with the cookie is stored at the website server. Thus, in addition to the cookie data stored at the user's device, a user's Internet use may result in a wide distribution of his information throughout the Internet, resulting in a large data footprint. For example, social networking sites, online retailers, and biogs or micro-biogs authored are a few sites that may also contain information about the user.

SUMMARY

One embodiment may comprise a computing system comprising one or more hardware computer processors and one or more storage devices. The storage devices configured to store software instructions configured to cause one or more hardware computer processors perform a number of operations. These operations may include receiving authorization from a user to retrieve a plurality of cookie data associated with the user and/or retrieving the plurality of cookie data stored on one or more computing devices associated with user. Each of the cookie data is associated with one or more websites visited by the user. Another operation may include determining one or more characteristics of the user based on each of the plurality of retrieved cookie data. The processors may also associate each of the determined one or more characteristics of the user with an identity of the user. In response to requests for information regarding the user, the processors may provide at least some of the one or more characteristics of the user or the plurality of cookie data to a requesting entity.

These and other features and advantages of embodiments will become apparent from the following description of embodiments. Neither this summary nor the following detailed description purports to define the invention.

BRIEF DESCRIPTION OF THE DRAWINGS

FIG. 6C illustrates another example of a user interface for managing a supercookie.

DESCRIPTION OF EMBODIMENTS

Figure 1:
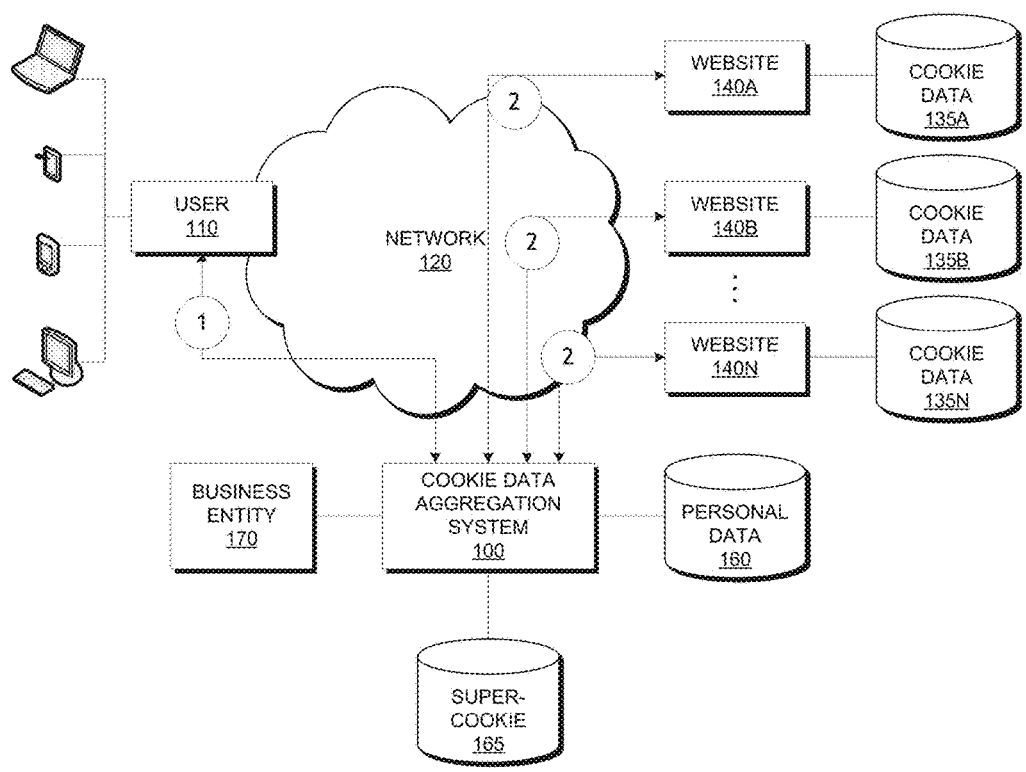
FIG. 1 shows one embodiment of supercookie aggregation by a cookie data aggregation system in a networked environment.

Embodiments of the disclosure will now be described with reference to accompanying figures. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Overview

A cookie data aggregation system, as discussed herein, comprises a computer system, such as a server, that implements methods of aggregating a user's web browsing data in a networked environment. The cookie data aggregation system can aggregate the cookies of the user, cookie data from various websites, personal data, and/or other data to create a "supercookie." The supercookie can then be used by websites to tailor a customized website experience for the user. Because of the "Same Origin Policy", a website may not have access to cookies from different websites about a user. However, the supercookie can provide this data to a website, thus allowing a better tailored, customized website experience for the user. For example, the user may be able to authorize use of his supercookie (and or portions of his supercookie) by particular websites in order to provide potentially valuable information to the websites that may not otherwise be available to the websites (and/or may require additional effort to obtain by the websites).

As a user browses the web and visits various websites, each website may generate a cookie and store it on the user's computing device, possibly as part of the website data. The cookie may allow the website to track a user's activity at the website. By tracking this activity, a website can better customize its webpages for a user. For example, a website can determine whether or not a user is "authenticated" or "logged in", thus informing the website whether or not to provide webpages with sensitive information to the user. Additionally, the website can determine what advertisements to display to the user while he browses the website based on the cookie.

The cookie data aggregation system may access these cookies on one or more of the user's computing devices. The system may install cookie tracking software on a user device for this purpose. The software may then send cookies (or information regarding the cookies) from the user to a cookie data aggregation system (or the cookie data aggregation may occur on one of the user devices). Alternatively, a user could upload his cookies to the cookie data aggregation system. The cookie data aggregation system may also retrieve additional cookie data from the websites that generated the cookies retrieved by the system. For example, information in cookies may be coded by the website that placed the cookie, such that the coded data is useful only to the website that placed the cookie and has the key to decode the data. Thus, the cookie data aggregation system may obtain information associated with coded data in cookies from the cookie originator and/or some other entity that is configured to decode the cookie data. Further, the cookie data aggregation system may also retrieve personal data from the user via a user interface. The cookie data aggregation system may then combine the retrieved user cookies, the retrieved website data, and the personal data about the user to create a supercookie.

The supercookie can provide several benefits. First, the supercookie can associate the user with cookies that were previously made anonymous. Second, the supercookie can be used to create a user profile. Third, the supercookie may be used by various websites to better customize and tailor a website experience for the user. Fourth, the supercookie may be used to associate a user profile with access information from multiple devices.

Additionally, the multiple cookies may also be useful for tailoring a website experience for a user. The supercookie may also contain a user ID. This may allow anonymous cookies to now be associated with the user. In some embodiments, the supercookie data structure may include additional items. In other embodiments, the supercookie data structure may not include all of the above-mentioned items.

The cookie data aggregation system may push the generated supercookie back to the user. Now, when the user visits a website, the website may retrieve the supercookie from the user to better customize the website experience for the user. Alternatively, the generated supercookie may be stored at the cookie data aggregation system. In this case, a website may access the supercookie at the cookie data aggregation system to better customize a website experience for the user. The cookie data aggregation system and/or the website may request authentication from the user to store and/or access the supercookie for the user.

The cookie data aggregation system may provide a user interface to allow the user to view, modify, control usage rights, and perform other management functions associated with his supercookie. For example, the user may be able to view the personal information about him stored in the supercookie. This information may include the user's name, age, gender, music preferences, interests, hobbies, and/or other relevant personal information. The user may also be able to configure what type of information stored in the supercookie can be made available to various websites. For example, a supercookie may store personal, financial, and online retail website browsing information about the user. The user may be able to configure which of these types of information is available to different websites. These websites could include social media websites, financial websites, and online retail websites. For example, a user may want his financial information to be available to financial websites. However, the user may configure his supercookie such that his financial information cannot be seen by a social media website. Additionally, a user may configure his supercookie to make his personal information available to all websites.

System and Network Architecture

FIG. 1 shows one embodiment of a cookie data aggregation system 100 in a networked environment. In this embodiment, the cookie data aggregation system 100 may communicate with a user 110 over the network 120. User 110 discussed herein may refer to a computing device and/or an operator of the computing device. The actions performed by a user 110 may be performed automatically by a computing device without input from an operator, or may be performed based on input from an operator.

The cookie data aggregation system 100 may also communicate with one or more websites 140 (including 140A, 140B, and 140N) each with associated cookie data 135 (including 135A, 135B, and 135N). In this embodiment, the cookie data aggregation system 100 also has access to personal data 160 of the user 110, which the system 100 may use to create or supplement a supercookie 165 for the user 110. The business entity 170 may engage with the cookie data aggregation system 100 and can provide data and/or access the supercookies 165. In some embodiments, the cookie data aggregation system 100 may communicate with more devices and/or use more data to create supercookies 165 than what is shown in FIG. 1. In some embodiments, the cookie data aggregation system 100 does not communicate with all of the devices shown in FIG. 1. In some embodiments, the cookie data aggregation system 100 does not use all of the data shown in FIG. 1 to create supercookies 165.

In FIG. 1, the cookie data aggregation system 100 may be a server. Alternatively, the cookie data aggregation system 100 may be multiple computing devices working together to create a cookie data aggregation system 100.

Supercookie Generation

As shown in action 1 of FIG. 1, the cookie data aggregation system 100 may communicate with the user 110, such as to obtain authorization to access cookies on the user's computing device(s) and to create the supercookie 165. In some embodiments, the cookie data aggregation system may provide software to the user 110. This software may then track the cookies of the user 110 and transmit them to the cookie data aggregation system 100. In some embodiments, the cookie data aggregation system 100 downloads the user's cookies from the user 110. In some embodiments, the user 110 uploads his cookies to the cookie data aggregation system 100. In some embodiments, the user's cookies may be stored on a user device. In some embodiments, the user device may be a phone, PDA, laptop, desktop, tablet, and/or some other computing device. In some embodiments, the cookie data aggregation system 100 retrieves the user's cookies from the user's computing device.

In the embodiment of FIG. 1, the cookie data aggregation system 100 also may communicate with one or more websites to obtain cookie data, as shown in action 2. For example, the cookie data aggregation system 100 may communicate with website 140A to obtain cookie data 135 associated with the user 110. The cookies retrieved from user 110 may indicate that the cookie was generated by particular websites 140. As a result, the cookie data aggregation system 100 may communicate with corresponding websites 140 to retrieve further cookie data 135. For example, to decode information regarding information stored in a cookie placed on one of the user 110 devices by the website 140A. In this way the cookie data aggregation system 100 can detail what the cookie actually means. The cookie data 135 may include information not available in the cookie retrieved from the user 110. For example, the cookie data 135 may include information about the users activity and/or interactions with website 140, such as the number of times the user 110 visited the website 140, the amount of time or time spent on the website 140 during each visit and cumulatively, the trends and/or preferences noted about the user 110 when visiting website 140, the trends and/or preferences noted about visitors of website 140, website browsing or activity information or analysis related to website 140, and/or other useful information.

In some embodiments, the cookie data aggregation system 100 combines the personal data 160 with the retrieved cookies from the user 110 and the retrieved cookie data, for example cookie data 135A, 135B, and 135N as part of the supercookie 165 for user 110. The personal data 160 may include information about the user 110 that is not available in the retrieved cookies from the user 110 or the retrieved cookie data from the one or more websites. The personal data 160 may include user ID, date of birth, gender, occupation, education, and/or other relevant personal data. In some embodiments, the cookie data aggregation system 100 retrieves the personal data 160 from the user 110. In some embodiments, the user 110 inputs the personal data 160 to the cookie data aggregation system 100. In some embodiments, the cookie data aggregation system 100 stores the personal data 160 at the cookie data aggregation system 100. In some embodiments, the cookie data aggregation system 100 accesses the personal data 160 from a remote device.

The cookie data aggregation system 100 may communicate with the business entity 170, such as to obtain data to help generate a supercookie 165 about a user 110. The data obtained may include personal information about the user 110, web browsing information about the user 110, web browsing information about various websites, and/or web browsing information in general.

In the embodiment of FIG. 1, the cookie data aggregation system 100 may generate supercookie 165 based on retrieved cookies from the user 110, retrieved cookie data 135 from one or more websites 140, personal data 160, and/or data obtained from business entity 170. In some embodiments, the cookie data aggregation system 100 may use more or less data than what is shown on FIG. 1 to generate the supercookie 165. After the cookie data aggregation system 100 creates the supercookie 165, the cookie data aggregation system 100 may communicate with the user 110 to push the supercookie to the user 110. In some embodiments, the cookie data aggregation system 100 pushes the supercookie 165 to the user's device. In some embodiments, the user device may be a phone, PDA, laptop, desktop, tablet, and/or some other computing device.

In some embodiments, the cookie data aggregation system 100 may store the supercookie 165 of the user 110 at the cookie data aggregation system 100. In some embodiments, the cookie data aggregation system 100 may request authorization from the user 110 to store the supercookie 165 of the user 110 at the cookie data aggregation system 100.

Supercookie Distribution

Once the cookie data aggregation system 100 has generated the supercookie 165, the system 100 may allow the user 110 to access the supercookie 165, either by pushing the supercookie 165 to the user 110, allowing the user to pull the supercookie 165, or allowing the user 110 to access the supercookie via one or more browsers or applications. In some embodiments, the cookie data aggregation system 100 stores the supercookie 165 at the cookie data aggregation system 100. In some embodiments, the cookie data aggregation system 100 provides the supercookie 165 (or portions of the supercookie) to one or more websites 140 and/or the business entity 170 in response to requests for information regarding the user 110. In some embodiments, the cookie data aggregation system 100 requests authorization from user 110 before providing supercookie 165 to one or more websites and/or a business entity. Alternatively, the user 110 may have pre-authorized certain websites 140, groups of websites, types of websites, etc. to access certain portions of supercookie 165. In some embodiments, the cookie data aggregation system 100 notifies the user 110 when it provides the supercookie 165 to one or more websites and/or the business entity 170 and/or stores historical data regarding use of the user's supercookie.

In some embodiments, the cookie data aggregation system may communicate with one or more websites to provide access to supercookie 165 of the user 110 to one or more websites. In some embodiments, the one or more websites may request the cookie data aggregation system 100 to provide access to the supercookie 165.

The cookie data aggregation system 100 may also communicate with the business entity 170 to provide access to a supercookie 165 to the business entity 170. In some embodiments, the cookie data aggregation system requests authorization from the user 110 before granting business entity 170 access to the supercookie 165 of the user 110. Business entity 170 may refer to a company seeking information about users 110, for example. Instead of a website seeking a user's cookie data, a business entity 170 may be a marketing company interested in information about user 110 to identify a future sales opportunity, for example. A business entity 170 may request data from the cookie data aggregation system 100 in other manners than via a website request made to the business entity 170. For example, the business entity 170 may request data of the user 110 via a user interface provided by the cookie data aggregation system 100 that enables authorized entities to access profile data of users that is compiled from cookies. In some embodiments, the business entity 170 pays a fee for the service provided by the cookie data aggregation system 100 to provide access to the supercookie 165. In some embodiments, different amounts of fees are charged depending on the different types of access provided by the cookie data aggregation system 100 to the business entity 170. In some embodiments, no fee is charged by the cookie data aggregation system 100 for providing access to a business entity 170 to a supercookie. In some embodiments, the cookie data aggregation system 100 may obtain authorization from user 110 before granting a business entity 170 access to his supercookie.

Figure 2A:
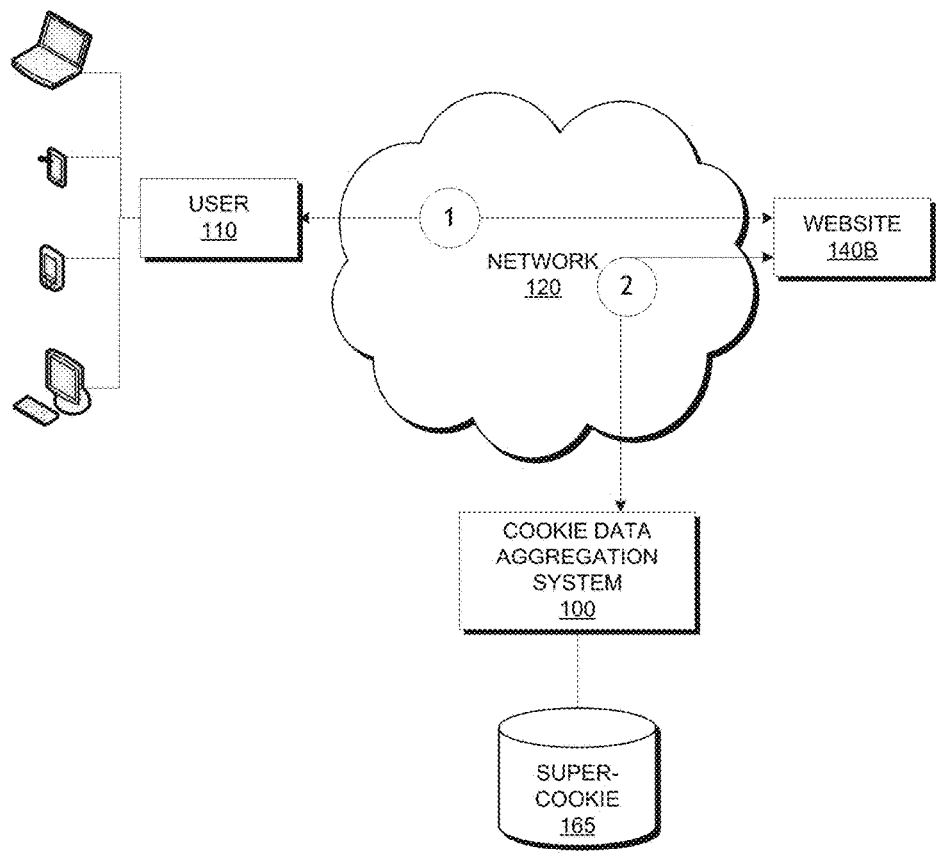
FIG. 2A shows one embodiment of supercookie distribution by a cookie data aggregation system in a networked environment.
Figure 2B:
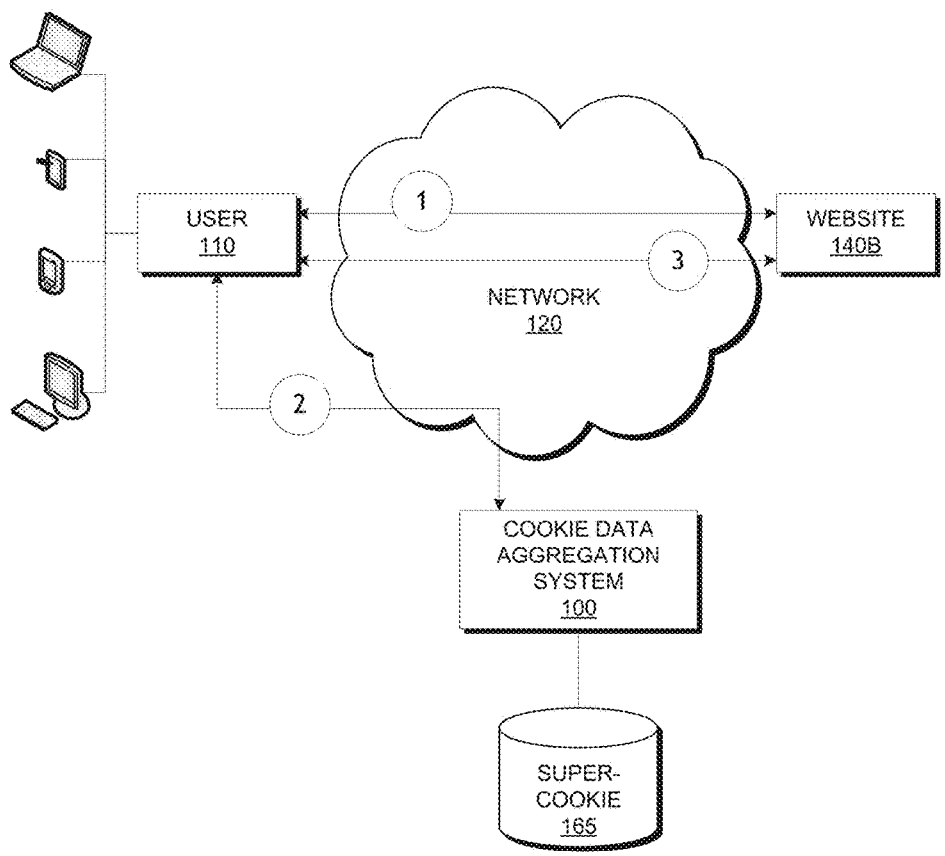
FIG. 2B shows another embodiment of supercookie distribution by a cookie data aggregation system in a networked environment.
Figure 2C:
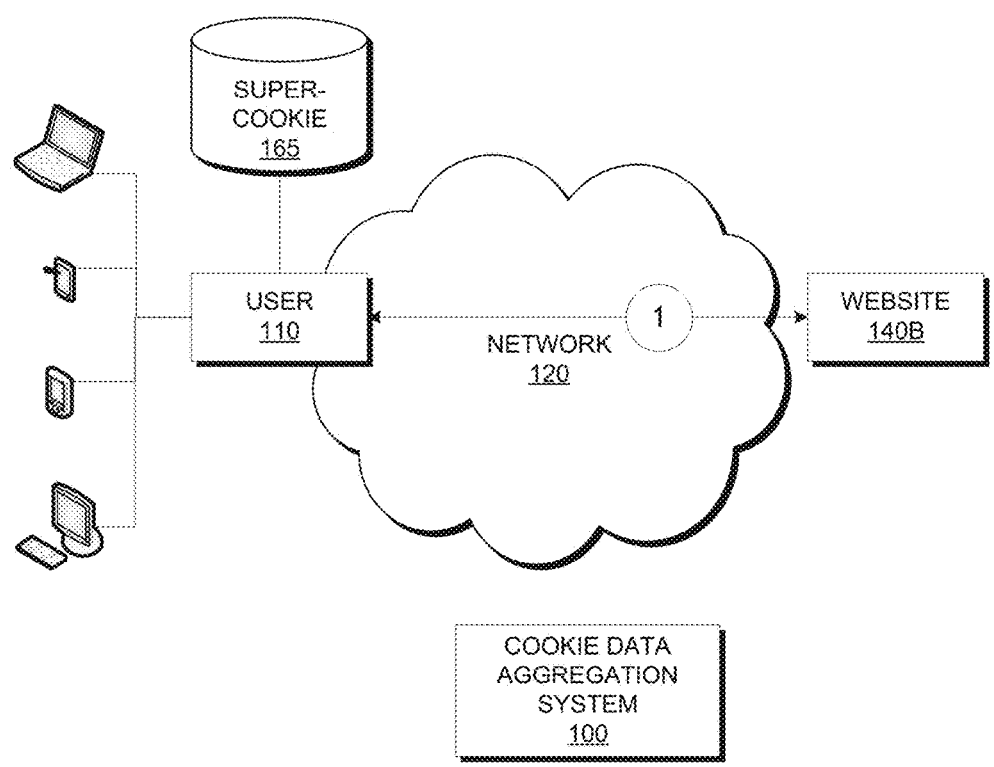
FIG. 2C shows another embodiment of supercookie distribution by a cookie data aggregation system in a networked environment.

FIGS. 2A, 2B, and 2C illustrate three methods by which a supercookie may be provided to a website by the cookie data aggregation system 100. In some embodiments of FIGS. 2A, 2B, and 2C, supercookie data is distributed to websites and business entities using fewer or additional actions than shown in the figures. In some embodiments, the cookie data aggregation system 100 may use more or less data than what is shown on FIGS. 2A, 2B, and 2C, and may communicate with additional or fewer resources than are shown in FIGS. 2A, 2B, and 2C. These figures are discussed with reference to sharing with a particular website (140B), but supercookie data may be similarly shared with other websites or business entities in a similar manner.

In other embodiments supercookie data may be provided to websites or business entities through different methods.

FIG. 2A depicts an example process for providing supercookie data to a website directly from the cookie data aggregation system. In this embodiment, the supercookie 165 is stored on the supercookie data aggregation system 100. In action 1 of FIG. 2A, the user 110 communicates with a website 140B. During the communication, the website 140B requests supercookie data regarding the user. In response, the user 110 provides the website 140B with a link to (and/or other identifier of) the user's supercookie 165 stored on the cookie data aggregation system 100. In some embodiments, the user 110 may provide a link to her supercookie without a request from the website 140B.

In action 2, the website 140B follows the link to access the user's supercookie 165 on the cookie data aggregation system 100. In some embodiments, the user 110 can determine how much supercookie data the website 140B can access. For example, the user 110 may provide a link which only provides access to the user's personal data, but does not provide access to the user's financial data. In other embodiments, the user 110 may provide only one link regardless of what information the user wants to share, but the cookie data aggregation system 100 only provides limited information to certain types of websites. For example, if the cookie data aggregation system 100 recognizes the website 140 as an online shopping website, then it will not provide financial information to the website. In other embodiments, providing the link to the website 140 provides the website with access to the entire supercookie 165.

In some embodiments of the process shown in FIG. 2A, the website 140B does not request supercookie access from user 110. Instead, the website 140B requests supercookie data directly from the cookie data aggregation system 100 when the user accesses the website. In such embodiments, cookie data aggregation system 100 may request authorization from user 110 before providing website 140B with access to supercookie 165. In some embodiments, the cookie data aggregation system may instead provide the supercookie, or part thereof, based on prior authorization from the user and/or default rules for providing supercookie data regarding the user.

FIG. 2B depicts another example process for providing supercookie data to a website from the cookie data aggregation system by first passing the supercookie data through the user 110. In this embodiment, the supercookie 165 is stored by the cookie data aggregation system 100. In action 1 of FIG. 2B, the user 110 accesses the website 140B, and the website requests a supercookie from the user. The user 110 responds by requesting his supercookie data from the cookie data aggregation system 100 in action 2, such as by the user's browser (or other software on the user's computing device) automatically requesting the supercookie data from the cookie data aggregation system 100 without user input. The cookie data aggregation system 100 then returns the supercookie 165 to the user 110.

In action 3, the user 110 provides the supercookie (or portions thereof) to the website 140B. In some embodiments the website 140B may request data from the user 110 other than the supercookie. The user may then request his supercookie and filter the supercookie data to respond to the website's request, or indicate to the cookie data aggregation system 100 which portions of the supercookie data should be returned to the user 110 in action 2. In some embodiments, the user 110 may only wish to provide some information to the website 140B. The user may do this by only requesting a limited amount of data from the cookie data aggregation system, or by only passing some of the information in his supercookie 165 along to the website 140B, for example.

FIG. 2C depicts another example process for providing supercookie data to a website 140B from the user. In this embodiment, the supercookie 165 is stored by the user 110. In this embodiment, the cookie data aggregation system aggregates data into a supercookie and provides the aggregated cookie to the user 110, but does not communicate directly with the website 140 when the website 140 requests access to the user's supercookie 165. In this embodiment, the supercookie is transmitted from the user 110 directly to the website 140B. The user 110 may transmit the supercookie 165 to the website 140B when the user 110 visits website 140B, either with an initial request for the website 140B and/or in response to a request from the website 140B for access to the user's supercookie. In some embodiments, the website 140B requests other cookies or personal data from the user instead of, or in addition to, requesting access to the supercookie. In action 1 of FIG. 2C, the user 110 provides access to the supercookie 165 (or portions thereof) to the website 140. In some embodiments, the user may determine how much data from supercookie 165 to provide to website 140.

In some embodiments, only one of the processes illustrated in FIGS. 2A, 2B, and 2C are used by the cookie data aggregation system 100 to distribute supercookie data. In some embodiments, two or more of the processes shown in FIGS. 2A, 2B, and 2C may be implemented by the user 110 and cookie data aggregation system 100. This may be done for a variety of reasons such as depending on the type of website site being accessed, or the type of device from which the user is accessing a website. For example, when the user is accessing a mobile website from a smartphone, the cookie data aggregation system 100 may provide supercookie data using the process shown in FIG. 2A, which may require fewer computing resources of the user's computing device and fewer communications from the user 110. This may advantageously conserve system resources for a smartphone, for example. However, if the user is accessing a website from a home desktop, the cookie data aggregation system may use the process shown in FIG. 2C, which may use more computing resources (e.g., memory, processor, etc.), but allows the user 110 more direct control of supercookie data that is provided to the website 140B. It will be understood that the preceding are only examples, and that any process may be used by any user device to provide the supercookie 165 to any website or computing device. In some embodiments, factors other than device type and website type determine which process is used to provide supercookie data to a requesting entity. For example, the user 110 or cookie data aggregation system 100 may determine which process to use based on the type and amount of data requested by a website 140.

Cookie Data Aggregation System

Figure 3:
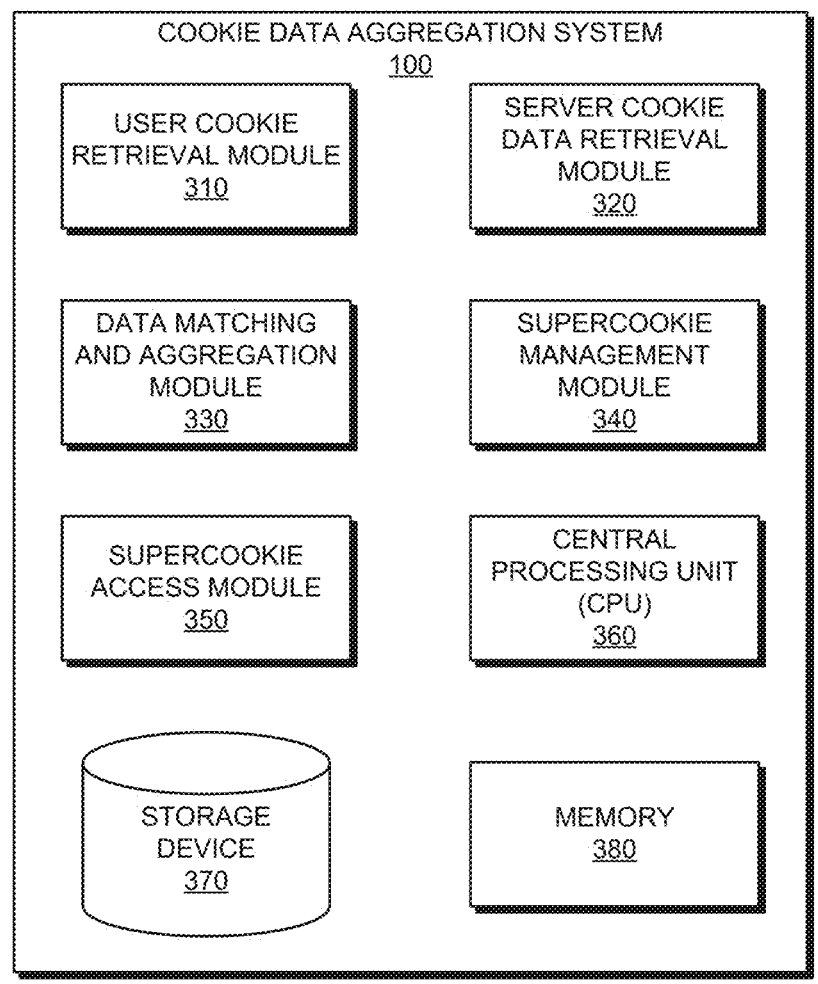
FIG. 3 is a block diagram illustrating example components of one embodiment of a cookie data aggregation system.

FIG. 3 is a block diagram illustrating an embodiment of the cookie data aggregation system 100. In this embodiment, the cookie data aggregation system 100 may include a user cookie retrieval module 310, a server cookie data retrieval module 320, a data matching and aggregation module 330, a supercookie management module 340, a supercookie access module 350, a CPU 360, a Storage Device 370, and a Memory 380. In some embodiments, the cookie data aggregation system 100 comprises fewer or additional modules than shown in FIG. 3.

In the embodiment of FIG. 3, the user cookie retrieval module 310 is configured to access and/or retrieve cookies from the user 110 over the network 120. The cookies retrieved by module 310 may then be used by data matching and aggregation module 330. The cookies for the user 110 may be stored at a user computing device, such as a laptop, desktop, PDA, phone, tablet, or some other computing device that can browse the Internet. In some embodiments, the user cookie retrieval module 310 obtains authorization from the user 110 before retrieving the cookies. In some embodiments, the user cookie retrieval module 310 downloads cookies from the user 110 to the cookie data aggregation system 100. In some embodiments, the user cookie retrieval module 310 sends a prompt to a user 110 to upload cookies to the cookie data aggregation system 100. In some embodiments, the user cookie retrieval module 310 receives uploaded cookies from user 110. In some embodiments, the cookie data aggregation system 100 provides the user 110 with cookie tracking software to install on his user device. The cookie tracking software may then communicate with user cookie retrieval module 310 to transmit cookies for the user 110 to the cookie data aggregation system 100. In some embodiments, the user cookie retrieval module 310 may be used to handle other issues related to retrieving cookies from a user 110.

In this embodiment, the server cookie data retrieval module 320 is configured to retrieve cookie data from a website, such as the website that caused the cookie to be stored on the user's computing device. The cookie data retrieved from website 140 may provide information indicating the meaning of encoded information located in a cookie stored on one or more of the user devices. The cookie data retrieved by module 320 may then be used by data matching and aggregation module 330. In some embodiments, the server cookie data retrieval module 320 may be used to handle other issues related to retrieving cookie data from the server.

The data matching and aggregation module 330 may be configured to consolidate data and aggregate various cookies, cookie data, and personal data to generate a supercookie. In some embodiments, the data matching and aggregation module 330 may be used to handle other issues related to data matching and aggregation.

The supercookie management module 340 may be configured to provide user 110 a user interface to manage his supercookie 165. The supercookie management module 340 may be used when a user 110 wants to access the cookie data aggregation system 100 to manage his cookie data or generate the supercookie 165. For example, the user 110 may want to update his cookie profile, update the information about the websites he visited, configure settings for what type of supercookie information is available to various websites, and/or delete the data from the cookie. In some embodiments, the supercookie management module 340 may be used to handle other issues related to supercookie management.

Supercookie access module 350 may be used by the cookie data aggregation system 100 to provide access to supercookies to various parties, such as a business entity 170, websites 140, and/or user 110. As discussed above with reference to FIGS. 2A-2C, supercookie data may be delivered in various manners, such as pushing the supercookie to the user 110, pushing a supercookie link to the user 110, and/or storing the supercookie data at the aggregation system 100.

In some embodiments, the module 350 grants access to one or more websites to the supercookie 165, which may be stored at the cookie data aggregation system 100 and/or the user 110. In some embodiments, the module 350 requests authorization from user 110 prior to granting access to one or more websites to the supercookie 165 for user 110. In some embodiments, the module 350 pushes the supercookie 165 to one or more websites requesting the supercookie 165. In some embodiments, the module 350 requests authorization from user 110 prior to pushing the supercookie 165 to the one or more websites. In some embodiments, the supercookie access module 350 may charge fees to business entities 170, websites, or other entities requesting access to supercookie data. In some embodiments, the supercookie access module 350 may be used to handle other issues related to supercookie access.

In one embodiment, the cookie data aggregation system 100 includes one or more central processing unit ("CPU") 360, which may each include a conventional or proprietary microprocessor. The modules discussed herein may be stored on any type of non-transitory computer storage device 370, such as hard drives, solid state memory, optical disc, and/or the like. The cookie data aggregation system 100 further includes one or more memory 380, such as random access memory ("RAM") for temporary storage of information, one or more read only memory ("ROM") for permanent storage of information, such as the module discussed herein.

Supercookie Structure

Figure 4:
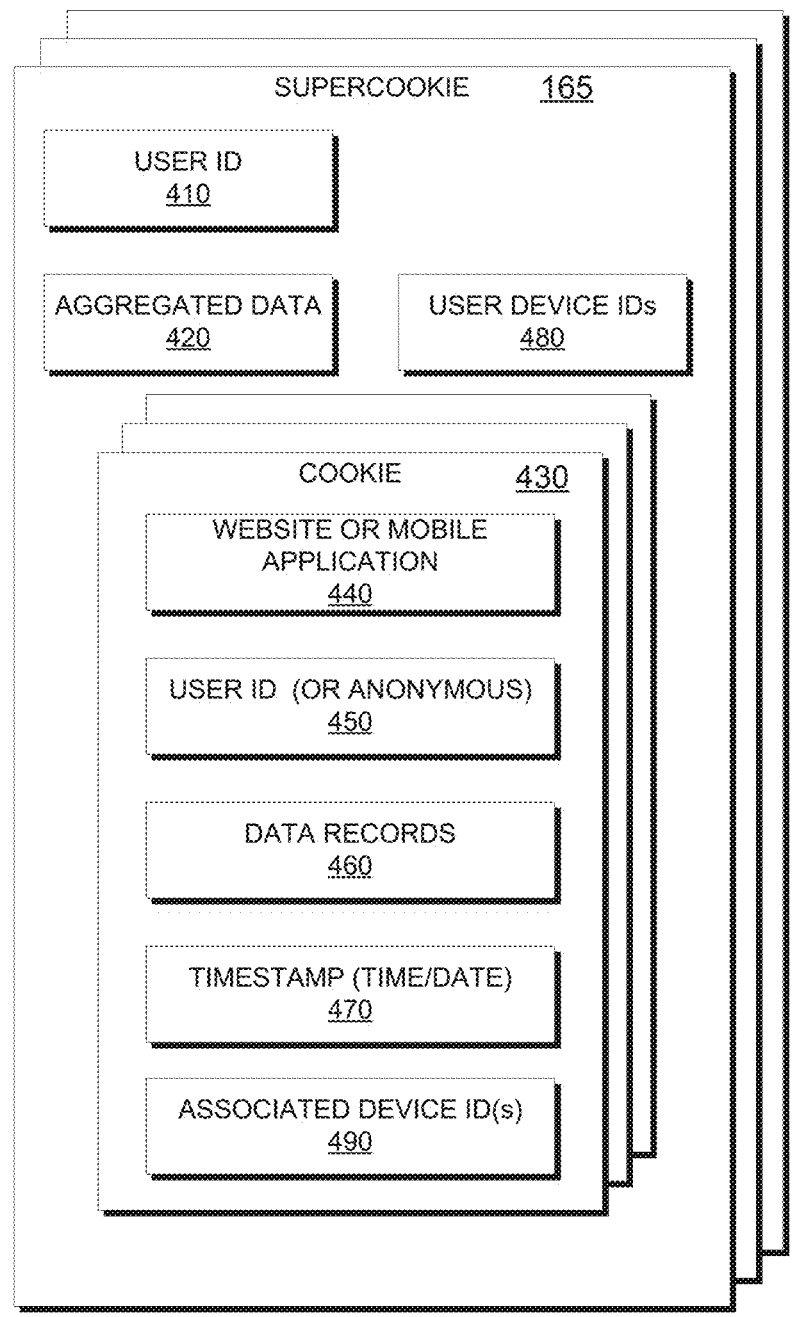
FIG. 4 is a diagram showing one embodiment of a supercookie data structure.

FIG. 4 illustrates an example supercookie data structure 165. The super cookie data structure 165 may include a user ID 410, aggregated data 420, user device IDs 480, and one or more cookies 430, which may include cookie data retrieved from corresponding websites regarding information in the cookies. Each cookie 430 may include a website 440, a user ID 450, data records 460, a timestamp 470 and/or associated device IDs 490 of devices which have visited the site. In some embodiments, the cookies 430 include fewer or additional fields than displayed in FIG. 4. In some embodiments, the supercookie 165 includes more items than what is displayed FIG. 4. In some embodiments, the supercookie 165 does not include all of the items displayed in FIG. 4. In some embodiments, the supercookie 165 includes a digital certificate.

The supercookie 165 can be used by external websites 140 to analyze behavior of the user 110. Based on this analysis, the websites 140 can tailor a customized experience for the user 110 when he visits the website 140. The supercookie 165 also allows one or more anonymous cookies 430 to be associated with the user 110. For example, the cookie data aggregation system 100 may receive some anonymous cookies from the user 110 when it is collecting cookie data from one of more computing devices of the user 110. Because the cookie data aggregation system 100 knows the identity of the user (e.g., from profile information provided by the user 110 when setting up an account with the cookie data aggregation system 430 and/or from information in other cookies), the system can associate the anonymous cookie with the user 100.

The supercookie 165 may also serve as authorization for user 110 when the user 110 visits a website, such as website 140. This may allow the user 110 to visit the website 140 without entering in his login information. For example, a user may access a website 140 which requires login information from the user 110. The user 110 may automatically provide a link to the website 140 which leads to the user's supercookie 165. The supercookie 165 may then authenticate the user 110 to the website 140 without requiring the user 119 to enter login information.

The supercookie 165 may also include aggregated data 420. The supercookie 165 aggregates data from various sources, such as one or more cookies 430, personal data, or other data. By aggregating data from various sources, the supercookie 165 may provide better data about a user 110 to a website 140 for modeling purposes. Aggregated data 420 may include common data about a user found in multiple cookies 430, a combination of different data found in multiple cookies 430, information based on the analysis of data found in multiple cookies 430, and/or other types of data. Aggregated data 420 may include data about a user 110, such as websites visited, time spent at each website, cumulative time spent at all visited websites, preferences, and/or other data.

The supercookie 165 may include one or more cookies 430. The one or more cookies 430 may be retrieved by the cookie data aggregation system 100 from the user 110. Each cookie 430 may include the website 440 that generated the cookie 430, a user ID 450, data records 460, the timestamp 470, and/or the device ID(s) 490 of the device(s) that accessed the site. In some embodiments, the cookie 430 does not have the user ID 450, and is instead anonymous. In some embodiments, the user ID 450 is encrypted. The data records 460 may include data about a user 110 while visiting the website 440, such as the time spent at the website 440, number of times the website 440 was visited, activities done on the website 440, and/or other data. The timestamp 470 may represent the time when the cookie 430 was stored on the device of the user 110. Alternatively, the timestamp 470 may represent the time when the cookie 430 was created. In some embodiments the cookie 430 does not contain data on an associated device ID 490. In other embodiments, cookie 430 contains multiple device IDs, for example, corresponding to multiple devices which have accessed website 440 with the same account.

Examples of Process Flow

Figure 5:
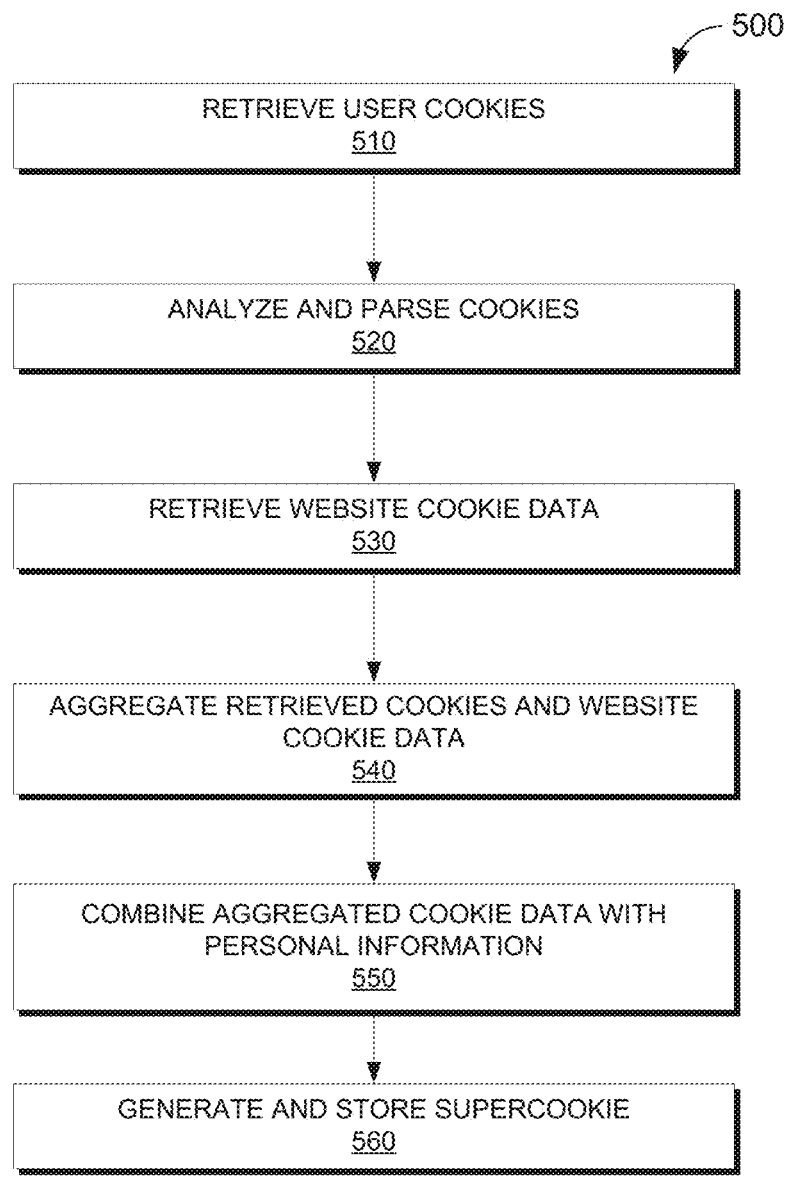
FIG. 5 illustrates a flowchart of one embodiment of a process for retrieving cookie data.

FIG. 5 illustrates an embodiment of a process for retrieving cookie data to generate a supercookie 165. The method 500 may be executed by the cookie data aggregation system 100 and/or other suitable computing device on an ongoing or periodic basis. Alternatively, the method 500 may be initiated by a user 110 to be executed once. In some embodiments, the method 500 requires authorization from the user 110.

At block 510, the cookie data aggregation system accesses and/or retrieves cookies 430 from one or more devices of the user 110. The cookie data aggregation system 100 may then analyze and parse the retrieved cookies 430 from the user 110, as seen in block 520. The cookie data aggregation system 100 may do this analysis and parsing in order to determine which website 140 placed respective cookies on the user's devices and/or to extract data from the cookies. Next, the cookie data aggregation system 100 retrieves website cookie data, as seen in block 530. For example, website cookie data may include information not available in the cookie retrieved from the user 110, such as the activities of user 110 on the website. Website cookie data may also include information about a cookie that must be decoded by the website 140 which placed the cookie. In some embodiments, the supercookie data aggregation system 100 can request information from the website 140 on how to decode its cookies. Once the supercookie data aggregation system 100 has an algorithm for decoding cookies from a website 140, it may decode a user's cookies using its own systems. In other embodiments, the supercookie data aggregation module 100 may send encoded cookies to the websites 140 which generated the encoded cookies for the website to decode. For example, this may be necessary if the website will not provide instruction for decoding its cookies. Cookies may be decoded by anything from a simple lookup table (e.g., identifiers in particular fields of a cookie are matched to corresponding characteristics of the user) to encrypted data (e.g., encryption algorithms are used by the website 140 to decode raw information in the cookie in order to determine characteristics of the user). The cookie data aggregation system 100 may retrieve website cookie data from multiple websites, depending on how many different websites were responsible for the cookies 530 retrieved from the user 110.

Next, the cookie data aggregation system 100 may aggregate the cookies retrieved and the website cookie data, as seen at block 540. As discussed in reference to FIG. 4, the cookie data aggregation system 100 may aggregate data determined from multiple websites, such as data about a user found in cookies 430, website cookie data received from websites (or determined based on mapping or decoding information from the websites, such as data indicating the meaning of cookie data), actual cookies, device IDs, and/or other types of data. The cookie data aggregation system 100 may then combine the aggregated cookie data with personal information about the user 110, as seen at block 550. Finally, the cookie data aggregation system 100 may generate and store a supercookie 165, as seen in block 560. The supercookie 165 may be stored at the cookie data aggregation system. Alternatively, the supercookie 165 may be stored at the user device from which the cookies 430 were retrieved and/or at some other storage device. Depending on the embodiment, the method of FIG. 5 may include fewer or additional blocks and/or the blocks may be performed in an order different than illustrated.

User Interfaces

Figure 6A:
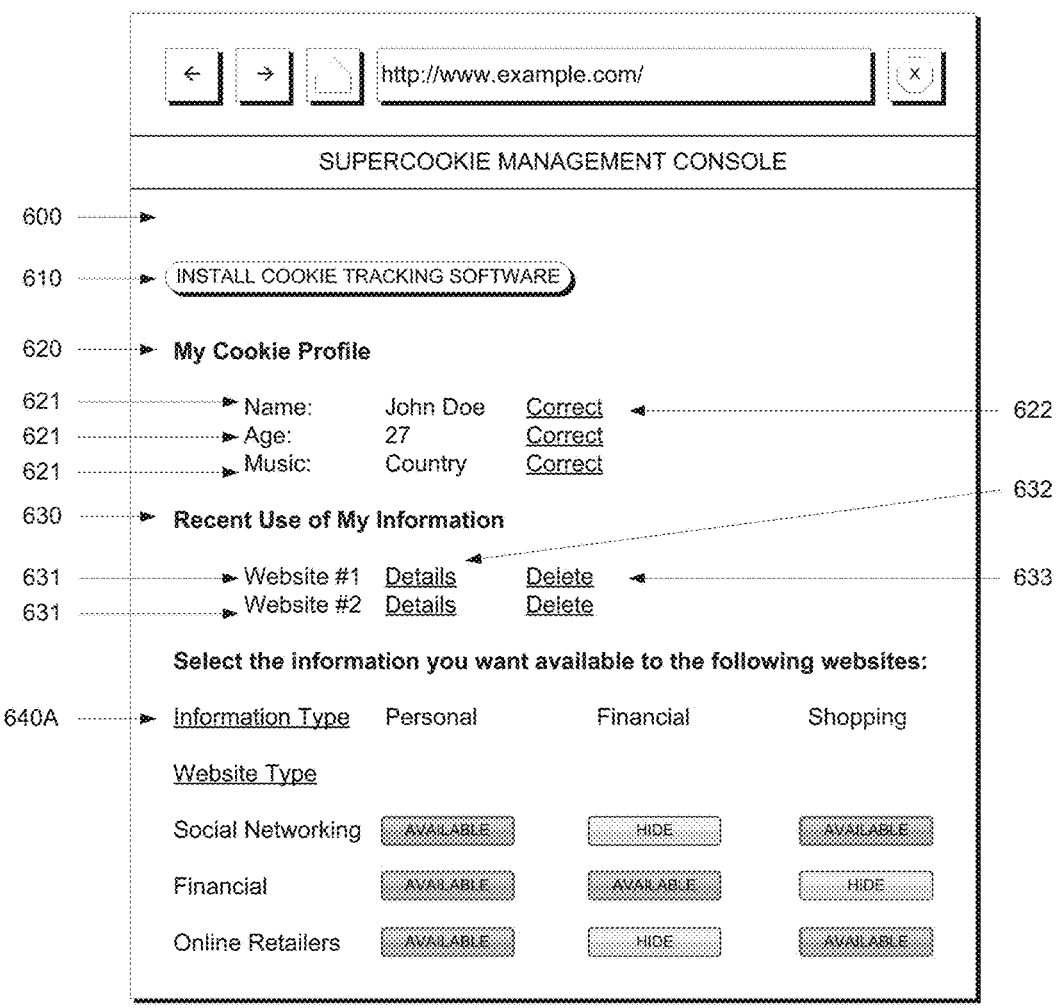
FIG. 6A illustrates an example of a user interface for managing a supercookie.
Figure 6B:
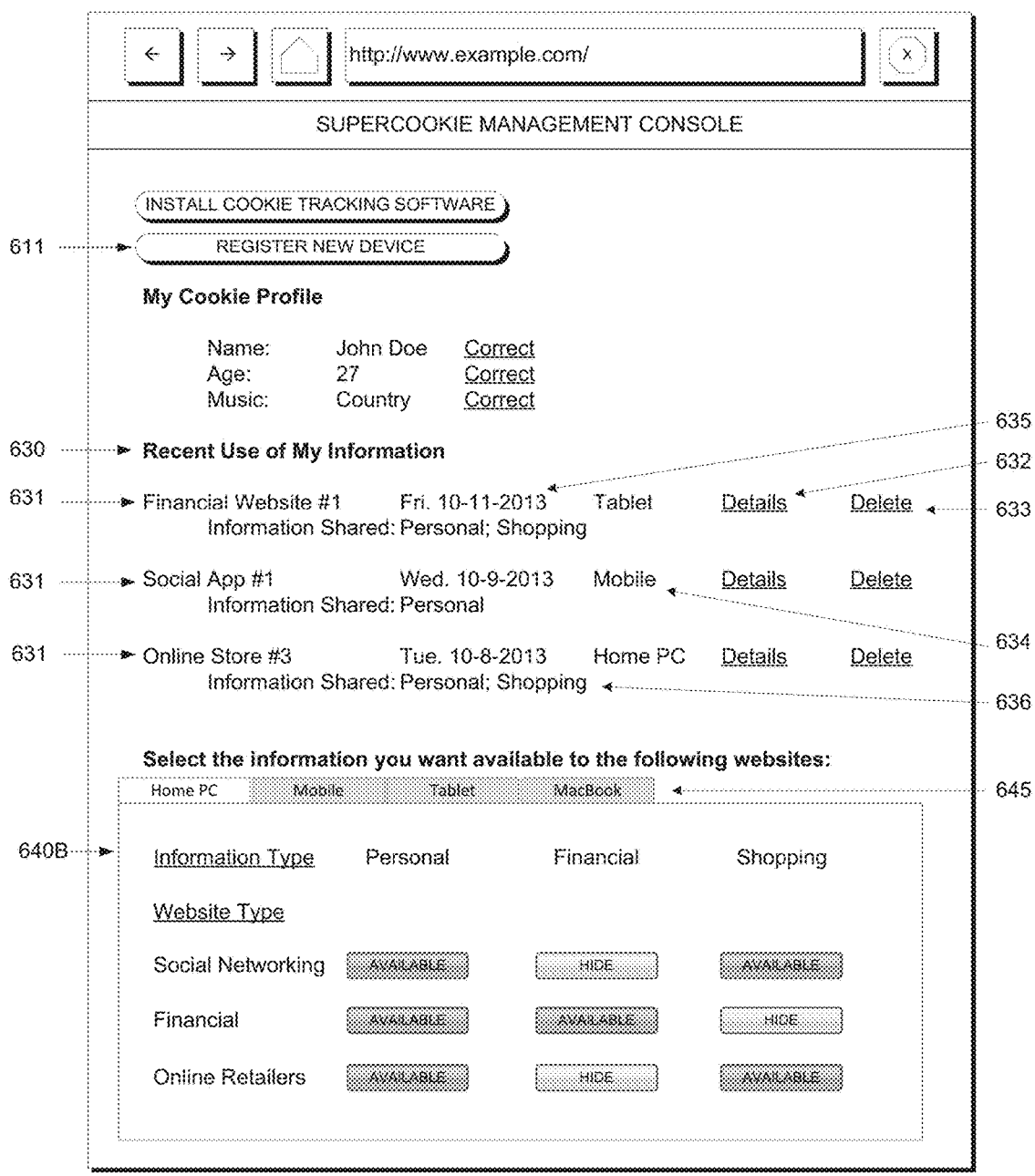
FIG. 6B illustrates another example of a user interface for managing a supercookie.

FIGS. 6A, 6B and 6C show example supercookie user interfaces for a user 110 to manage his supercookie 165. FIG. 6A displays an embodiment of a supercookie user interface 600 comprising a software installation button 610, cookie profile section 620, recent activity section 630, and supercookie settings section 640. In some embodiments, the user interface has additional text, graphics, links, buttons, and/or other items to provide the user 110 more information about his supercookie 165.

In the illustrated embodiment of FIG. 6A, the user 110 may install cookie tracking software by selecting the software installation button 610. Selecting this button may cause the cookie data aggregation system 100 to install cookie tracking software for the user 110 on a user device. The software may then track user cookies and send them to the cookie data aggregation system 100 to update the supercookie 165 for user 110. In some embodiments, no option is provided to install cookie tracking software. In some embodiments, the user 110 uploads his cookies to the cookie data aggregation system 100. In some embodiments, an option is provided to the user 110 for the cookie data aggregation system 100 to download the user's cookies from the user 110.

For the illustrated embodiment of FIG. 6A, the user 110 can view his cookie profile by looking at the cookie profile section 620. In the pictured embodiment, the cookie profile section 620 may include one or more cookie profile data 621 and associated cookie profile entry modification links 622. Each cookie profile data 621 may correspond to a type of information. For example, in the pictured embodiment, the first cookie profile data corresponds to the name of the user 110, which is "John Doe". The second cookie profile data 621 corresponds to age, which in this case is 27 years. The third cookie profile data 621 corresponds to the user's music preference, which in this case is country. In some embodiments, more cookie profile data are displayed than what is shown in FIG. 6A. In some embodiments, different types of data are presented in the cookie profile section 620 than what is shown in FIG. 6A. For example, cookie profile section 620 may include information about the user 110, such as personal information, web browsing information, website activity information, and/or other relevant information. In one embodiment, the website from which each piece of data in section 620 was obtained may also be indicated, either in the interface 600 or in a pop-up or other user interface that provides further details. This information may be useful for the user 110 to determine which websites have accurate (and inaccurate) information regarding the user.

The cookie profile data may also include a cookie profile entry modification link 622. A user 110 can select the cookie profile entry modification link 622 to alter the corresponding cookie profile data 621. In some embodiments, the cookie profile data 621 cannot be modified, and thus a cookie profile entry modification link 622 is not provided.

The illustrated embodiment of FIG. 6A also shows that the user 110 can view recent activity associated with this supercookie 165 by looking at the recent activity section 630. The recent activity section 630 includes recent activity data 631, recent activity entry details link 632, and recent activity entries deletion link 633. The recent activity section 630 includes information about the latest websites (or other entities) that have requested and/or received access to portions of the supercookie, whether in response to the user visiting the respective website or the entity simply requesting information regarding the user for some other purpose (regardless of whether the user visits a website of the entity). In some embodiments, more or less recent activity text information is displayed than what is shown in FIG. 6A. In some embodiments, a timestamp including the time and/or date of when the user 110 last visited the website is included as part of a recent activity entry 631.

The recent activity entry details link 632 allows the user 110 to click on the link to get more information about the recent access to the user's supercookie. This information may include a timestamp, duration, information accessed, number of times the website has been visited, general information about the website, and/or other relevant information. In some embodiments, the recent activity entry details link 632 may not be included. The recent activity entry deletion link 633 allows a user to delete a recent activity entry 631. In some embodiments, the recent activity entry deletion link 633 is not provided. In some embodiments, the recent activity entries 631 may not be deleted.

Supercookie user interface 600 also includes supercookie settings section 640. In the pictured embodiment of FIG. 6A, the supercookie settings section 640 allows a user 110 to designate which types of supercookie information he may choose to make available and for which types of websites. In the displayed embodiment of FIG. 6A, the user 110 is able to select whether personal, financial, and/or shopping supercookie information are available or hidden for social networking, financial, and online retail websites. The information being made available may be information stored in the supercookie 165. In some embodiments, the user can configure different types of information to be made available or hidden for different types of websites.

In some embodiments, the user may have options to configure supercookie settings for different items. In some embodiments, check boxes, radio buttons, text boxes, or other types of user input may be used to determine the selections of the user 110 for configuring his supercookie 165. In some embodiments, the type of information category, such as personal, financial, and/or shopping, may be a link to the specific information that can be displayed or hidden. For example, the category "personal" shown in FIG. 6A may be a link such that clicking on "personal" will display the personal information of the supercookie 165 that could be displayed or hidden to various websites.

FIGS. 6B and 6C illustrates other examples of user interfaces for managing a supercookie. In addition to certain elements displayed in FIG. 6A, the embodiment in FIGS. 6B and 6C also include a register new device button 611, different data about information use in the recent activities section 630, and additional configurability in supercookie settings section 640.

Users may desire to have their supercookie profile accessible when accessing websites from multiple devices, such as the user's mobile phone, notebook computer, and desktop computer. This may allow the user to maintain the same settings for webpages when accessed from multiple devices. Additionally, this may prevent a user from needing to enter the same information through multiple devices. As illustrated in the embodiments of FIGS. 6B and 6C, the user has a single supercookie profile that automatically updates with new cookies and personal information from websites accessed by the user from any devices registered to the user.

In one embodiment, the user may register a new device to his supercookie profile by selecting the register new device button 611. For example, if a user bought a new tablet, his tablet would not have any of his personal information, and websites will not recognize him so he will have no saved preferences on the websites. However, if he already has a supercookie profile he can simply go to his supercookie management console and register his new device. Then his tablet will provide his supercookie anytime a website requests it (based on rules for providing the supercookie to various websites, for example). When he accesses websites with his tablet's browser, he can interact with the website in the same way as though he had accessed it through any of his devices which share a supercookie. In some embodiments, the user is able to configure personalized names for his registered devices. In other embodiments, the system automatically generates a name for new devices.

FIGS. 6B and 6C display more information in addition to the information displayed in the recent activities section 631 shown in FIG. 6A. The recent activities section includes a timestamp 635, a device used entry 634, and an information shared entry 636. In some embodiments recent activities data 631 includes additional or fewer pieces of information than in FIGS. 6B and 6C. Timestamp 634 displays a time of access for a recent use, but may include information on previous uses also. The timestamp 634 may refer to the time the user accessed a website, the time the supercookie was accessed, or any other time relevant to the use of the user's information. Device used data 634 indicates the device associated with the use of the supercookie's information. For example, in FIG. 6B, the website 'Social App #1' was accessed by the user's 'mobile' device. Information shared data 636 indicates what information was shared with the website. For example, in FIG. 6B, the supercookie system shared 'personal' and 'shopping' information with 'Online Store #3'.

FIGS. 6B and 6C also demonstrate increased user configurability. In FIGS. 6B and 6C, the user has the added ability to control which information is shared based on which device is accessing a website. In supercookie setting section 640B and 640C (FIGS. 6B and 6C, respective) the user can select which information is shared with which type of website for each of the registered devices. The user can first select a device in device selection tabs 645. The supercookie management console 600 may then display the current settings for that device. For example, in FIG. 6B the user has selected the 'Home PC' tab so the supercookie setting section 640B indicates setting for sharing when sites are accesses from his 'Home PC'. However, in FIG. 6C, the user has selected his 'mobile' tab so the supercookie setting section 640C indicates how supercookie information is to be shared when accessing websites from the 'mobile' device. In the example of FIG. 6C, the user has selected not to share his financial information with any types of websites from his mobile phone. In some embodiments the system may recommend which information to share in different circumstances, for example, based on the user's security needs. In other embodiments the user may not be able to change his information sharing settings. For example, the settings on which information to share may be preset by the system.

In some embodiments, the supercookie user interface 600 may include more information and/or options for the user 110 than what is shown in FIG. 6A, 6B, or 6C to provide the user 110 more control over configuring and viewing his supercookie 165. In some embodiments, the supercookie user interface 600 may not include all of the information displayed in FIG. 6A. In some embodiments, the supercookie user interface 600 may include different information from what is displayed in FIG. 6A. The categories of information shared and website types are used for example purposes only. In other embodiments the information shared and website types may be categorized in any way that is beneficial to the user, the supercookie management system, or both.

FIGS. 6A, 6B, and 6C show embodiments of a user interface which a user can access through his browser to manage his supercookie. In other embodiments, the user interface may be accessed in other manners. For example, a user interface may be accessed through the user's browser, as a mobile website, a mobile app, a standalone application, or in other embodiments that allow a user to access information about his supercookie.

Figure 7:
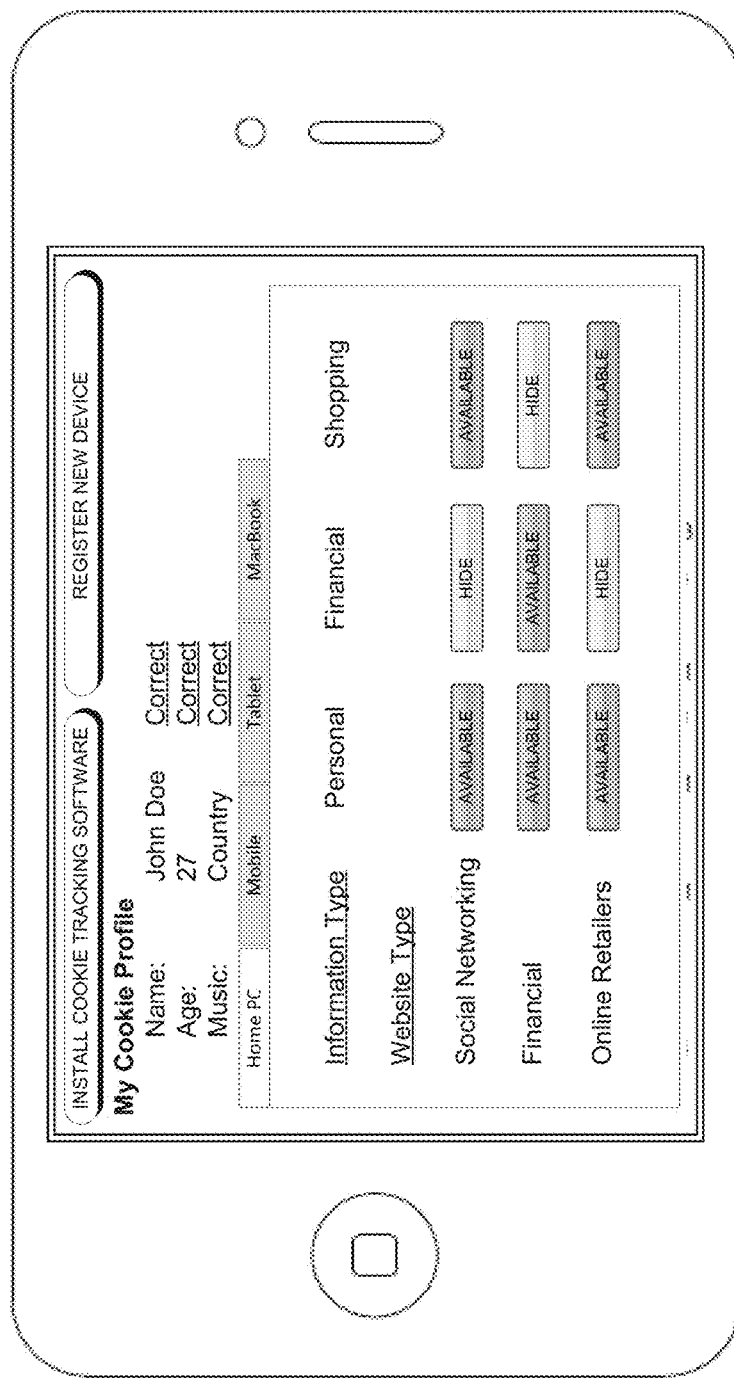
FIG. 7 illustrates another example of a mobile user interface for managing a supercookie.

FIG. 7 illustrates an embodiment of a mobile app which allows a user to change his information sharing preferences as in supercookie settings section 640, discussed above with reference to FIGS. 6A-6C. In this embodiment, the mobile app provides the user with his personal information and allows the user to install cookie tracking software on his mobile device, or register his mobile devices as a new device. In other embodiments, a mobile app may display information about recent activity or profile information. In some embodiments, a user may also receive an alert if his supercookie is accessed from a new unregistered device.

Examples of Process Flow

Figure 8:
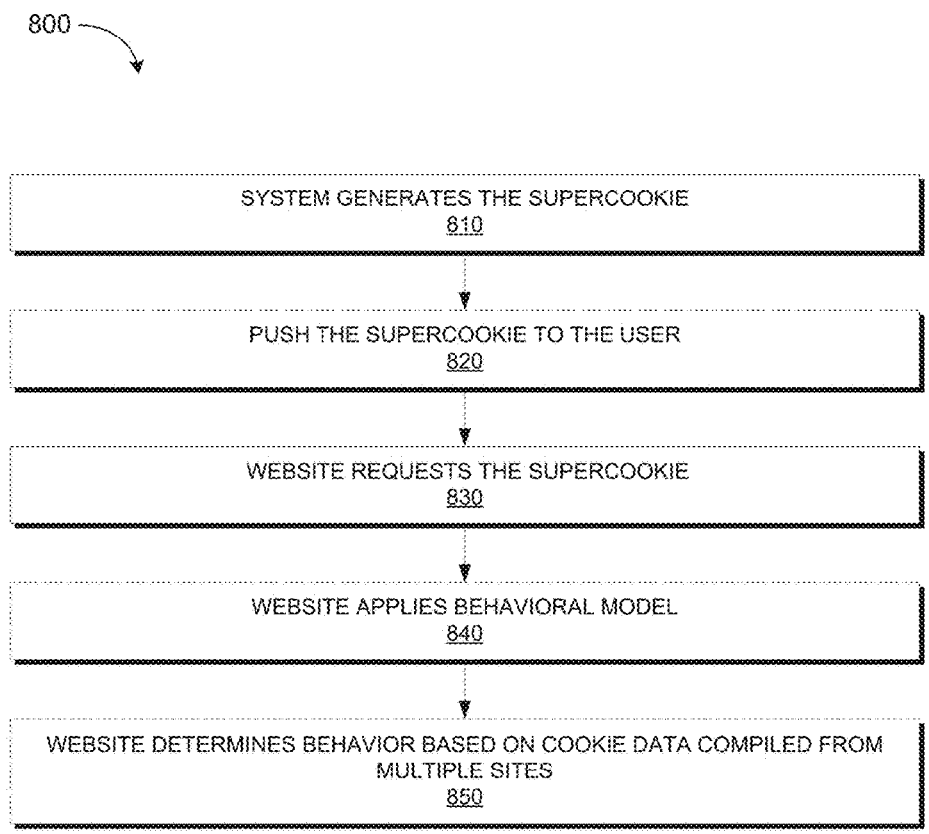
FIG. 8 illustrates a flowchart of one embodiment of a process for generating, analyzing, and using a supercookie.

FIG. 8 illustrates one embodiment of a process for generating, using, and analyzing a supercookie 165.

First, at block 810, the cookie data aggregation system 100 may generate the supercookie 165. Once generated, the cookie data aggregation system 100 may push the supercookie 165 to the user 110, as shown at block 820 (this block is optional as in some embodiments the supercookie is only maintained by the system 100). In some embodiments, the cookie data aggregation system 100 notifies the user 110 that the supercookie 165 is being pushed to the user 110. In some embodiments, the cookie data aggregation system 100 receives authorization to generate the supercookie 165, but does not notify the user 110 when it pushes the supercookie 165 to the user 110.

At block 830, a website 140 requests access to some/all of the supercookie 165. In some embodiments, the supercookie 165 is accessed directly at the system 100, while in other embodiments the user 110 provides the requested (and authorized) supercookie information to the requesting website. In some embodiments, the requesting website accesses the supercookie 165 after receiving authorization from the user 110.

At block 840, once the website's request for the supercookie 165 has been granted, the website may apply a behavioral model to the supercookie 165. By applying the model, the website can determine the behavior of the user 110 based on the cookie data compiled from multiple sites, as shown at block 850. Based on the behavioral model results, the website may customize content to the user and/or otherwise use the supercookie information. In some embodiments, the method to generate, use, and analyze a supercookie 165 may include more actions than what is shown in FIG. 8. In some embodiments, the method to generate, use, and analyze a supercookie 165 may not include all of the actions shown in FIG. 8.

Other

Each of the processes, methods, and algorithms described in the preceding sections may be embodied in, and fully or partially automated by, code modules executed by one or more computer systems or computer processors comprising computer hardware. The code modules may be stored on any type of non-transitory computer-readable medium or computer storage device, such as hard drives, solid state memory, optical disc, and/or the like. The systems and modules may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The processes and algorithms may be implemented partially or wholly in application-specific circuitry. The results of the disclosed processes and process actions may be stored, persistently or otherwise, in any type of non-transitory computer storage such as, e.g., volatile or non-volatile storage.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other computer-readable storage medium. Where the system includes multiple computing devices, these devices may, but need not, be co-located. The results of the disclosed methods and tasks may be persistently stored by transforming physical storage devices, such as solid state memory chips and/or magnetic disks, into a different state.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or actions. Thus, such conditional language is not generally intended to imply that features, elements and/or actions are in any way required for one or more embodiments or that one or more embodiments necessarily include logic for deciding, with or without author input or prompting, whether these features, elements and/or actions are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, action, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computing system comprising:
   one or more hardware computer processors;
   one or more storage devices configured to store software instructions executable by the one or more hardware computer processors to cause the computing system to:
   for each of a plurality of web sites:
      access encoded internet activity data associated with a user, the encoded internet activity data accessed from at least one of the following:
         one or more computing devices associated with the user, or
         the website;
      obtain instructions for decoding encoded internet activity data from the website;
      determine one or more characteristics of the user by decoding the accessed encoded internet activity data using the instructions obtained from the website,
         wherein the one or more characteristics include one or more of an amount of time spent on the website, user preferences when the user visits the website, web browsing activity, name, age, gender, music preferences, interests, hobbies, or other personal information of the user;
      associate the one or more characteristics of the user with an identity of the user;
      create or update a supercookie of the user, the supercookie comprising:
         the identity of the user; and
         the one or more characteristics associated with the user; and
      in response to requests for information regarding the user from a requesting entity, provide at least some of the determined one or more characteristics included in the supercookie to the requesting entity.

2. The computing system of claim 1, wherein the accessed encoded internet activity data is a cookie data.

3. The computing system of claim 1, wherein the software instructions are further configured to apply a behavioral model to the accessed encoded internet activity data and to store a result of application of the behavioral model in the supercookie, wherein a website alters content based on the result of the behavioral model.

4. The computing system of claim 1, wherein the supercookie further comprises a personal information of the user.

5. The computing system of claim 1, wherein the software instructions are further configured to extract further information unavailable from the encoded internet activity data related to the user based on the determined one or more characteristics.

6. The computing system of claim 5, wherein to extract further information includes extracting information from at least one of: social media websites, financial websites, or online retail websites.

7. The computing system of claim 1, wherein the one or more characteristics of the user further comprises at least one of: a user identifier, a date of birth, a gender, an occupation, or education.

8. The computing system of claim 1, wherein the software instructions are further configured to cause the supercookie to be stored on a user device, and wherein the user device is configured to modify responses for browsing requests based on the supercookie.

9. The computing system of claim 1, wherein to determine the one or more characteristics of the user based on the accessed encoded internet activity data comprises determining the one or more characteristics of the user based on the accessed encoded internet activity data for a first website of the plurality of websites, wherein the one or more characteristics of the user is unavailable from the accessed encoded internet activity data for a second website of the plurality of websites.

10. The computing system of claim 1, wherein the software instructions are further configured to generate graphical user interface data to enable the user to customize access to supercookie data.

11. The computing system of claim 1, wherein the requesting entity is a website or a business entity.

12. The computing system of claim 1, wherein the requests for information regarding the user is triggered by the user requesting access to a website of the requesting entity.

13. The computing system of claim 1, wherein the software instructions are further configured to cause the computing system to charge a fee to the requesting entity.

14. The computing system of claim 1, wherein the software instructions are further configured to cause the computing system to track computing devices associated with a user.

15. The computing system of claim 1, wherein the software instructions are further configured to cause the computing system to track cookies associated with a user to retrieve new or updated cookies and cookie data.

16. A computerized method comprising:
by a computing system having one or more hardware computer processors,
for each of a plurality of web sites:
access encoded internet activity data associated with a user, the encoded internet activity data accessed from at least one of the following:
one or more computing devices associated with the user, or
the website;
obtain instructions for decoding encoded internet activity data from the website;
determine one or more characteristics of the user by decoding the accessed encoded internet activity data using the instructions obtained from the website,
wherein the one or more characteristics include one or more of an amount of time spent on the website, user preferences when the user visits the website, web browsing activity, name, age, gender, music preferences, interests, hobbies, or other personal information of the user;
associate the one or more characteristics of the user with an identity of the user;
create or update a supercookie of the user, the supercookie comprising:
the identity of the user; and
the one or more characteristics associated with the user; and
in response to requests for information regarding the user from a requesting entity, provide at least some of the determined one or more characteristics included in the supercookie to the requesting entity.

17. A non-transitory computer readable storage device having software instructions stored thereon, the software instructions executable by a hardware computer processor to cause a computing system to:
for each of a plurality of web sites:
access encoded internet activity data associated with a user, the encoded internet activity data accessed from at least one of the following:
one or more computing devices associated with the user, or the website;
obtain instructions for decoding encoded internet activity data from the website;
determine one or more characteristics of the user by decoding the accessed encoded internet activity data using the instructions obtained from the website,
wherein the one or more characteristics include one or more of an amount of time spent on the website, user preferences when the user visits the website, web browsing activity, name, age, gender, music preferences, interests, hobbies, or other personal information of the user;
associate the one or more characteristics of the user with an identity of the user;
create or update a supercookie of the user, the supercookie comprising:
the identity of the user; and
the one or more characteristics associated with the user; and
in response to requests for information regarding the user from a requesting entity, provide at least some of the determined one or more characteristics included in the supercookie to the requesting entity.

* * * * *